US011295328B2

United States Patent
Avinash Dorle et al.

(10) Patent No.: US 11,295,328 B2
(45) Date of Patent: Apr. 5, 2022

(54) INTELLIGENT PROSPECT ASSESSMENT

(71) Applicant: ACCENTURE GLOBAL SOLUTIONS LIMITED, Dublin (IE)

(72) Inventors: Vinay Avinash Dorle, Bangalore (IN); Manu Khanna, Jaipur (IN); Santosh Kumar Soni, Bangalore (IN); Lokesh Dharmane, Pune (IN); Theerthala Siva Rama Sarma, Secunderabad (IN); Vikash Choudhary, Bangalore (IN); Shivam Mathur, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/921,673

(22) Filed: Jul. 6, 2020

(65) Prior Publication Data

US 2021/0350395 A1 Nov. 11, 2021

(30) Foreign Application Priority Data

May 1, 2020 (IN) .............................. 202011019598

(51) Int. Cl.
*G06Q 30/02* (2012.01)
*G06Q 30/06* (2012.01)

(52) U.S. Cl.
CPC ..... *G06Q 30/0204* (2013.01); *G06Q 30/0201* (2013.01); *G06Q 30/0631* (2013.01)

(58) Field of Classification Search
CPC .......... G06Q 30/0201; G06Q 30/0204; G06Q 30/0631

(Continued)

(56) References Cited

U.S. PATENT DOCUMENTS

2007/0219851 A1* 9/2007 Taddei .................. G06Q 30/02
705/7.13
2008/0109445 A1* 5/2008 Williams ........... G06Q 30/0202
(Continued)

FOREIGN PATENT DOCUMENTS

CN 102054016 5/2011

OTHER PUBLICATIONS

Using Web Analytics to Increase Conversions: 6. Additional Metrics For Increasing Sales & Generating Leads. Anonymous. Direct Marketing Association (DMA). Web Analytics Report. (Nov. 2007).*

(Continued)

*Primary Examiner* — Timothy Padot
(74) *Attorney, Agent, or Firm* — Mannava & Kang, P.C.

(57) ABSTRACT

Examples for a prospect assessment system are provided. The system may receive a query from a user and obtain prospect data from a plurality of data sources. The system may create a plurality of prospect clusters. The system may determine a cluster significance value. The system may determine a prospect churn value. The system may determine a set of significant prospect clusters from among the plurality of prospect clusters having the cluster significance value and the prospect churn value above a threshold value. The system may determine a prospect pattern matrix including a plurality of patterns from the set of significant prospect clusters. The system may identify a set of products for each of the plurality of patterns. The system may determine a prospect profile for each of the plurality of patterns. The system may generate a prospect assessment result based on the prospect profile for the resolution of the query.

20 Claims, 42 Drawing Sheets

(58) Field of Classification Search
USPC .................................................. 705/7.33
See application file for complete search history.

(56) References Cited

U.S. PATENT DOCUMENTS

| | | | |
|---|---|---|---|
| 2009/0055270 A1* | 2/2009 | Magdon-Ismail | G06F 16/957 705/14.27 |
| 2010/0114663 A1* | 5/2010 | Casas | G06F 16/902 705/7.31 |
| 2010/0131835 A1* | 5/2010 | Kumar | G06Q 30/0255 715/205 |
| 2010/0287011 A1* | 11/2010 | Muchkaev | A63F 13/216 379/93.13 |
| 2016/0027051 A1 | 1/2016 | Gross | |
| 2016/0048934 A1 | 2/2016 | Gross | |
| 2017/0330220 A1* | 11/2017 | Korada | G06F 30/20 |
| 2020/0020015 A1* | 1/2020 | Anders | G06Q 30/0631 |

OTHER PUBLICATIONS

Managing Sales Leads by Computer. Zeleny, Indira. Small Business Reports; Nov. 1989; 14, 11; ABI/INFORM Global; pp. 60-62.*

Comparison of supervised machine learning techniques for customer churn prediction based on analysis of customer behavior. Khodabandehlou, Samira; Rahman, Mahmoud Zivari. Journal of Systems and Information Technology 19.1/2: 65-93. Emerald Group Publishing Limited. (2017).*

J. Burez et al., "Handling class imbalance in customer churn prediction", Elsevier, Expert Systems with Applications 36 (2009), pp. 4626-4636.

Shailesh Kumar et al., "Logical Itemset Mining", IEEE International Conference on Data Mining (Workshop) (2012), pp. 603-610.

Claudio Marcus, "A practical yet meaningful approach to customer segmentation", 1998, Journal of Consumer Marketing, vol. 15, Iss 5, pp. 494-504.

Wenting Ye et al., "Nonnegative matrix factorization for clustering ensenble based on dark knowledge", Elsevier, Knowledge-Based Systems 163 (2019) 624-631.

Xiaojing Zhou et al., "Review of Customer Segmentation method in CRM", IEEE international Conference on Computer Science and Service System (CSSS) 2011, pp. 4033-4035.

All Tamaddoni Jahromi et al., "Managing B2B customer churn, retention and profitability", Elsevier, Industrial Marketing Management 43 (2014), pp. 1258-1268.

* cited by examiner

| | dist_k-means++ | dist_random | dist_centroids_rpa_gen | dist_centroids_even_spaced | 0gmm | 1gmm | 2gmm | 3gmm | 4gmm | 5gmm | 0fuzzy | 1fuzzy | 2fuzzy |
|---|---|---|---|---|---|---|---|---|---|---|---|---|---|
| 0 | 2.202035 | 2.677210 | 2.313909 | 2.395758 | 0.0 | 0.0 | 0.000000 | 0.0 | 0.000000 | 1.0 | 0.042429 | 0.064940 | 0.903031 |
| 1 | 2.145790 | 2.705101 | 2.372142 | 2.112564 | 0.0 | 0.0 | 0.000000 | 0.0 | 0.000000 | 1.0 | 0.051034 | 0.056551 | 0.932415 |
| 2 | 2.085140 | 2.460058 | 2.472036 | 2.547247 | 0.0 | 0.0 | 0.000000 | 0.0 | 0.000000 | 1.0 | 0.061987 | 0.078390 | 0.859622 |
| 3 | 2.186531 | 2.086681 | 2.519974 | 2.520144 | 0.0 | 0.0 | 0.000000 | 0.0 | 0.000000 | 1.0 | 0.061282 | 0.077217 | 0.861502 |
| 4 | 2.020387 | 2.714385 | 2.497917 | 2.539957 | 0.0 | 0.0 | 0.000071 | 0.0 | 0.000029 | 0.0 | 0.876366 | 0.052340 | 0.071294 |

Spender Recommendation 1002

| |
|---|
| Financial Stability_High, Enterprise Size_Large, Customer Class_A, Offering Name_OFFERING 8, Quadrants_Spender, Offering Name_OFFERING 4 |
| Financial Stability_High, Enterprise Size_Large, Offering Name_OFFERING 6, Customer Class_A, Quadrants_Spender, Offering Name_OFFERING 4 |
| Financial Stability_High, Enterprise Size_Large, Customer Class_A, Offering Name_OFFERING 8, Offering Name_OFFERING 3, Quadrants_Spender |
| Financial Stability_High, Enterprise Size_Large, Offering Name_OFFERING 1, Customer Class_A, Offering Name_OFFERING 8, Quadrants_Spender |

Value_Cust Recommendations 1102

| |
|---|
| Financial Stability_High, Enterprise Size_Large, Offering Name_OFFERING 2, Customer Class_A, Quadrants_Value_Cust, Offering Name_OFFERING 5 |
| Financial Stability_High, Enterprise Size_Large, Customer Class_A, Offering Name_OFFERING 8, Offering Name_OFFERING 5, Quadrants_Value_Cust |
| Financial Stability_High, Enterprise Size_Large, Offering Name_OFFERING 7, Offering Name_OFFERING 1, Customer Class_A, Quadrants_Value_Cust |
| Financial Stability_High, Enterprise Size_Large, Offering Name_OFFERING 7, Customer Class_A, Offering Name_OFFERING 8, Quadrants_Value_Cust |

1100

| Uncertainer Recommendations 1202 |
|---|
| Quadrants_Uncertainer, Offering Name_OFFERING 4, Financial Stability_Medium, Enterprise Size_Medium, Offering Name_OFFERING 9, Customer Class_B |
| Quadrants_Uncertainer, Financial Stability_Medium, Enterprise Size_Medium, Offering Name_AspironPro V9, Offering Name_OFFERING 2 |
| Quadrants_Uncertainer, Financial Stability_Medium, Enterprise Size_Medium, Offering Name_OFFERING 1, Customer Class_B, Offering Name_OFFERING 2 |
| Offering Name_OFFERING 3, Enterprise Size_Medium, Offering Name_OFFERING 2, Financial Stability_Medium |

*FIG. 12*

| Frequenter Recommendations 1302 |
|---|
| Customer Class_B, Offering Name_OFFERING 7, Offering Name_OFFERING 1, Financial Stability_Medium, Enterprise Size_Medium, Quadrants_Frequenter |
| Financial Stability_Low, Offering Name_OFFERING 7, Enterprise Size_Small, Offering Name_OFFERING 2, Customer Class_C, Quadrants_Frequenter |
| Customer Class_B, Offering Name_OFFERING 7, Financial Stability_Medium, Offering Name_OFFERING 8, Enterprise Size_Medium, Quadrants_Frequenter |
| Customer Class_B, Offering Name_OFFERING 7, Financial Stability_Medium, Offering Name_OFFERING 2, Enterprise Size_Medium, Quadrants_Frequenter |

FIG. 13

| Prospect information 1402 | Rule 1404 | Similarity Score 1406 |
|---|---|---|
| 'Offering Name_OFFERING 7' | 'Offering Name_OFFERING 4' | 0.68041382 |
| 'Offering Name_OFFERING 9' | 'Offering Name_OFFERING 9' | |
| 'Offering Name_OFFERING 3' | | |
| 'Quadrants_Uncertainer' | 'Quadrants_Uncertainer' | |
| 'Country_United Kingdom' | 'Country_United Kingdom' | |
| 'Customer Class_B' | 'Customer Class_B' | |
| 'Enterprise Size_Medium' | 'Enterprise Size_Medium' | |
| 'Industry Category_Information Technology' | 'Industry Category_Information Technology' | |
| 'Financial Stability_Medium' | 'Financial Stability_Medium' | |

| Account Name | |
|---|---|
| Industry | Information Technology |
| Total Contract Value | |
| Contract ID | CT100364 |
| Customer Class | B |
| Region | |
| Industry Category | Information Technology |
| Country | |

| Quote Number | Start Date | Expiration Date | Opportunity Name | Account Name | Deal Term | Total Contract Value |
|---|---|---|---|---|---|---|
| Quote Line Items | | | | | Add Offerings | Edit Offerings |
| Offering | Fixed One-Time Price | | Quantity | Service Level | | |
| OFFERING 3 | USD 3,250.00 | | 3.00 | Platinum | | > |
| OFFERING 7 | USD 5,120.00 | | 1.00 | Silver | | > |
| OFFERING 9 | USD 5,170.00 | | 1.00 | Platinum | | > |
| | | | View All | | | |

Contract Customer Belongs to Cluster 2

| Contract_Customer | CUS0053_CT100364 |
|---|---|
| Cluster_Id | 2 |
| Customer Class | B |
| Enterprise Size | Medium |
| Industry Category | Information Technology |
| Financial Stability | Medium |
| No. of Units | 5 |
| Region | Europe |
| Country | United Kingdom |
| Service Level | Platinum |
| Recency_Days_Since_Offering_Last_Payment | 34 |
| Monetary_Offering_Actual_Bill_Amount | 226000 |
| Book to Bill Ratio | 1.02147 |
| Frequency_No_Of_Renewals_Done | 9 |
| Customer_Association_length | 48 |

*FIG. 19*

Churn Probability

| Contract_Customer | CUS0053_CT100364 |
|---|---|
| Customer Class | B |
| churn_prob | 0.94 |
| Enterprise Size | Medium |
| Financial Stability | Medium |
| No. of Units | 5 |
| Service Level | Platinum |
| Recency_Days_Since_Offering_Last_Payment | 34 |
| Monetary_Offering_Actual_Bill_Amount | 226000 |
| Book to Bill Ratio | 1.02147 |
| Frequency_No_Of_Renewals_Done | 9 |
| Customer_Association_length | 48 |

FIG. 20

Churner's Quadrant

| Contract_Customer | CUS0053_CT100364 |
|---|---|
| Customer Class | B |
| Freq_index | Low |
| Mon_index | Low |
| Quadrants | Uncertainer |
| Enterprise Size | Medium |
| Financial Stability | Medium |
| No. of Units | 5 |
| Service Level | Platinum |
| Recency_Days_Since_Offering_Last_Payment | 34 |
| Monetory_Offering_Actual_Bill_Amount | 226000 |
| Book to Bill Ratio | 1.02147 |

| | OFFERING 7 | OFFERING 8 | OFFERING 9 | OFFERING 1 | OFFERING 2 | OFFERING 3 | OFFERING 4 | OFFERING 5 | OFFERING 6 |
|---|---|---|---|---|---|---|---|---|---|
| OFFERING 7 | 0.000000 | 0.894855 | 0.738538 | 0.891919 | 0.915385 | 0.761518 | 0.780531 | 0.790455 | 0.820374 |
| OFFERING 8 | 0.946697 | 0.000000 | 0.750518 | 0.916397 | 0.922237 | 0.871904 | 0.815970 | 1.000000 | 0.659931 |
| OFFERING 9 | 0.768678 | 0.738370 | 0.000000 | 0.690784 | 0.918292 | 0.846694 | 0.722601 | 0.716711 | 0.767858 |
| OFFERING 1 | 0.883068 | 0.857715 | 0.657186 | 0.000000 | 0.804802 | 0.847899 | 0.853110 | 0.787240 | 0.722832 |
| OFFERING 2 | 1.000000 | 0.952315 | 0.858881 | 0.887908 | 0.000000 | 0.861380 | 0.758056 | 0.935195 | 0.802886 |
| OFFERING 3 | 0.829519 | 0.897753 | 0.886130 | 0.937767 | 0.878847 | 0.000000 | 0.724383 | 0.659741 | 0.934464 |
| OFFERING 4 | 0.843055 | 0.833070 | 0.749882 | 0.930579 | 0.749498 | 0.718288 | 0.000000 | 0.916939 | 0.780806 |
| OFFERING 5 | 0.747036 | 0.893318 | 0.650785 | 0.751371 | 0.809041 | 0.572390 | 0.802305 | 0.000000 | 0.768438 |
| OFFERING 6 | 0.956303 | 0.726049 | 0.859990 | 0.850950 | 0.856724 | 1.000000 | 0.842677 | 0.947825 | 0.000000 |
| Quadrants_Frequenter | 0.854422 | 0.644484 | 0.632676 | 0.734948 | 0.741229 | 0.652598 | 0.643278 | 0.742135 | 0.646174 |
| Quadrants_Spender | 0.314949 | 0.449181 | 0.291753 | 0.395549 | 0.266459 | 0.618961 | 0.494384 | 0.233500 | 0.461632 |
| Quadrants_Uncertainer | 0.585732 | 0.618833 | 0.682669 | 0.589019 | 0.606241 | 0.664536 | 0.558172 | 0.512403 | 0.546018 |
| Quadrants_Value_Cust | 0.637945 | 0.646848 | 0.537239 | 0.616686 | 0.632613 | 0.526570 | 0.609515 | 0.779461 | 0.628982 |

FIG. 23

Profile

'Offering_Name_OFFERING 7', 'Offering_Name_OFFERING 9', 'Offering_Name_OFFERING 3', 'Quadrants_Uncertainer', 'Country_United Kingdom', 'CustomerClass_B', 'Enterprise Size_Medium', 'Industry Category_Information Technology', 'Financial Stability_Medium'

— 2402

| Recommendations for | CUS0053_CT100364 |
|---|---|
| NBA | Up/Cross Sell |
| Offering | Higher |
| Service Level | Higher |
| Sales Rep Actions | Sales Rep should engage with the customer in the next 3 days and try to maintain & enhance customer satisfaction and retain as there is a slight retention risk. Sales Rep should also perform correction in the current offering & try to upsell/cross -sell. |

FIG. 24

Quote Information — 2600

| Quote Number 00000128 | Start Date | Expiration Date | Opportunity Name | Account Name | Deal Term | Total Contract Value |
|---|---|---|---|---|---|---|
| Quote Line Items | | | | | | |
| Offering | Fixed One-Time Price | | Quantity | Service Level | | |
| OFFERING 7 | USD 5,120.00 | | 1.00 | Silver | | |
| OFFERING 9 | USD 5,170.00 | | 1.00 | Platinum | | |
| OFFERING 4 | USD 4,260.00 | | 1.00 | Silver | | |
| View All | | | | | | |

INTELLIGENT PROSPECT ASSESSMENT

PRIORITY

The present application claims priority under 35 U.S.C. 119(a)-(d) to Indian patent application number 202011019598, having a filing date of May 8, 2020, the disclosure of which is hereby incorporated by reference in its entirety.

BACKGROUND

The importance of planning client management operations across various organizations has been increasing with increasing complexities in the sales process. Additionally, requirements, such as, for example, continuous demand sensing, resource optimization, and resource wastage reduction have increased in recent times for the sales process efficient. For example, there has been a tremendous increase in the resources deployed by various organizations for client acquisition operations, which has made retention of existing clients a key factor for sales and marketing operations.

Presently, organizations have been deploying various tools for analyzing a retention probability of an existing client. These tools may rely on input from sales personnel, thereby increasing uncertainty in the analyzed outcome owing to human errors. Additionally, these tools may not provide insights into how to improve communication with a client for enhancing the probability of retaining the client. Furthermore, the tools may also not provide action points for remediation in case a low retention probability may be predicted for a client.

There is a requirement for a system that may automatically identify various factors playing a significant role in client retention and generate various insights related to client retention from the same. There is also a requirement for a system that may deploy automated tools for predicting client retention probability, thereby increasing trustworthiness and decreasing uncertainty in predicted outcomes. Furthermore, there is a requirement for a system for client information analysis that may provide clearly defined action points for enhancing client retention in case a low retention probability may be predicted for a client.

Accordingly, a technical problem with the currently available systems for client retention is that they may be inefficient, and inaccurate. There is a need for a system that may account for the various factors mentioned above, amongst others, to generate insights for client retention in an efficient manner.

BRIEF DESCRIPTION OF DRAWINGS

FIG. 7A illustrates a pictorial representation for the creation of a plurality of prospect clusters for prospect assessment as deployed by a prospect assessment system, according to an example embodiment of the present disclosure.

FIG. 10 illustrates a pictorial representation for an exemplary prospect profile for a pattern from the prospect pattern matrix (mentioned by way of FIGS. 9A and 9B) as created by a prospect assessment system, according to an example embodiment of the present disclosure.

FIG. 11 illustrates a pictorial representation for an exemplary prospect profile for a pattern from the prospect pattern matrix (mentioned by way of FIGS. 9A and 9B) as created by a prospect assessment system, according to an example embodiment of the present disclosure.

FIG. 12 illustrates a pictorial representation for an exemplary prospect profile for a pattern from the prospect pattern matrix (mentioned by way of FIGS. 9A and 9B) as created by a prospect assessment system, according to an example embodiment of the present disclosure.

FIG. 13 illustrates a pictorial representation for an exemplary prospect profile for a pattern from the prospect pattern matrix (mentioned by way of FIGS. 9A and 9B) as created by a prospect assessment system, according to an example embodiment of the present disclosure.

FIG. 14 illustrates a pictorial representation for an exemplary prospect profile being assigned a confidence score by a prospect assessment system, according to an example embodiment of the present disclosure.

FIG. 16 illustrates a pictorial representation of a prospect assessment stage as deployed by a prospect assessment system, according to an example embodiment of the present disclosure.

FIG. 17 illustrates a pictorial representation of a prospect assessment stage as deployed by a prospect assessment system, according to an example embodiment of the present disclosure.

FIG. 19 illustrates a pictorial representation of a prospect assessment stage as deployed by a prospect assessment system, according to an example embodiment of the present disclosure.

FIG. 20 illustrates a pictorial representation of a prospect assessment stage as deployed by a prospect assessment system, according to an example embodiment of the present disclosure.

FIG. 21 illustrates a pictorial representation of a prospect assessment stage as deployed by a prospect assessment system, according to an example embodiment of the present disclosure.

FIG. 23 illustrates a pictorial representation of a prospect assessment stage as deployed by a prospect assessment system, according to an example embodiment of the present disclosure.

FIG. 24 illustrates a pictorial representation of a prospect assessment stage as deployed by a prospect assessment system, according to an example embodiment of the present disclosure.

FIG. 26 illustrates a pictorial representation of a prospect assessment stage as deployed by a prospect assessment system, according to an example embodiment of the present disclosure.

DETAILED DESCRIPTION

Figure 1:
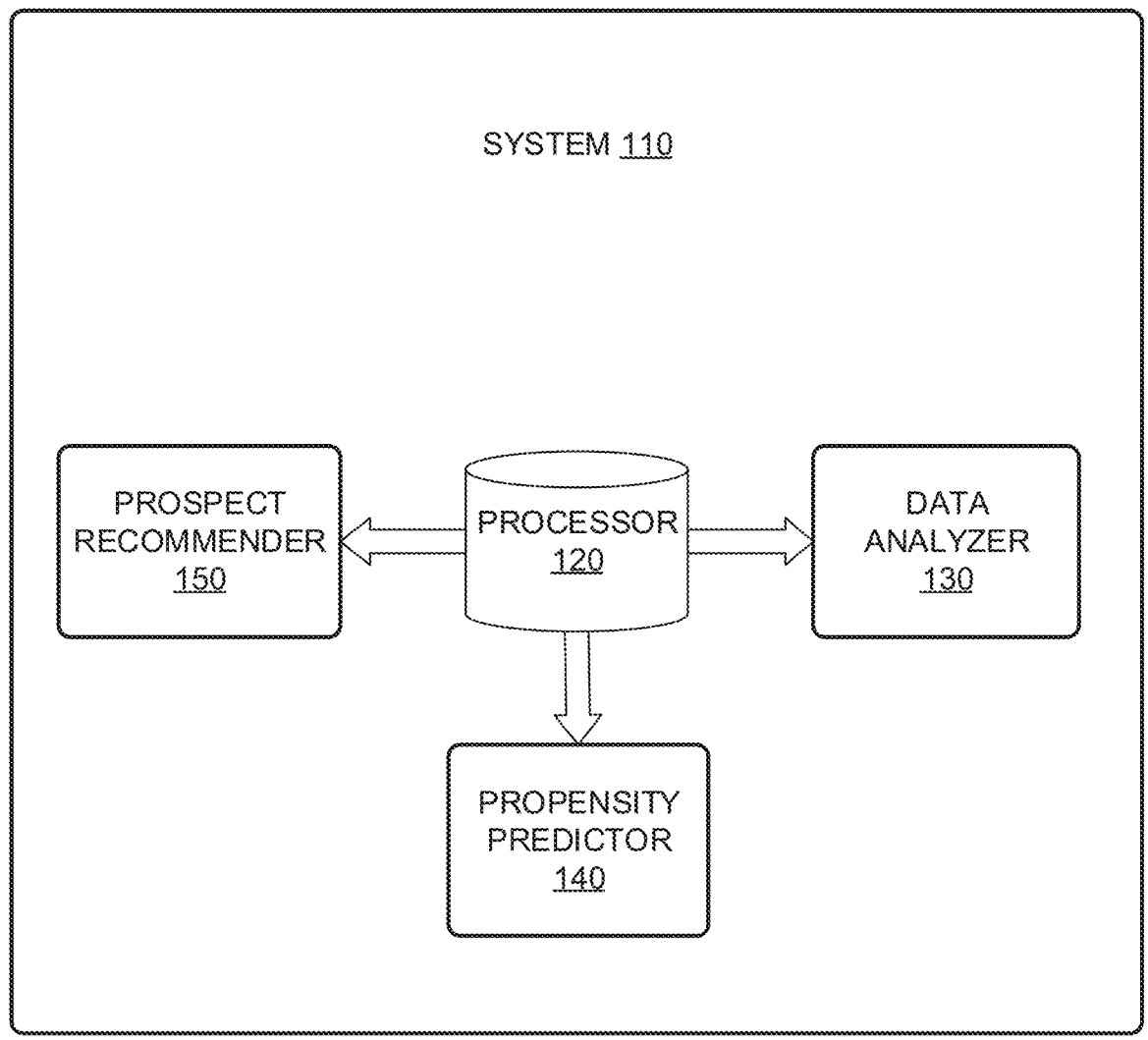
FIG. 1 illustrates a diagram for a prospect assessment system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for product recommendation to a prospect including a prospect assessment system (PAS). The PAS (referred to as "system" hereinafter) may be used for an automated assessment of various products and services for a prospect for facilitating prospect retention. The system may provide recommendations on a service level and on an offering level that may be offered to a prospect depending on a number of factors. The system may automatically identify the aforementioned factors using Machine Learning (ML) algorithms which may result in higher trustworthiness of the recommendations. The system may predict the probability of client retention. The system may provide the next best action, which may help a sales team in client retention. The system may be deployed by an organization for analyzing clients that may, in turn, cater to end-users. The system may be deployed for technology-intensive organizations for evaluating clients associated with "Everything As A Service" (XaaS) models. The XaaS may refer to a cloud computing term for the extensive variety of services and applications emerging for users to access on-demand over the Internet as opposed to being utilized via on-premises means. In an example, the XaaS model may include software-as-a-service (SaaS) infrastructure-as-a-service, platform-as-a-service, storage-as-a-service, desktop-as-a-service, disaster recovery-as-a-service, marketing-as-a-service healthcare-as-a-service, and the like. In an example, the term "XaaS" may also stand for "anything as a service". The everything-as-a-service facilities may provide flexibility for users and organizations to customize their computing environments for crafting desired experiences on demand.

The system may include a processor, a data analyzer, a propensity predictor, and a prospect recommender. The processor may be coupled to the data analyzer, the propensity predictor, and the prospect recommender. The data analyzer may receive a query from a user. The query may indicate a prospect assessment requirement associated with a plurality of prospects. The data analyzer may obtain prospect data from a plurality of data sources. The data analyzer may implement a first artificial intelligence component to identify a plurality of attributes associated with the prospect assessment requirement. The data analyzer may implement the first artificial intelligence component to map the plurality of attributes with the plurality of prospects to create a plurality of prospect clusters. Each of the plurality of prospect clusters may comprise at least one prospect from the plurality of prospects. The data analyzer may implement the first artificial intelligence component to determine a cluster significance value for each of the plurality of prospect clusters. The cluster significance value may be associated with the significance of a prospect cluster amongst the plurality of prospect clusters.

The propensity predictor may implement a second artificial intelligence component to determine a prospect churn value based on the cluster significance value for each of the plurality of prospect clusters. The prospect churn value being associated with a probability of retention of the plurality of prospects. The propensity predictor may implement the second artificial intelligence component to identify a first product associated with each of the plurality of prospect clusters. The propensity predictor may implement the second artificial intelligence component to obtain product data associated with the first product from the plurality of data sources. The propensity predictor may implement the second artificial intelligence component to determine a set of significant prospect clusters from among the plurality of prospect clusters. A significant prospect cluster being a prospect cluster having the cluster significance value above a threshold cluster significance value and having the prospect churn value above a threshold prospect churn value. The propensity predictor may implement the second artificial intelligence component to determine a prospect pattern matrix based on mapping each of the prospect clusters from the set of significant prospect clusters with product data associated with the first product. The prospect pattern matrix may comprise the set of significant prospect clusters sorted into a plurality of patterns. The plurality of patterns may be indicative of a significance level for each of the significant prospect clusters.

The prospect recommender may implement a third artificial intelligence component to identify a set of products correlated to the first product. The prospect recommender may implement a third artificial intelligence component to determine a prospect profile for each of the plurality of patterns. The prospect profile may comprise the set of products correlated to the first product. The set of products being relevant for a prospect from the plurality of prospects. The prospect recommender may implement the third artificial intelligence component to generate a prospect assessment result corresponding to the prospect assessment requirement. The prospect assessment result comprising the prospect profile relevant for the resolution of the query. The prospect recommender may implement the third artificial intelligence component to perform a prospect assessment action based on the prospect assessment result for the resolution of the query.

The embodiments for the prospect assessment requirement presented herein are exemplary in nature and should be treated as such. For the sake of brevity and technical clarity, the description of a prospect assessment system may be restricted to a few exemplary embodiments; however, to a person of ordinary skill in the art, it should be clear that the system may be used for the fulfillment of various prospect assessment requirements other than those mentioned hereinafter.

Accordingly, the present disclosure aims to provide a prospect assessment system that may account for the various factors mentioned above, amongst others to adaptively clustering clients and products of an organization for developing an analytics-centric approach for gathering various client insights and facilitating client retention. Furthermore, the present disclosure may categorically analyze various parameters to transform the client management operations of technology-intensive industries to an outcome-based and insight-driven transaction function in an efficient manner.

FIG. 1 illustrates a system 110 for prospect assessment (referred to as system 110 hereinafter), according to an example implementation of the present disclosure. In an example, the system 110 may include a processor 120. The processor 120 may be coupled to a data analyzer 130, a propensity predictor 140, and a prospect recommender 150.

The data analyzer 130 may receive a query from a user. The query may indicate a prospect assessment requirement associated with a plurality of prospects. The prospect assessment requirement may be associated with at least one of a process, an organization, and an industry-relevant for client management operations. In an example, the prospect assessment requirement may indicate a requirement, which may refer to a purpose of generating product recommendations for a client for upselling in a corporate environment. For example, the purpose may be to access procurement histories of the various clients for generating product recommendations for a client for cross-selling in a corporate environment. The purpose of the prospect assessment requirement may be to retain existing clients by accurately predicting their ever-evolving requirements and presenting offerings pertaining to such dynamic and evolving requirements. The purpose of the prospect assessment requirement may be to understand and evaluate possible demographic details or a geographical location for augmenting understanding regarding client requirements to present a more insight-driven quotation, which may have a higher chance of getting accepted thereby leading to effective client relationship management. The purpose of the prospect assessment requirement may be planning for new prospect development projects and generating sales insights for the same. The prospect assessment requirement may be the execution of plans made for sales expansion by an organization. In an example, the prospect assessment requirement may be to adaptively cluster clients based on their procurement behavior and generate product recommendations accordingly. The prospect assessment requirement may be to generate product recommendations for clients for upgrading existing products and/or increasing the number of products to the procurement portfolio. In addition, another requirement may be to search for customers in a similar industry who may have bought similar products. The prospect assessment requirement may be related to identifying clients that may have been planning to leave a particular organization in favor of another organization. The prospect assessment requirement may include creating insight-driven proposals and quotations for clients that may consider leaving an organization. The prospect assessment requirement may include identifying specific products that may be associated with a particular client and recommending products based on said identification. One of ordinary skill in the art will appreciate that what constitutes "similar" may vary from prospect to prospect. For example, a prospect may consider clients who have bought similar products such as, for example, an antenna to be similar in nature. Alternatively, a prospect may consider clients with comparable revenues to be similar. Other definitions for similar may be used to analyze customers without departing from the scope of the disclosure. The embodiments for the prospect assessment requirements presented herein are exemplary in nature and should be treated as such. The plurality of prospects may be existing clients of an organization. In an example, the plurality of prospects may include prospective clients that may be considered by an organization for developing new relations.

The data analyzer 130 may obtain prospect data from a plurality of data sources. In an example, the plurality of data sources may include various internal and external databases, which may be accessible to an organization. The external databases may be various databases related to market research, for example, Gartner®, e-Marketer®, and the like. The external databases may also include websites wherein a new product launch may be announced by various organizations. In an example, the external databases may include websites for various organizations. The internal databases may be, for example, a lead and opportunity management database, an order management database, a product and pricing management database, a marketing operations management database, a service management database and the like along with their existing install base. In accordance with various embodiments of the present disclosure, the prospect data may refer to data related to an existing and/or a potential client (referred to as "prospect" hereinafter) of an organization. In an example, the prospect data may include prospect entitlements, demographic details for the prospect, products, and services, utilized by the prospect, prospect growth potential, prospect purchase likelihood, past lead conversion rate, average deal size, the financial value of past purchases, number of purchase orders, frequency of prior orders, existing discounts, existing service terms, highest value of past purchases and the like. In an example, the prospect data may also include revenue, budget, buying power, function, number of employees working in the prospect organization, industry of the prospect organization. The prospect data may include terms and conditions agreed upon between a prospect and an organization related to various products, and services. In an example, the prospect data may include data related to prospect purchase history, for example, prospect products of interest, the past lead conversion rate for a prospect, past products purchased, purchase likelihood, financial value of past purchases, average deal size, the highest financial value of past purchase, number of prior orders, frequency of prior orders, categories of past product purchases, prospect technology stack, past service-level purchases, past prices and discounts, and the like.

The data analyzer 130 may implement a first artificial intelligence component to identify a plurality of attributes associated with the prospect assessment requirement. In accordance with various embodiments of the present disclosure, the first artificial intelligence component may include artificial intelligence techniques, for example, Natural Language Processing (NLP) model, and the like. The plurality of attributes may refer to measurable factors associated with the prospect assessment requirement. For example, the plurality of attributes may include measurable factors such as prospect demographic insights, prospect name, prospect organization name, the designation of prospect liaison, prospect organization hierarchy, department in the prospect organization, department of the prospect liaison, prospect geographical area, prospect technology stack, a prospect organization size, information on various vendors associated with a prospect, a time duration of association with an organization, length of association, the average frequency of transactions, type of product or service, number of years in business, usage details, monetary values, and the like and the like. In accordance with various embodiments of the present disclosure, the plurality of attributes may include historical procurement data. The first artificial intelligence component may identify the plurality of attributes from the prospect data. The first artificial intelligence component may identify the plurality of attributes from the plurality of data sources. The categories included in the plurality of attributes and the prospect data are exemplary in nature and should be treated as such. For sake of brevity and technical clarity only a few examples of the plurality of attributes and the prospect data have been mentioned herein, however, it should clear to a person skilled in the art that the plurality of attributes and the prospect data may include any type of measurable factors and corresponding data associated with a prospect with regards to an organization implementing the system 110.

The data analyzer 130 may implement the first artificial intelligence component to map the plurality of attributes with the plurality of prospects to create a plurality of prospect clusters. The first artificial intelligence component may include implementation of various baseline clustering algorithms such as Gaussian Mixture Models (explained by way of subsequent Figs.), Fuzzy C-Means models (explained by way of subsequent Figs.), and K-means clustering models (explained by way of subsequent Figs.) for creation of the plurality of prospect clusters. The plurality of prospect clusters may include the plurality of prospects segmented into clusters based on the plurality of attributes. For example, the plurality of prospects may be clustered according to a time duration of association with an organization, length of association, the average frequency of transactions, type of product or service, number of years in business, usage details, monetary values, and the like.

The first artificial intelligence component may process the prospect data to identify data segments that may be relevant for measuring the plurality of attributes. For example, the first artificial intelligence component may process prospect data and the plurality of attributes to build cluster data. For example, the first artificial intelligence component may collate prospect data such as Length, Recency, Frequency, and Monetary (LRFM), number of years in association with a prospect, number of years a prospect may have been operational, usage details and the like to feed to baseline clustering algorithms. In accordance with various embodiments of the present disclosure, the data analyzer 130 may deploy various algorithms for calculating a customer relationship score (explained in detail by way of FIGS. 4A-4D), an offering performance score (explained in detail by way of FIGS. 4A-4D), a renewal confidence score (explained in detail by way of FIGS. 4A-4D) for creation of the plurality of prospect clusters. The results from the customer relationship score, the offering performance score, and the renewal confidence score may be deployed by the first artificial intelligence component.

The baseline clustering algorithms may segregate (explained in detail by way of subsequent Figs.) the prospects based on associated prospect data according to, for example, the LRFM, number of years in association with a prospect, number of years a prospect may have been operational, usage details and the like. The first artificial intelligence component may augment the data provided to the baseline clustering algorithms from the plurality of data sources (explained in detail by way of FIGS. 4A-4D). The plurality of prospect clusters may be created so that each prospect cluster may have prospects with similar operation profiles such as similar LRFM, number of years in association with a prospect, number of years a prospect may have been operational, usage details and the like. Additionally, the plurality of prospect clusters may be created so that each prospect cluster may be unique. Each of the plurality of prospect clusters may comprise at least one prospect from the plurality of prospects.

In accordance with various embodiments of the present disclosure, the data analyzer 130 may create multiple sets of the plurality of prospect clusters. The data analyzer 130 may deploy various algorithms for creating the plurality of prospect clusters. As mentioned above, the first artificial intelligence component may deploy multiple baseline clustering algorithms such as Gaussian Mixture Models (explained by way of subsequent Figs.), Fuzzy C-Means models (explained by way of subsequent Figs.), and K-means clustering models (explained by way of subsequent Figs.) for creation of the plurality of prospect clusters. The data analyzer 130 may identify a set of the plurality of prospect clusters from among the multiple sets of the plurality of prospect clusters based on an evaluation of each of the multiple sets of the plurality of prospect clusters. The evaluation may map a similarity level for the plurality of prospects within each plurality of prospect clusters and the evaluation to map a disparity level among each set of the plurality of prospect clusters. The first artificial intelligence component may evaluate an output generated by each of the baseline clustering algorithms. The data analyzer 130 may generate the plurality of prospect clusters based on a consensus derived from an evaluation of results achieved by deployment of multiple the baseline clustering algorithms (explained in detail by way of FIGS. 6A-6G). The results from the application of the baseline clustering algorithms may be referred to as dark knowledge. The first artificial intelligence component may process the dark knowledge extracted from the application of the baseline clustering algorithms using a data centroid based approach for reducing data dimensionality in the plurality of prospect clusters (explained in detail by way of FIGS. 7A-7B). The reduction data dimensionality may lead to an accurate analysis of large datasets and optimal utilization of resources associated with the system 110. The plurality of prospect clusters may be data-driven prospect segments that may be used by the system 110 for resolution of the query.

The data analyzer 130 may implement the first artificial intelligence component to determine a cluster significance value (explained in detail by way of FIGS. 8A-8B) for each of the plurality of prospect clusters. The cluster significance value may be associated with the significance of a prospect cluster amongst the plurality of prospect clusters. The cluster significance value may indicate the value of a prospect for an organization. For example, a high cluster significance value may indicate the prospect may be of significant importance. Such an indication may facilitate the creation of effective prospect retention measures for efficient client relationship management. The system 110 may identify a threshold cluster significance value. In an example, a user of the system 110 may identify the threshold cluster significance value. In an example, the first artificial intelligence component may identify the threshold cluster significance value based on the prospect data. In accordance with various embodiments of the present disclosure, the system 110 may only consider the plurality of prospect clusters that may have the cluster significance value above the threshold cluster significance value.

The propensity predictor 140 may implement a second artificial intelligence component to determine a prospect churn value based on the cluster significance value for each of the plurality of prospect clusters. For the purpose of the disclosure, the term "churn propensity" may be referred to as the propensity of a prospect to leave a particular organization. For the purpose of the disclosure, the term "churn" may refer to an act of a prospect leaving a particular organization. The second artificial intelligence component may implement various supervised learning models for determination of the prospect churn value for each of the plurality of prospect clusters (explained in detail by way of FIGS. 4A-4D). The propensity predictor 140 may implement the second artificial intelligence component on the plurality of prospect clusters for determination of the prospect churn value. The prospect churn value may be associated with a probability of retention of the plurality of prospects. The prospect churn value may indicate the probability of prospect churning. The system 110 may identify a threshold prospect churn value. In an example, the second artificial intelligence component may identify the threshold prospect churn value based on historical data. In an example, a user of the system 110 may identify the threshold prospect churn value. The propensity predictor 140 may predict prospect retention based on the prospect churn value. For example, the propensity predictor 140 may predict the plurality of prospect clusters with the prospect churn value above the threshold prospect churn value to have a higher probability of leaving a particular organization.

The propensity predictor 140 may implement the second artificial intelligence component to identify a first product associated with each of the plurality of prospect clusters. The propensity predictor 140 may implement the second artificial intelligence component to obtain product data associated with the first product from the plurality of data sources. The first product may include the product(s) and/or service(s) that may have been procured by a prospect in the past. The first product (also referred to as "identified product" hereinafter) may include the products and/or services that may have been currently subscribed to by a prospect. In accordance with various embodiments of the present disclosure, the product data may refer to data related to various products, which are sold by an organization. For example, the product data may include the cost of products, product hierarchy, service prices, marginal prices, gross margins across various geographical regions, profit margins across various geographical regions, gross margins across product category, profit margins across product category, permissible discounts across various geographical regions, permissible discounts across products, and the like. For sake of brevity and technical clarity only a few examples of product data have been mentioned herein, however, it should clear to a person skilled in the art that product data may include any type of data associated with a product associated with an organization implementing the system 110.

The propensity predictor 140 may implement the second artificial intelligence component to determine a set of significant prospect clusters from among the plurality of prospect clusters. The significant prospect cluster being a prospect cluster having the cluster significance value above a threshold cluster significance value and having the prospect churn value above a threshold prospect churn value. As mentioned above the data analyzer 130 may identify the prospects classified into the plurality of prospect clusters with the cluster significance value above the threshold cluster significance value as "high value" prospects. As mentioned above, the propensity predictor 140 may identify the prospects classified into the plurality of prospect clusters with the prospect churn value above the threshold prospect churn value to be "high churning propensity" prospects. The propensity predictor 140 may collate the "high value" prospects and the "high churning propensity" prospects. In accordance with various embodiments of the present disclosure, the propensity predictor 140 may identify the prospect clusters from the plurality of prospect clusters comprising the "high value" prospects and the "high churning propensity" prospects as the significant prospect clusters.

Figure 9A:
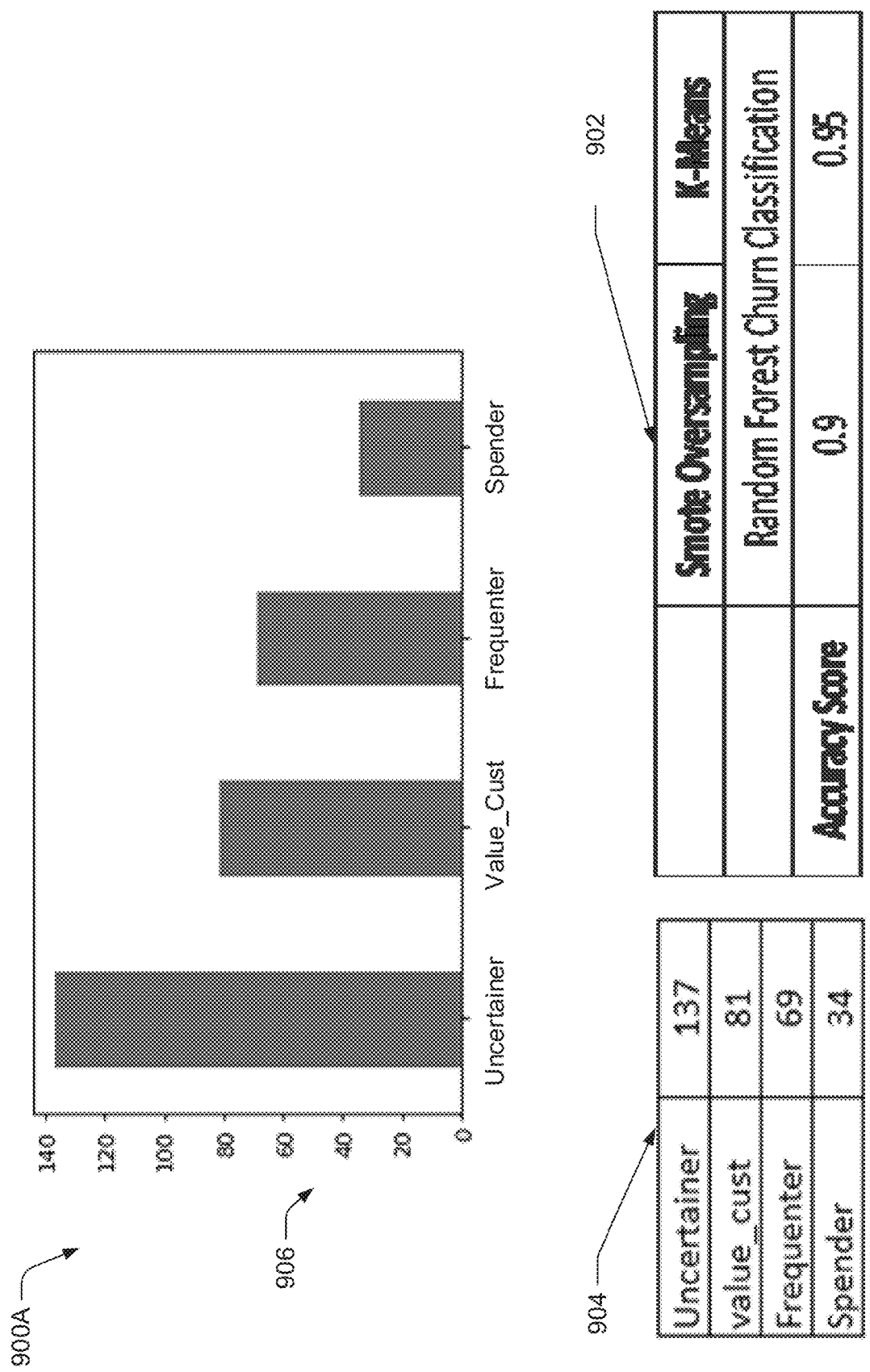
FIG. 9A illustrates a pictorial representation for the creation of a prospect pattern matrix for prospect assessment as deployed by a prospect assessment system, according to an example embodiment of the present disclosure.
Figure 9B:
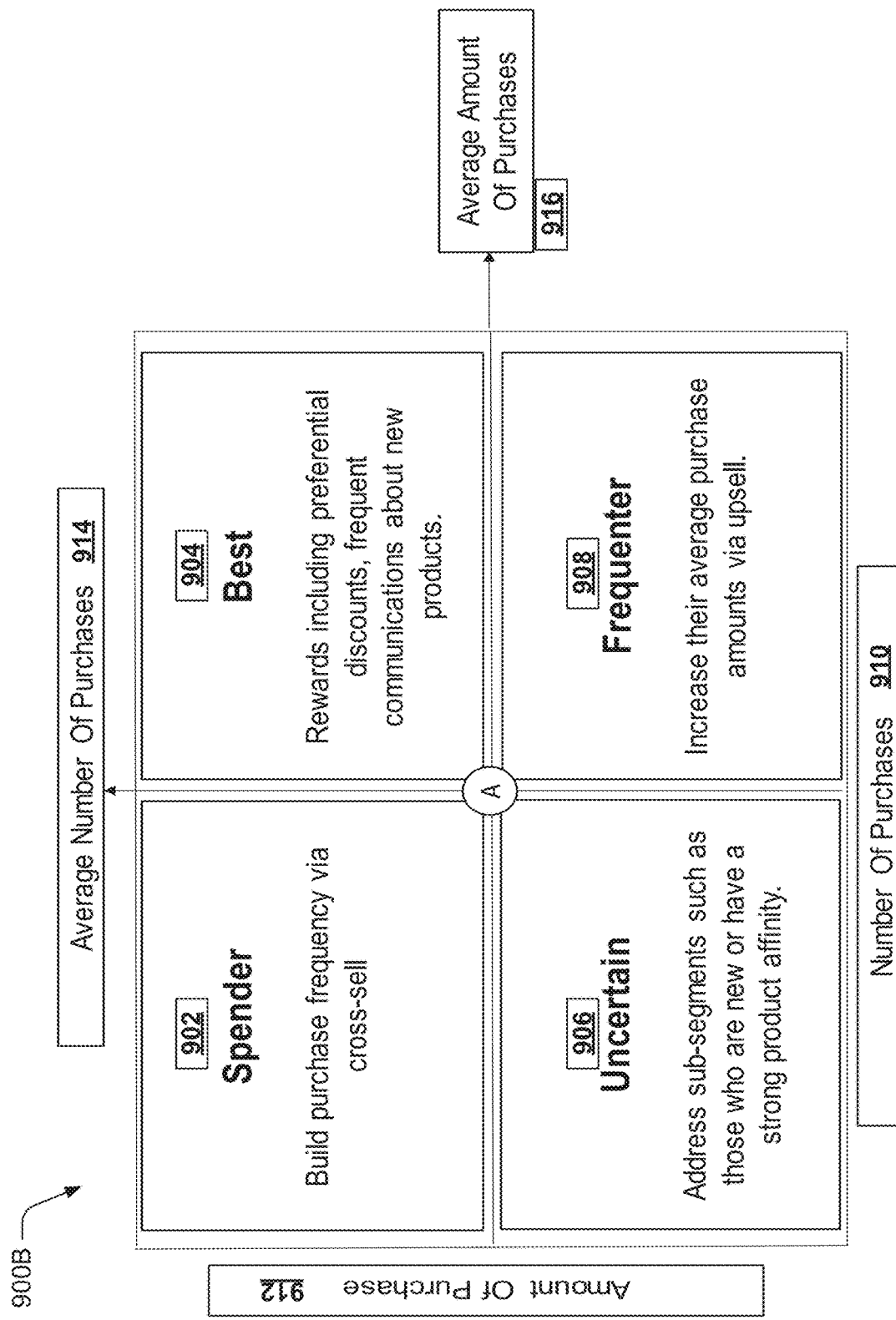
FIG. 9B illustrates a pictorial representation for the creation of a prospect pattern matrix for prospect assessment as deployed by a prospect assessment system, according to an example embodiment of the present disclosure.

The propensity predictor 140 may implement the second artificial intelligence component to determine a prospect pattern matrix based on mapping each of the prospect clusters from the set of significant prospect clusters with product data associated with the first product (explained in detail by way of FIGS. 9A-9B). The prospect pattern matrix may be a classification matrix determined by the propensity predictor 140 to classify the significant prospect clusters based on the identified product. In accordance with various embodiments of the present disclosure, the prospect pattern matrix may be determined through mapping a volume of products procured by a prospect with a monetary value generated by product procurement by a prospect. The second artificial intelligence component may determine an average volume of products procured by a prospect based on historical prospect data for the plurality of prospects. The second artificial intelligence component may determine an average monetary value generated by product procurement by a prospect based on historical prospect data for the plurality of prospects. The prospect pattern matrix may comprise the set of significant prospect clusters sorted into a plurality of patterns. The plurality of patterns may be (explained in detail by way of FIGS. 9A-9B) indicative of a significance level for each of the significant prospect clusters. In accordance with various embodiments of the present disclosure, the plurality of patterns may include a spender pattern, a value customer pattern, a frequenter pattern, and an uncertainer pattern. The propensity predictor 140 may classify the significant prospect clusters into the plurality of patterns based on the average volume of products and the average monetary value. For example, the significant prospect clusters that may be mapped above the average monetary value and below the average volume of products may be classified under the spender pattern. The significant prospect clusters that may be mapped below the average monetary value and above the average volume of products may be classified under the frequenter pattern. The significant prospect clusters that may be mapped below the average monetary value and below the average volume of products may be classified under the uncertainer pattern. The significant prospect clusters that may be mapped above the average monetary value and above the average volume of products may be classified under the value customer pattern (explained in detail by way of FIGS. 9A-9B).

Figure 2:
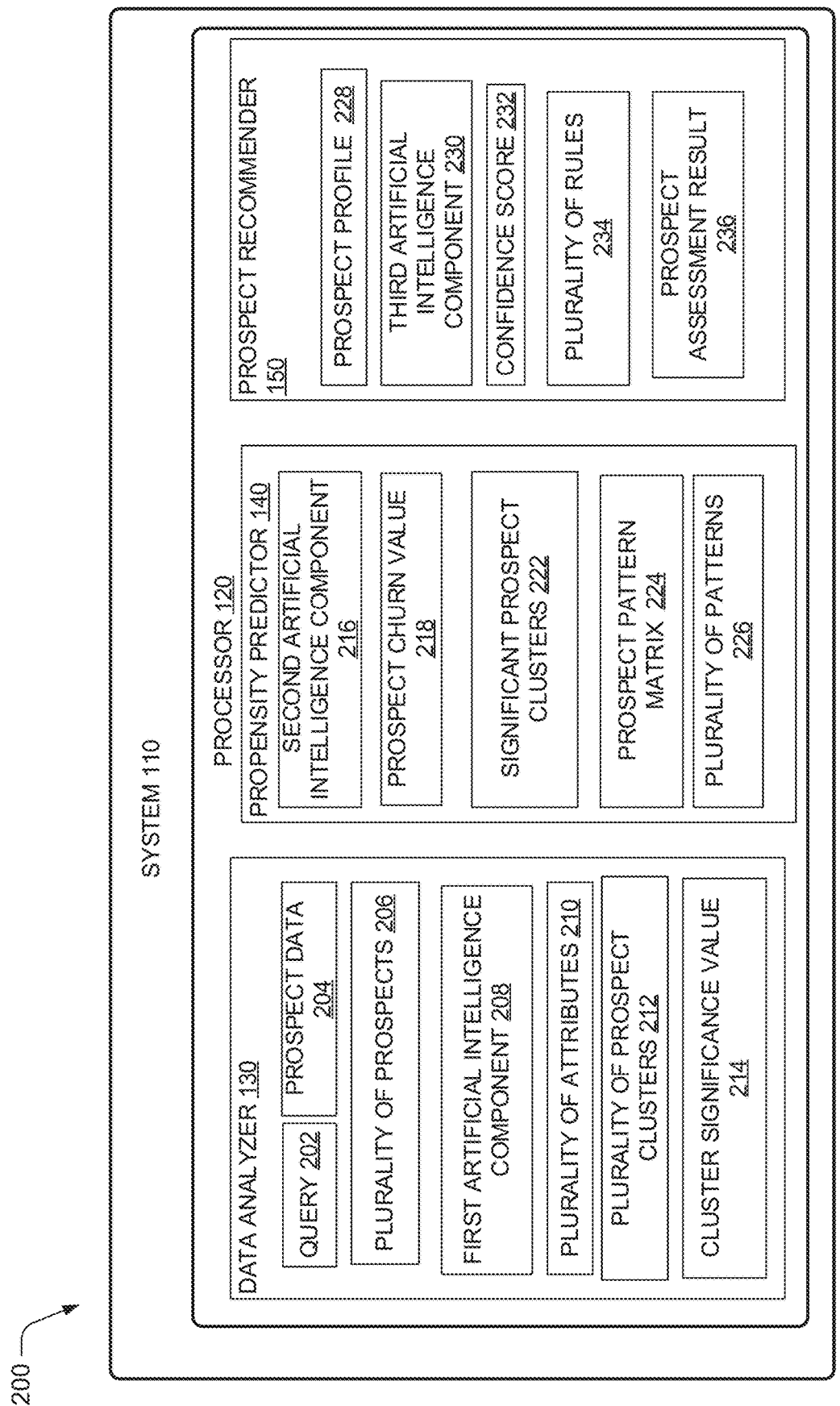
FIG. 2 illustrates various components of a prospect assessment system, according to an example embodiment of the present disclosure.

The prospect recommender 150 may implement a third artificial intelligence component to identify a set of products correlated to the first product (explained in detail by way of FIG. 2).

The prospect recommender 150 may implement a third artificial intelligence component to determine a prospect profile for each of the plurality of patterns based on correlating the first product with the prospect data associated with the plurality of prospects associated with each of the plurality of patterns. For example, the prospect recommender 150 may generate the prospect profile for the spender pattern, the prospect profile for the frequenter pattern, the prospect profile for the uncertainer pattern, and the prospect profile for the value customer pattern. As mentioned above, each of the plurality of patterns may be unique in their behavior towards monetary value generation and product volume requirements. Therefore, the prospect recommender 150 may process each of the plurality of patterns in a unique manner. For example, the prospect recommender 150 may determine correlated products for the identified product suitable for upselling for the significant prospect clusters classified under spender pattern (explained in further detail by way of FIGS. 9A-9B). The third artificial intelligence component may include implementation of various techniques such as rare itemset mining, product co-occurrence mapping, clique's discovery, and the like (explained by way of subsequent Figs.) for correlating the identified product with the prospect data associated with the plurality of prospects associated with each of the plurality of patterns. The prospect profile may comprise the identified product relevant for a prospect from the plurality of prospects corresponding to the plurality of pattern. The prospect profile may comprise the set of products correlated to the product associated with each of the plurality of patterns. The set of products being relevant for a prospect from the plurality of prospects.

The prospect recommender 150 may implement the third artificial intelligence component to assign a confidence score to each of the correlated products associated with the prospect profile for each of the plurality of patterns. The confidence score may indicate a degree of similarity between various products (explained further by way of subsequent Figs). In accordance with various embodiments of the present disclosure, the prospect recommender 150 may identify a plurality of rules for determining the prospect profile. The plurality of rules may facilitate determining a correlation amongst the set of products and the product associated with each of the significant prospect clusters. The prospect recommender 150 may generate the plurality of rules based on the techniques such as rare itemset mining, and the clique's discovery (explained further by way of subsequent Figs). In accordance with various embodiments of the present disclosure, the prospect recommender 150 may assign the confidence score based on mapping the prospect data associated with the prospect profile with the plurality of rules (explained further by way of subsequent Figs).

The prospect recommender 150 may implement the third artificial intelligence component to generate a prospect assessment result corresponding to the prospect assessment requirement. The prospect assessment result may comprise the prospect profile relevant for the resolution of the query. The prospect assessment result may include recommendations for various products, and/or services for a prospect based on the prospect profile and corresponding pattern from the plurality of patterns.

In accordance with various embodiments of the present disclosure, the prospect recommender 150 may create a product recommendation library by associating the prospect profile with the prospect assessment requirement. The prospect recommender 150 may store all the prospect profiles generated for resolving all queries similar to the query mentioned above in the form of the product recommendation library. The product recommendation library may include product recommendations associated with historical prospect assessment requirements. The prospect recommender 150 may further deploy the product recommendation library to validate the prospect profile for generation of the prospect assessment result.

The prospect recommender 150 may implement the third artificial intelligence component to perform a prospect assessment action based on the prospect assessment result for the resolution of the query. The prospect assessment action may include executing the prospect assessment result. In accordance with an embodiment of the present disclosure, the prospect recommender 150 may perform prospect assessment action automatically for generating the product recommendations based on the prospect profile. In accordance with an embodiment of the present disclosure, the prospect recommender 150 may be configurable to obtain input from the user for generating the product recommendations based on the prospect profile as well as configurable to generate the product recommendations based on the prospect profile automatically.

The embodiments for the first artificial intelligence component, the second artificial intelligence component, and the third artificial intelligence component presented herein are exemplary in nature and should be treated as such. For the sake of brevity and technical clarity, the description of a prospect assessment system may be restricted to few exemplary embodiments, however, to a person skilled in the art it should be clear that the system may be used for the fulfillment of various prospect assessment requirements other than those mentioned hereinafter.

Accordingly, the system 110 may present an approach for continuous adaptability to cater to varying data needs of the plurality of prospects and for adaptively clustering clients and products of an organization. Additionally, the system 110 may provide an analytics-centric approach for gathering various client insights. The system 110 may provide a mechanism for client information analysis that may provide clearly defined action points for enhancing client retention in case a low retention probability may be predicted for a client.

FIG. 2 illustrates various components of a prospect assessment system 110, according to an example embodiment of the present disclosure. In an example, the system may include the processor 120. The processor 120 may be coupled to the data analyzer 130, the propensity predictor 140, and the prospect recommender 150.

The data analyzer 130 may receive a query 202 from a user. The query 202 may indicate a prospect assessment requirement associated with a plurality of prospects 206. The prospect assessment requirement may be associated with at least one of a process, an organization, and an industry-relevant for client management operations. In an example, the prospect assessment requirement may indicate a requirement, which may refer to a purpose of generating product recommendations for a client for upselling in a corporate environment. For example, the purpose may be to access procurement histories of the various clients for generating product recommendations for a client for cross-selling in a corporate environment. The purpose of the prospect assessment requirement may be to retain existing clients by accurately predicting their ever-evolving requirements and presenting offerings pertaining to such dynamic and evolving requirements. The purpose of the prospect assessment requirement may be to understand and evaluate possible demographic details or a geographical location for augmenting understanding regarding client requirements to present a more insight-driven quotation, which may have a higher chance of getting accepted thereby leading to effective client relationship management. The purpose of the prospect assessment requirement may be planning for new prospect development projects and generating sales insights for the same. The prospect assessment requirement may be the execution of plans made for sales expansion by an organization. In an example, the prospect assessment requirement may be to adaptively cluster clients based on their procurement behavior and generate product recommendations accordingly. The prospect assessment requirement may be to generate product recommendations for clients for upgrading existing products and/or increasing the number of products to the procurement portfolio. In addition, another requirement may be to search for customers in a similar industry who may have bought similar products. The prospect assessment requirement may be related to identifying clients that may have been planning to leave a particular organization in favor of another organization. The prospect assessment requirement may include creating insight-driven proposals and quotations for clients that may consider leaving an organization. The prospect assessment requirement may include identifying specific products that may be associated with a particular client and recommending products based on said identification. One of ordinary skill in the art will appreciate that what constitutes "similar" may vary from prospect to prospect. For example, a prospect may consider clients who have bought similar products such as, for example, an antenna to be similar in nature. Alternatively, a prospect may consider clients with comparable revenues to be similar. Other definitions for similar may be used to analyze customers without departing from the scope of the disclosure. The embodiments for the prospect assessment requirements presented herein are exemplary in nature and should be treated as such. The plurality of prospects 206 may be existing clients of an organization. In an example, the plurality of prospects 206 may include prospective clients that may be considered by an organization for developing new relations.

The data analyzer 130 may obtain prospect data 204 from a plurality of data sources. In an example, the plurality of data sources may include various internal and external databases, which may be accessible to an organization. The external databases may be various databases related to market research, for example, Gartner®, e-Marketer®, and the like. The external databases may also include websites wherein a new product launch may be announced by various organizations. In an example, the external databases may include websites for various organizations. The internal databases may be, for example, a lead and opportunity management database, an order management database, a product and pricing management database, a marketing operations management database, a service management database and the like along with their existing install base. In accordance with various embodiments of the present disclosure, the prospect data 204 may refer to data related to an existing and/or a potential client (referred to as "prospect" hereinafter) of an organization. In an example, the prospect data 204 may include prospect entitlements, demographic details for the prospect, products, and services, utilized by the prospect, prospect growth potential, prospect purchase likelihood, past lead conversion rate, average deal size, the financial value of past purchases, number of purchase orders, frequency of prior orders, existing discounts, existing service terms, highest value of past purchases and the like. In an example, the prospect data 204 may also include revenue, budget, buying power, function, number of employees working in the prospect organization, industry of the prospect organization. The prospect data 204 may include terms and conditions agreed upon between a prospect and an organization related to various products, and services. In an example, the prospect data 204 may include data related to prospect purchase history, for example, prospect products of interest, the past lead conversion rate for a prospect, past products purchased, purchase likelihood, financial value of past purchases, average deal size, the highest financial value of past purchase, number of prior orders, frequency of prior orders, categories of past product purchases, prospect technology stack, past service-level purchases, past prices and discounts, and the like.

The data analyzer 130 may implement a first artificial intelligence component 208 to identify a plurality of attributes 210 associated with the prospect assessment requirement. In accordance with various embodiments of the present disclosure, the first artificial intelligence component 208 may include artificial intelligence techniques, for example, Natural Language Processing (NLP) model, and the like. The plurality of attributes 210 may refer to measurable factors associated with the prospect assessment requirement. For example, the plurality of attributes 210 may include measurable factors such as prospect demographic insights, prospect name, prospect organization name, the designation of prospect liaison, prospect organization hierarchy, department in the prospect organization, department of the prospect liaison, prospect geographical area, prospect technology stack, a prospect organization size, information on various vendors associated with a prospect, a time duration of association with an organization, length of association, the average frequency of transactions, type of product or service, number of years in business, usage details, monetary values, and the like and the like. In accordance with various embodiments of the present disclosure, the plurality of attributes 210 may include historical procurement data. The first artificial intelligence component 208 may identify the plurality of attributes 210 from the prospect data 204. The first artificial intelligence component 208 may identify the plurality of attributes 210 from the plurality of data sources. The categories included in the plurality of attributes 210 and the prospect data 204 are exemplary in nature and should be treated as such. For sake of brevity and technical clarity only a few examples of the plurality of attributes 210 and the prospect data 204 have been mentioned herein, however, it should clear to a person skilled in the art that the plurality of attributes 210 and the prospect data 204 may include any type of measurable factors and corresponding data associated with a prospect with regards to an organization implementing the system 110.

The data analyzer 130 may implement the first artificial intelligence component 208 to map the plurality of attributes 210 with the plurality of prospects 206 to create a plurality of prospect clusters 212. The first artificial intelligence component 208 may include implementation of various baseline clustering algorithms such as Gaussian Mixture Models (explained by way of subsequent Figs.), Fuzzy C-Means models (explained by way of subsequent Figs.), and K-means clustering models (explained by way of subsequent Figs.) for creation of the plurality of prospect clusters 212. The plurality of prospect clusters 212 may include the plurality of prospects 206 segmented into clusters based on the plurality of attributes 210. For example, the plurality of prospects 206 may be clustered according to a time duration of association with an organization, length of association, the average frequency of transactions, type of product or service, number of years in business, usage details, monetary values, and the like.

The first artificial intelligence component 208 may process the prospect data 204 to identify data segments that may be relevant for measuring the plurality of attributes 210. For example, the first artificial intelligence component 208 may process prospect data 204 and the plurality of attributes 210 to build cluster data. For example, the first artificial intelligence component 208 may collate prospect data 204 such as Length, Recency, Frequency, and Monetary (LRFM), number of years in association with a prospect, number of years a prospect may have been operational, usage details and the like to feed to baseline clustering algorithms. In accordance with various embodiments of the present disclosure, the data analyzer 130 may deploy various algorithms for calculating a customer relationship score (explained in detail by way of FIGS. 4A-4D), an offering performance score (explained in detail by way of FIGS. 4A-4D), a renewal confidence score (explained in detail by way of FIGS. 4A-4D) for creation of the plurality of prospect clusters 212. The results from the customer relationship score, the offering performance score, and the renewal confidence score may be deployed by the first artificial intelligence component 208.

The baseline clustering algorithms may segregate (explained in detail by way of subsequent Figs.) the prospects based on associated prospect data 204 according to, for example, the LRFM, number of years in association with a prospect, number of years a prospect may have been operational, usage details and the like. The first artificial intelligence component 208 may augment the data provided to the baseline clustering algorithms from the plurality of data sources (explained in detail by way of FIGS. 4A-4D). The plurality of prospect clusters 212 may be created so that each prospect cluster may have prospects with similar operation profiles such as similar LRFM, number of years in association with a prospect, number of years a prospect may have been operational, usage details and the like. Additionally, the plurality of prospect clusters 212 may be created so that each prospect cluster may be unique. Each of the plurality of prospect clusters 212 may comprise at least one prospect from the plurality of prospects 206.

In accordance with various embodiments of the present disclosure, the data analyzer 130 may create multiple sets of the plurality of prospect clusters 212. The data analyzer 130 may deploy various algorithms for creating the plurality of prospect clusters 212. As mentioned above, the first artificial intelligence component 208 may deploy multiple baseline clustering algorithms such as Gaussian Mixture Models (explained by way of subsequent Figs.), Fuzzy C-Means models (explained by way of subsequent Figs.), and K-means clustering models (explained by way of subsequent Figs.) for creation of the plurality of prospect clusters 212. The data analyzer 130 may identify a set of the plurality of prospect clusters 212 from among the multiple sets of the plurality of prospect clusters 212 based on the evaluation of each of the multiple sets of the plurality of prospect clusters 212. The first artificial intelligence component 208 may evaluate an output generated by each of the baseline clustering algorithms. The data analyzer 130 may generate the plurality of prospect clusters 212 based on a consensus derived from an evaluation of results achieved by deployment of multiple the baseline clustering algorithms (explained in detail by way of FIGS. 6A-6G). The results from the application of the baseline clustering algorithms may be referred to as dark knowledge. The first artificial intelligence component 208 may process the dark knowledge extracted from the application of the baseline clustering algorithms using a data centroid based approach for reducing data dimensionality in the plurality of prospect clusters 212 (explained in detail by way of FIGS. 7A-7B). The reduction data dimensionality may lead to an accurate analysis of large datasets and optimal utilization of resources associated with the system 110. The plurality of prospect clusters 212 may be data-driven prospect segments that may be used by the system 110 for resolution of the query 202.

The data analyzer 130 may implement the first artificial intelligence component 208 to determine a cluster significance value 214 (explained in detail by way of FIGS. 8A-8B) for each of the plurality of prospect clusters 212. The cluster significance value 214 may be associated with the significance of a prospect cluster amongst the plurality of prospect clusters 212. The cluster significance value 214 may indicate the value of a prospect for an organization. For example, a high cluster significance value 214 may indicate the prospect may be of significant importance. Such an indication may facilitate the creation of effective prospect retention measures for efficient client relationship management. The system 110 may identify a threshold cluster significance value 214. In an example, a user of the system 110 may identify the threshold cluster significance value 214. In an example, the first artificial intelligence component 208 may identify the threshold cluster significance value 214 based on the prospect data 204. In accordance with various embodiments of the present disclosure, the system 110 may only consider the plurality of prospect clusters 212 that may have the cluster significance value 214 above the threshold cluster significance value 214.

The propensity predictor 140 may implement a second artificial intelligence component 216 to determine a prospect churn value 218 based on the cluster significance value 214 for each of the plurality of prospect clusters 212. For the purpose of the disclosure, the term "churn propensity" may be referred to as the propensity of a prospect to leave a particular organization. For the purpose of the disclosure, the term "churn" may refer to an act of a prospect leaving a particular organization. The second artificial intelligence component 216 may implement various supervised learning models for determination of the prospect churn value 218 for each of the plurality of prospect clusters 212 (explained in detail by way of FIGS. 4A-4D). The propensity predictor 140 may implement the second artificial intelligence component 216 on the plurality of prospect clusters 212 for determination of the prospect churn value 218. The prospect churn value 218 may be associated with a probability of retention of the plurality of prospects 206. The prospect churn value 218 may indicate the probability of prospect churning. The system 110 may identify a threshold prospect churn value 218. In an example, the second artificial intelligence component 216 may identify the threshold prospect churn value 218 based on historical data. In an example, a user of the system 110 may identify the threshold prospect churn value 218. The propensity predictor 140 may predict prospect retention based on the prospect churn value 218. For example, the propensity predictor 140 may predict the plurality of prospect clusters 212 with the prospect churn value 218 above the threshold prospect churn value 218 to have a higher probability of leaving a particular organization.

The propensity predictor 140 may implement the second artificial intelligence component 216 to identify a first product associated with each of the plurality of prospect clusters 212. The propensity predictor 140 may implement the second artificial intelligence component 216 to obtain product data associated with the first product (also referred to as "identified product" hereinafter) from the plurality of data sources. The identified product may include the product (s) and/or service(s) that may have been procured by a prospect in the past. The identified product may include the products and/or services that may have been currently subscribed to by a prospect. In accordance with various embodiments of the present disclosure, the product data may refer to data related to various products, which are sold by an organization. For example, the product data may include the cost of products, product hierarchy, service prices, marginal prices, gross margins across various geographical regions, profit margins across various geographical regions, gross margins across product category, profit margins across product category, permissible discounts across various geographical regions, permissible discounts across products, and the like. For sake of brevity and technical clarity only a few examples of product data have been mentioned herein, however, it should clear to a person skilled in the art that product data may include any type of data associated with a product associated with an organization implementing the system 110.

The propensity predictor 140 may implement the second artificial intelligence component 216 to determine a set of significant prospect clusters 222 from among the plurality of prospect clusters 212. The significant prospect cluster being a prospect cluster having the cluster significance value 214 above a threshold cluster significance value 214 and having the prospect churn value 218 above a threshold prospect churn value 218. As mentioned above the data analyzer 130 may identify the prospects classified into the plurality of prospect clusters 212 with the cluster significance value 214 above the threshold cluster significance value 214 as "high value" prospects. As mentioned above, the propensity predictor 140 may identify the prospects classified into the plurality of prospect clusters 212 with the prospect churn value 218 above the threshold prospect churn value 218 to be "high churning propensity" prospects. The propensity predictor 140 may collate the "high value" prospects and the "high churning propensity" prospects. In accordance with various embodiments of the present disclosure, the propensity predictor 140 may identify the prospect clusters from the plurality of prospect clusters 212 comprising the "high value" prospects and the "high churning propensity" prospects as the significant prospect clusters 222.

The propensity predictor 140 may implement the second artificial intelligence component 216 to determine a prospect pattern matrix 224 based on mapping each of the prospect clusters from the set of significant prospect clusters 222 with product data associated with the first product (explained in detail by way of FIGS. 9A-9B). The prospect pattern matrix 224 may be a classification matrix determined by the propensity predictor 140 to classify the significant prospect clusters 222 based on the identified product. In accordance with various embodiments of the present disclosure, the prospect pattern matrix 224 may be determined through mapping a volume of products procured by a prospect with a monetary value generated by product procurement by a prospect. The second artificial intelligence component 216 may determine an average volume of products procured by a prospect based on historical prospect data 204 for the plurality of prospects 206. The second artificial intelligence component 216 may determine an average monetary value generated by product procurement by a prospect based on historical prospect data 204 for the plurality of prospects 206. The prospect pattern matrix 224 may comprise a plurality of patterns (explained in detail by way of FIGS. 9A-9B) indicative of a significance level for each of the significant prospect clusters 222. In accordance with various embodiments of the present disclosure, the plurality of patterns 226 may include a spender pattern, a value customer pattern, a frequenter pattern, and an uncertainer pattern. The propensity predictor 140 may classify the significant prospect clusters 222 into the plurality of patterns 226 based on the average volume of products and the average monetary value. For example, the significant prospect clusters 222 that may be mapped above the average monetary value and below the average volume of products may be classified under the spender pattern. The significant prospect clusters 222 that may be mapped below the average monetary value and above the average volume of products may be classified under the frequenter pattern. The significant prospect clusters 222 that may be mapped below the average monetary value and below the average volume of products may be classified under the uncertainer pattern. The significant prospect clusters 222 that may be mapped above the average monetary value and above the average volume of products may be classified under the value customer pattern (explained in detail by way of FIGS. 9A-9B).

The prospect recommender 150 may implement a third artificial intelligence component 230 to identify a set of products correlated to the first product associated with each of the plurality of patterns 226. The prospect recommender 150 may implement a third artificial intelligence component 230 to determine a prospect profile 228 for each of the plurality of patterns 226. The prospect profile comprising the set of products correlated to the first product. The set of products may be relevant for a prospect from the plurality of prospects 206. As mentioned above, each of the plurality of patterns 226 may be unique in their behavior towards monetary value generation and product volume requirements. Therefore, the prospect recommender 150 may process each of the plurality of patterns in a unique manner. For example, the prospect recommender 150 may generate the prospect profile 228 for the spender pattern, the prospect profile 228 for the frequenter pattern, the prospect profile 228 for the uncertainer pattern, and the prospect profile 228 for the value customer pattern. For example, the prospect recommender 150 may identify correlated products for the first product suitable for upselling for the significant prospect clusters classified under spender pattern (explained in further detail by way of FIGS. 9A-9B)

The third artificial intelligence component 230 may include implementation of various techniques such as rare itemset mining, product co-occurrence mapping, clique's discovery, frequent itemset mining and the like for correlating the first product with the prospect data 204 associated with the plurality of prospects 206 for identification of the set of correlated products. For the purpose of the disclosure, the term "itemset" may refer to a product or a service offered by an organization. The prospect profile 228 may comprise the first product relevant for a prospect from the plurality of prospects 206 corresponding to the plurality of patterns 226. The prospect profile 228 may comprise the set of products correlated to the product associated with each of the plurality of patterns 226. The set of products being relevant for a prospect from the plurality of prospects 206.

The frequent itemset mining may be implemented by using an Apriori algorithm to discover a large number of frequently occurring products in the prospect data 204. The rare itemset mining may include discovering rare products from a set of unique products that may match with the intention of a prospect customer. The rare itemset mining may discover a relatively small number of very precise and high-quality products even if they have low frequency in the prospect data 204. The rare itemset mining may include a counting stage, a consistency stage, a de-noising stage, and a discovery stage. The counting stage may determine a co-occurrence count between various pairs of products. For example, the co-occurrence count may include determining the number of times a particular combination of products may be subscribed together for a prospect. The co-occurrence count may be converted to a consistency value at the consistency stage. The consistency value may quantify the significance of seeing each pair of items together. The co-occurrence consistencies may be cleaned up further with appropriate normalization at the de-noising stage. The rare product sets in the form of cliques may be discovered in the co-occurrence consistency matrix at the discovery stage. For the purpose of this disclosure, the term "cliques" may refer to a close-knit group of products that may be subscribed together by at least one prospect from the plurality of prospects 206. Various equations used for the rare itemset mining may be presented here.

$$X = \{X^{(n)} = \{x_l^{(n)}\}_{l=1}^{Ln} CV\}_{n=1}^{N}$$

V=Collection of all unique tokens in the contract data where token may be Offerings, Utilization Parameters, Customer attributes, and the like.

X=Number of contracts with N token in each contract

In an example, the counting stage may include determining three (3) types of counts namely, a co-occurrence count, a marginal count, and a total count. The co-occurrence count may be a count wherein both tokens may be present. The marginal count may include a number of pairs in which the token a occurred with some other token in the data. The total count may include a total number of pairs in which some token co-occurred with some other token in the transaction data. The co-occurrence count may follow the equation:

$$\varphi(\alpha, \beta) = \sum_{n=1}^{N} \delta(\alpha \in x^n)\delta(\beta \in x^n)$$

Where, φ(α,β)=Count of Pair of tokens occurring together
δ=Boolean, 1 if pair of tokens co-occur otherwise 0
n=No. of contracts
N=No. of tokens in each contract
The marginal count may follow the equation:

$$\varphi(a) = \sum_{\beta \in V, \alpha \neq \beta} \varphi(\alpha, \beta)$$

Where, φ(α,β)=Count of Pair of tokens occurring together
δ=Boolean, 1 if pair of tokens co-occur otherwise 0
n=No. of contracts
N=No. of tokens in each contract
The total count may follow the equation:

$$\varphi_0 = 1/2\Sigma_{\alpha \in V}\varphi(\alpha) = 1/2\Sigma_{\alpha \in V}\Sigma_{\beta \in V}\varphi(\alpha,\beta))$$

In accordance with various embodiments of the present disclosure, the prospect recommender 150 may derive a co-occurrence probability and a marginal probability based on Co-occurrence, Marginal and Total counts. In an example, the co-occurrence probability may follow the equation:

$$\text{Co-occurence Probability} = P(\alpha, \beta) = \frac{\varphi(\alpha, \beta)}{\varphi 0}$$

In an example, the marginal probability may follow the equation:

$$\text{Marginal Probability} = P(\alpha) = \frac{\varphi(\alpha)}{\varphi 0}$$

The consistency stage may include determining the consistency values to address the issue of high co-occurrence noise and low co-occurrence signals so that a small number of very precise and high-quality rare item sets may be derived. In an example, the consistency stage may follow the following equations for determining the consistency values.

Cosine Function Based $$\emptyset_{csn}(\alpha, \beta) = \frac{P(\alpha, \beta)}{\sqrt{P(\alpha)P(\beta)}} \epsilon[0,1]$$

Point-Wise Mutual Information $$\emptyset_{pmi}(\alpha, \beta) = \max\left\{0, \log\left(\frac{P(\alpha, \beta)}{p(\alpha) + P(\beta)}\right)\right\} \epsilon[0, \infty]$$

Jaccard Coefficient $$\emptyset_{jca}(\alpha, \beta) = \frac{P(\alpha, \beta)}{p(\alpha) + P(\beta) - P(\alpha, \beta)} \epsilon[0,1]$$

Normalized Point-Wise Mutual Information $$\emptyset_{nmi}(\alpha, \beta) = \frac{\emptyset pmi(\alpha, \beta)}{-\log P(\alpha, \beta)} \in [0,1]$$

The de-noising stage may implement an iterative denoising algorithm using the co-occurrence consistencies to remove noisy co-occurrence counts. The de-noising stage may follow the equation:

$$\varphi^{t+1}(\alpha+\beta) \leftarrow \varphi^{(0)}(\alpha,\beta)\delta(\emptyset^{(t)}(\alpha,\beta) > \theta_{consy})$$

Where, $\varphi^{t+1}(\alpha,\beta)$=Co-occurrence count of t+1 iteration, and $\emptyset^{(t)}(\alpha,\beta)$=Co-occurrence consistency in t iteration The discovery stage may finalize all maximal cliques in the binarized co-occurrence consistency to find the largest rare item sets.

In accordance with various embodiments of the present disclosure, the prospect recommender 150 may identify a plurality of rules 234 for determining the prospect profile 228. The plurality of rules 234 may facilitate determining a correlation amongst the set of products and the product associated with each of the significant prospect clusters 222. The prospect recommender 150 may generate the plurality of rules 234 based on the techniques of the clique's discovery.

In an example, the plurality of rules 234 for rare itemset mining may be generated from the clique's discovery as follows:

For each frequent itemset, L generates all nonempty subsets of L.

For every nonempty subset $S$ of $L$, output the rule $"S => (L-S)"$ if $\frac{\text{support\_count}(L)}{\text{support\_count}(S)} \geq \text{min\_confidence}$ Because the rules are generated from frequent item sets, each one automatically satisfies the minimum support The plurality of rules 234 may be based on a determination of a support, a confidence and a lift. The support may be an indication of how frequently an itemset appears in a dataset such as the prospect data 204. The support may be determined by following an equation:

$$\text{support}(\alpha) = \frac{|(t \in T; \alpha \subset t)|}{|t|}$$

The confidence may be an indication of how often a rule may have been found to be true. The confidence may be determined by following an equation:

$$\text{confidence}(\alpha \to \beta) = \frac{\text{support}(\alpha \cup \beta)}{\text{support}(\alpha)}$$

The lift may be a ratio of observed support to that expected if $\alpha$ and $\beta$ were independent. The lift may be determined by following an equation:

$$\text{lift}(a \to \beta) = \frac{\text{support}(\alpha \cup \beta)}{\text{support}(\alpha) \times \text{support}(\beta)}$$

The prospect recommender 150 may implement the third artificial intelligence component 230 to assign a confidence score 232 (also referred to as similarity score hereinafter) to each of the correlated products associated with the prospect profile 228. The confidence score 232 may indicate a degree of similarity between various products. The confidence score 232 may indicate a degree of relevance of the products correlated to the first product for a prospect from the plurality of prospects. In accordance with various embodiments of the present disclosure, the prospect recommender 150 may assign the confidence score 232 based on mapping the prospect data 204 associated with the prospect profile 228 with the plurality of rules 234. The similarity score may be calculated between the plurality of rules 234 generated through the rare item set and the prospect data 204 associated with a prospect of interest. The similarity score may be calculated using a cosine similarity formula:

$$\cos\theta = \frac{\vec{a}.\vec{b}}{\|\vec{a}\|\|\vec{b}\|}$$

Where "a" may stand for relevant prospect data 204, and "b" may stand for the plurality of rules 234.

Cosine value 1 is for when there are similarities between the plurality of rules 234 and the prospect data 204.
Cosine value 0 may be assigned for unrelated products.
Cosine value −1 is for when there are no similarities between the plurality of rules 234 and prospect data 204.

The prospect recommender 150 may implement the third artificial intelligence component 230 to generate a prospect assessment result 236 corresponding to the prospect assessment requirement. The prospect assessment result 236 may comprise the prospect profile 228 comprising the first product above a threshold confidence score 232 relevant for the resolution of the query 202. The prospect assessment result 236 may include recommendations for various products, and/or services for a prospect based on the prospect profile 228 and corresponding pattern from the plurality of patterns 226.

In accordance with various embodiments of the present disclosure, the prospect recommender 150 may create a product recommendation library by associating the prospect profile 228 with the prospect assessment requirement. The prospect recommender 150 may store all the confidence scores 228 generated for resolving all queries similar to the query 202 mentioned above in the form of the product recommendation library. The product recommendations library may include product recommendations associated with historical prospect assessment requirements. The prospect recommender 150 may further deploy the product recommendation library to validate the prospect profile 228 for generation of the prospect assessment result 236.

The prospect recommender 150 may implement the third artificial intelligence component 230 to perform a prospect assessment action based on the prospect assessment result 236 for the resolution of the query 202. The prospect assessment action may include executing the prospect assessment result 236. In accordance with an embodiment of the present disclosure, the prospect recommender 150 may perform prospect assessment action automatically for generating the product recommendations based on the prospect profile 228. In accordance with an embodiment of the present disclosure, the prospect recommender 150 may be configurable to obtain input from the user for generating the product recommendations based on the prospect profile 228 as well as configurable to generate the product recommendations based on the prospect profile 228 automatically. In an example, the prospect assessment action may include implementing uniform retention strategies specific to the plurality of patterns 226 such as the spender pattern, the value customer pattern, the frequenter pattern, and the uncertainer pattern. The prospect assessment action may include segmentation of high churner propensity prospects from the plurality of prospects 206 so that appropriate retention measures may be developed for such prospects. The prospect assessment action may include the identification of multiple near-optimal solutions to identify churn propensity of the plurality of prospects 206.

The embodiments for the first artificial intelligence component 208, the second artificial intelligence component 216, and the third artificial intelligence component 230 presented herein are exemplary in nature and should be treated as such. The first artificial intelligence component 208, the second artificial intelligence component 216, and the third artificial intelligence component 230 may deploy tools and techniques from Python®, such as Representational state transfer (REST) framework, and Flask microframework. The first artificial intelligence component 208, the second artificial intelligence component 216, and the third artificial intelligence component 230 may deploy an AngularJS® JavaScript-based open-source front-end web framework. For the sake of brevity and technical clarity, the description of a prospect assessment system may be restricted to few exemplary embodiments, however, to a person skilled in the art it should be clear that the system may be used for the fulfillment of various prospect assessment requirements other than those mentioned hereinafter.

Figure 3:
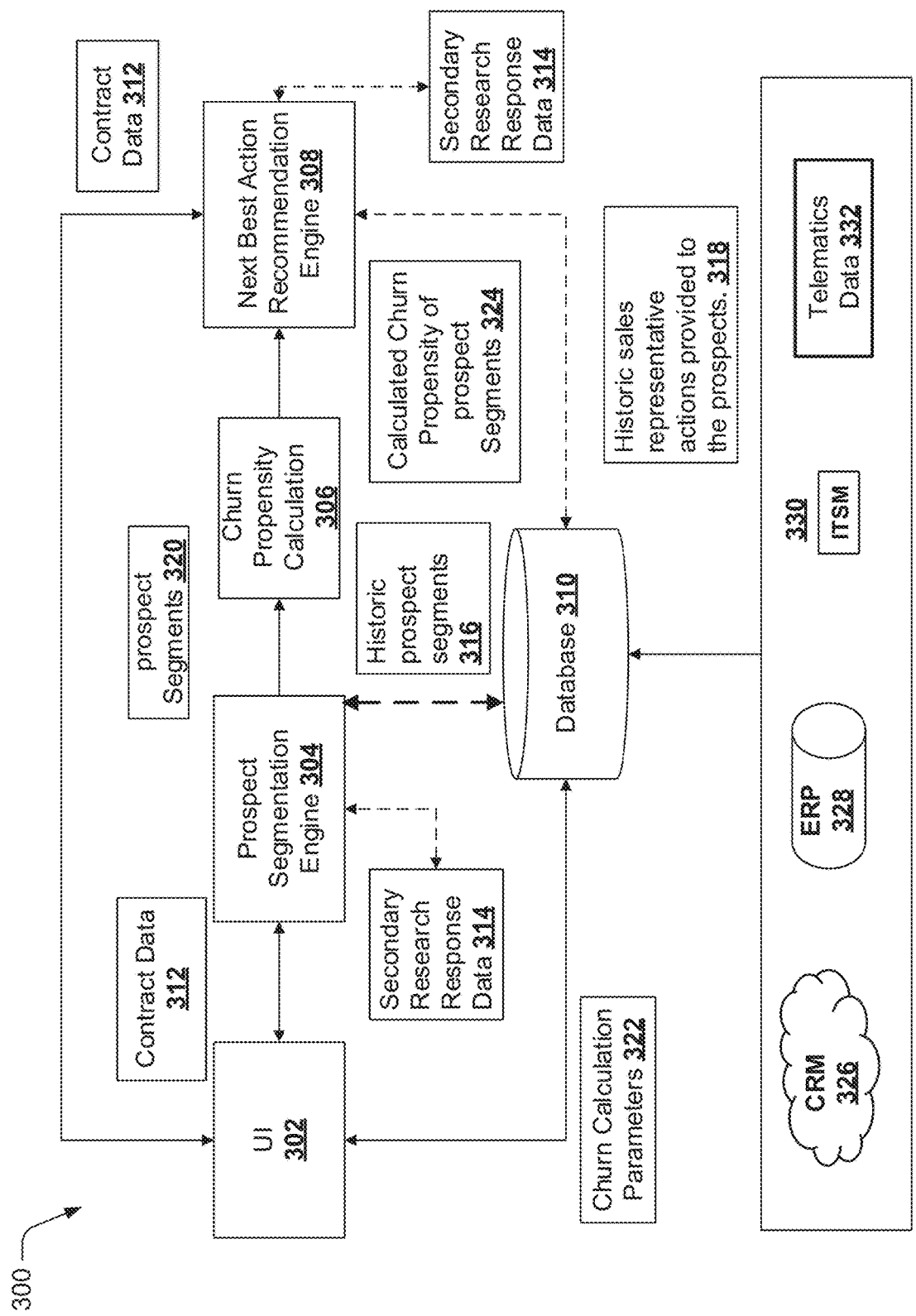
FIG. 3 illustrates an architectural flow diagram for a prospect assessment system, according to an example embodiment of the present disclosure.

FIG. 3 illustrates an architectural flow diagram 300 for the prospect assessment system 110, according to an example embodiment of the present disclosure. For the sake of brevity, construction and operational features of the system 110 which are explained in detail above are not explained in detail herein. The flow diagram 300 may include a user-interface 302. The user-interface 302 may be used by a user of the system 110 for interacting with the system 110. The flow diagram 300 may further include a database 310, a prospect segmentation engine 304, a churn propensity calculation engine 306, and a next best action recommendation engine 308. The system 110 may deploy the user-interface 302 for providing the next best action recommendation 308 to a user of the system 110. The database 310 may receive input from a client relationship management team 326, an enterprise resource planning software 328, an information technology service management team 330, and a set of telematics data 320. In an example, the prospect segmentation engine 304, the churn propensity calculation engine 306, and the next best action recommendation engine 308 may include the implementation of any of the first artificial intelligence component 208, the second artificial intelligence component 216, and the third artificial intelligence component 230.

The prospect segmentation engine 304 may perform prospect segmentation (explained in detail by way of FIGS. 4A-4D) to generate a set of prospect segments 320. The prospect segmentation engine 304 may ingest contract data 312 and secondary research response data 314 for prospect segmentation. The contract data may be a part of the prospect data 204. The secondary research response data 314 may be a part of the plurality of data sources as mentioned above. The system 110 may deploy the user-interface 302 for ingesting contract data 312. The prospect segmentation engine 304 may be coupled to the database 310 for storing the set of prospect segments 320. The prospect segmentation engine 304 may obtain input from the database 310 to generate a set of prospect segments 320. The input may in the form of a set of historic prospect segments 316. The set of historic prospect segments 316 may have been generated by the prospect segmentation engine 304 for processing a historical prospect assessment requirement and stored into the database.

The churn propensity calculation 306 may obtain input from the prospect segmentation engine 304. In an example, the input may be the set of prospect segments 320. The churn propensity calculation 306 may calculate the prospect churn value 218 (explained in detail by way of FIGS. 4A-4D) for each of the prospect segments from the set of prospect segments 320. The prospect churn value 218 may be calculated based on a set of churn calculation parameters 322 (explained in detail by way of FIGS. 4A-4D). The set of churn calculation parameters 322 may be stored in the database 310. In an example, a user of the system 110 may access the set of churn calculation parameters 322 through the user-interface 302. The churn propensity calculation engine 306 may generate a churn propensity set 324. The churn propensity set 324 may include the prospect churn value 218 for each of the prospect segments from the set of prospect segments 320. The churn propensity calculation engine 306 may be coupled to the database 310 to store the churn propensity set 324 for each of the prospect segments from the set of prospect segments 320.

The next best action recommendation engine 308 may generate the prospect assessment result 236 for the user for the resolution of the query 202 (explained in detail by way of FIGS. 4A-4D). The next best action recommendation engine 308 may obtain input from the secondary research response data 314, the contract data 312, the database 310, and the churn propensity set 324. The next best action recommendation engine 308 may be coupled to the database 310 to store the prospect assessment result 236 therein. In an example, the next best action recommendation engine 308 may provide a historic action 318 to a user of the system 110. The historic action 318 may include historic sales representative actions provided to the prospects.

Figure 4A:
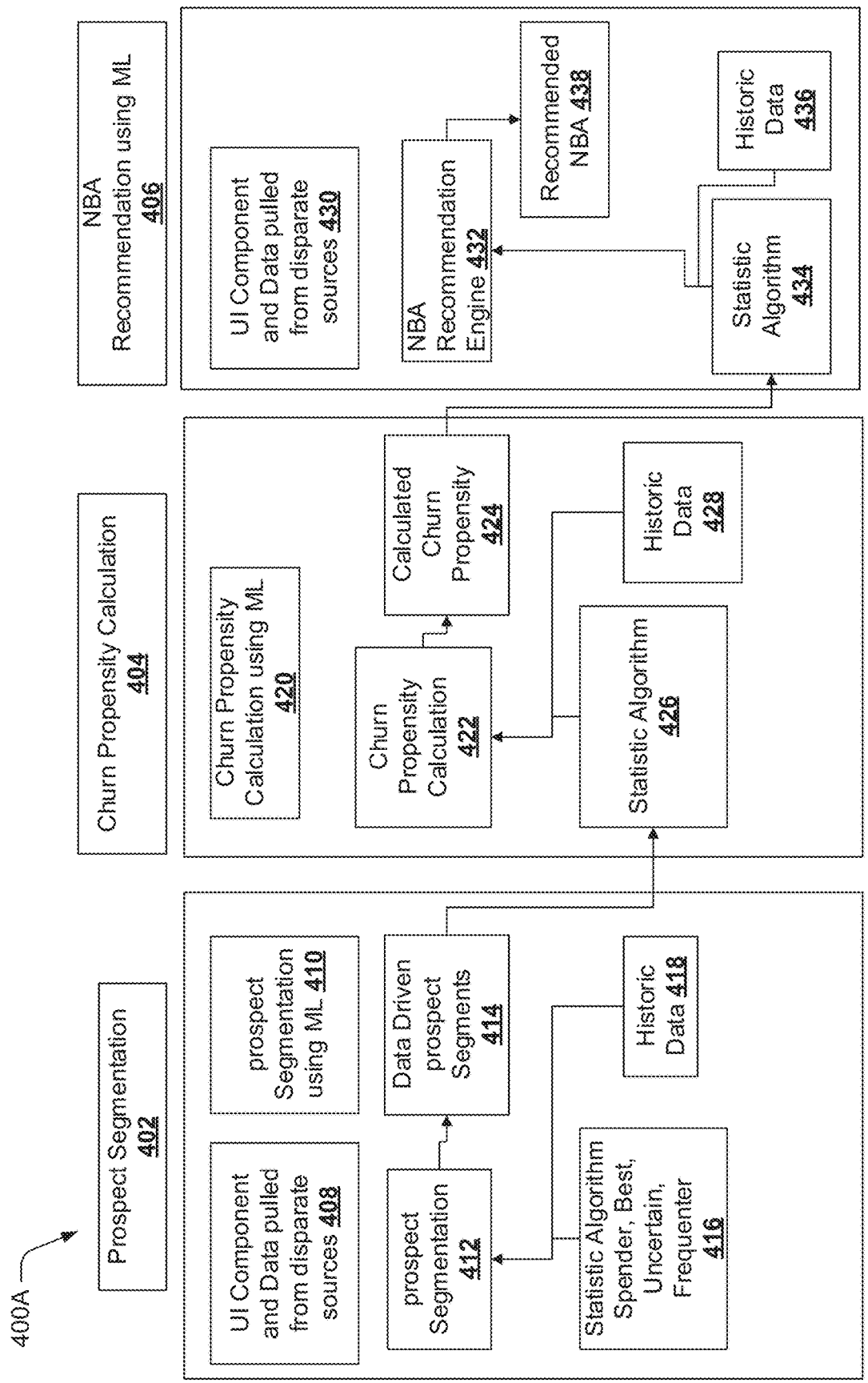
FIG. 4A illustrates a flow diagram for prospect assessment using a prospect assessment system, according to an example embodiment of the present disclosure.

FIG. 4A illustrates a flow diagram 400A for prospect assessment using the prospect assessment system 110, according to an example embodiment of the present disclosure. For the sake of brevity, construction and operational features of the system 110 which are explained in detail above are not explained in detail herein.

The flow diagram 400A may describe a prospect segmentation 402, a churn propensity calculation 404, and a prospect recommendation 406. The prospect segmentation 402, a churn propensity calculation 404, and a prospect recommendation 406 may be executed by the system 110 based in implementing any of the first artificial intelligence component 208, the second artificial intelligence component 216, and the third artificial intelligence component 230 for the resolution of the query 202.

The prospect segmentation 402 may include a user interface 408, a machine learning component 410, a static algorithm 416, and a set of historic data 418. The user-interface 408 may be used to pull prospect data 204 from disparate sources. The machine learning component 410, a static algorithm 416, and a set of historic data 418 may be used for a prospect segmentation process 412. The outcome of the prospect segmentation process 412 may be the creation of prospect segments 414. The prospect segments 414 may be data-driven segments created for the plurality of prospects 206. In an example, the prospect segments 414 may be the plurality of prospect clusters 212. The prospect segmentation process 412 may be explained in detail by way of FIG. 4B.

The churn propensity calculation 404 may include a machine learning component 420, a static algorithm 426, and a set of historic data 428. The static algorithm 426 may obtain the prospect segments 414 as input. The churn propensity calculation 404 may use the machine learning component 420, the static algorithm 426, the set of historic data 428 to execute a churn propensity calculation process 422. The outcome of the churn propensity calculation process 422 may be the determination of a churn propensity value 424 for each of the prospect segments 414. The churn propensity value 424 may be the prospect churn value 218. The churn propensity calculation process 422 may be explained in detail by way of FIG. 4C.

The prospect recommendation 406 may include a user interface 430, a static algorithm 434, and a set of historic data 436. The static algorithm 434 may obtain the churn propensity value 424 as in input. The prospect recommendation 406 may use the user interface 430, the static algorithm 434, and the set of historic data 436 to execute a recommendation process 432. The outcome of the recommendation process 432 may be the generation of a recommended action 438. The recommended action 438 may be the next best action that may be taken by an organization for prospect retention. In an example, the recommended action 438 may be the prospect assessment result 236. The recommendation process 432 may be explained in detail by way of FIG. 4D.

Figure 4B:
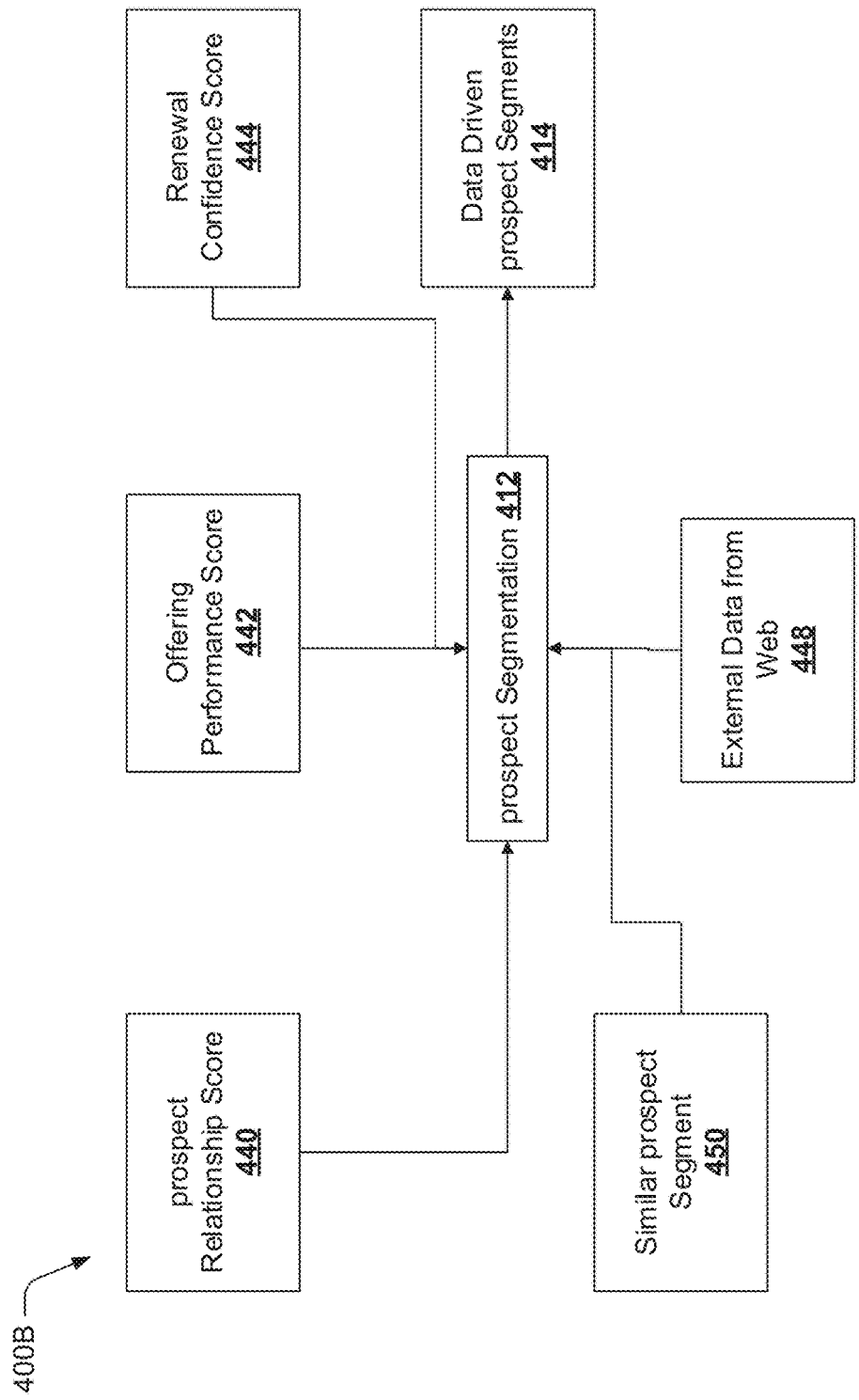
FIG. 4B illustrates a flow diagram for prospect segmentation using a prospect assessment system, according to an example embodiment of the present disclosure.

FIG. 4B illustrates a flow diagram 400B for the prospect segmentation 402 using the prospect assessment system 110, according to an example embodiment of the present disclosure. For the sake of brevity, construction and operational features of the system 110 which are explained in detail above are not explained in detail herein. As mentioned above, the prospect segmentation 402 may include the prospect segmentation process 412. The prospect segmentation process 412 may include implementation of at least one of the first artificial intelligence component 208, the second artificial intelligence component 216, and the third artificial intelligence component 230. The prospect segmentation process 412 may include obtaining input from an external data component 448. The external data component 448 may be a part of the plurality of data sources as mentioned above. The prospect segmentation process 412 may include determination of a prospect relationship score 440, an offering performance score 442, a renewal confidence score 444, a similar prospect segment data 450. The similar prospect segment data 450 may be obtained for the prospect segmentation process 412 from the historical prospect data 204. In accordance with various embodiments of the present disclosure, the prospect relationship score 440, the offering performance score 442, and the renewal confidence score 444 may include analysis of various attributes from the plurality of attributes 210. As mentioned above, the data analyzer 130 may implement a first artificial intelligence component 208 to map the plurality of attributes 210 with the plurality of prospects 206 to create a plurality of prospect clusters 212.

In an example, the plurality of attributes 210 analyzed for determination of the prospect relationship score 440 may include monthly recurring revenue change, number of days since last payment, customer satisfaction score, offering value, service level agreement breaches, net promoter score, customer acquisition cost, customer effort score, customer loyalty index, number of customer referrals, sales team response time, average resolution time, customer lifetime value, number of customer testimonials, and the like. In an example, the plurality of attributes 210 analyzed for determination of the offering performance score 442 may include request outside entitlement, monthly entitlement utilization, number of upgrades, offering age, offering relevance, offering up time, upselling ratio, number of opportunities won, number of opportunities lost, dollar value of past purchases, average deal size, and the like. In an example, the plurality of attributes 210 analyzed for determination of the renewal confidence score 444 may include number of renewals done, number of days for renewal, days sales outstanding, remaining value of terminated contract, missed milestones, days of contract lifecycle, days in delay of approvals, close rate, number of customer testimonials, client contribution, and the like.

In an example, the external data component 448 may include mining of factors such as industry outlook, industry & segment growth potential, market growth potential (geography), revenue across segments and geographies, competitors' products, organization model, product differentiation/substitutes, and the like. In an example, the similar prospect segment data 450 may include mining of factors such as customer class, customer type, fixed one-time amount, actual bill amount, deferred revenue, usage parameters, last service breach, and the like. The prospect segmentation process 412 may process information from the external data component 448, the similar prospect segment data 450, the prospect relationship score 440, the offering performance score 442, and the renewal confidence score 444 to generate the prospect segments 414. The prospect segmentation process 412 may use various base line clustering algorithms (explained by way of FIGS. 6A-6G) for processing information received from the external data component 448, the similar prospect segment data 450, the prospect relationship score 440, the offering performance score 442, and the renewal confidence score 444 to generate the prospect segments 414

Figure 4C:
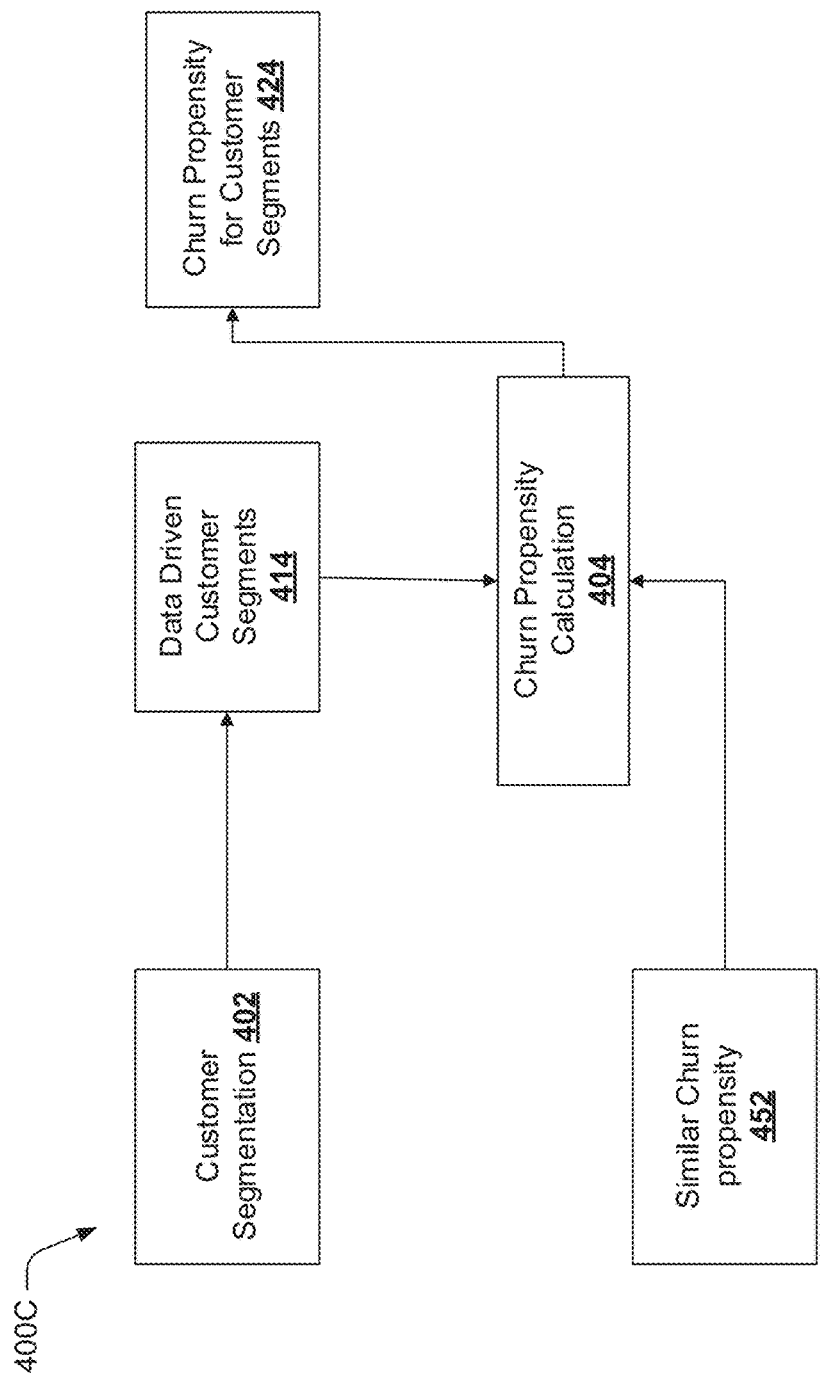
FIG. 4C illustrates a flow diagram for churn propensity calculation using a prospect assessment system, according to an example embodiment of the present disclosure.

FIG. 4C illustrates a flow diagram 400C for churn propensity calculation 404 using the prospect assessment system 110, according to an example embodiment of the present disclosure. For the sake of brevity, construction and operational features of the system 110 which are explained in detail above are not explained in detail herein. As mentioned above, the churn propensity calculation 404 may include the churn propensity calculation process 422. The churn propensity calculation process 422 may include implementation of at least one of the first artificial intelligence component 208, the second artificial intelligence component 216, and the third artificial intelligence component 230. The churn propensity calculation process 422 may derive input from the prospect segmentation process 412. In an example, the input may be the prospect segments 414. The churn propensity calculation process 422 may include analyzing a similar churn propensity data 452. In an example, the similar churn propensity data 452 may be stored in the historic data 428. In an example, the similar churn propensity data 452 may be stored in the historic data 428. In accordance with various embodiments of the present disclosure, the similar churn propensity data 452 may include mining and processing various factors such as contract tenure, number of days since last payment, number of days for renewal, actual bill amount, contract value, fixed one-time amount, renewal iteration, offering age, a book to bill ratio, deferred revenue, and the like. The churn propensity calculation process 422 may process the prospect segments 414 and the similar churn propensity data 452 using various techniques.

For the purpose of this disclosure, the prospect segments 414 that may include prospects that may be intending to leave an organization may be referred to as "churning population". For the purpose of this disclosure, the prospect segments 414 that may include stable prospects and may not be intending to leave an organization may be referred to as "non-churning population". In an example, the prospect segments 414 may include majority of "non-churning population" and a minority of "churning population", thereby creating an imbalanced classification. The imbalanced classification may be a supervised learning problem where one class may outnumber other class by a large proportion. The churn propensity calculation process 422 may be focused on identifying the "churning population" so that appropriate retention measures may be taken. The churn propensity calculation process 422 may balance the prospect segments 414 by using various classification balancing techniques for accurate calculation of the churn propensity value 424. The imbalance handling techniques may include techniques such as cost sensitive learning techniques, cluster based classifier techniques, and sampling techniques such as over sampling technique and under sampling technique. The cost sensitive learner's method evaluates the cost associated with misclassifying observations and tries to minimizes the error. The over sampling method may replicate the observations from minority class to balance the data. For example, the over sampling method may replicate the observations from the minority "churning population" and balance the data against the majority "non-churning population". The under sampling method reduces the number of observations from majority class to make the data set balanced. For example, the under sampling method reduces the number of observations from the majority "non-churning population" to balance the data set against the minority "churning population". The cluster based classifier techniques may divide the majority class such as the majority "non-churning population into "K" distinct clusters. There may be no overlap of observations among these clusters. The cluster based classifier techniques may train each of these clusters with all observations from minority class such as the minority "churning population". The cluster based classifier techniques may determine a final prediction based on an average result from clustering. The outcome of the churn propensity calculation process 422 may be determination of the churn propensity value 424.

Figure 4D:
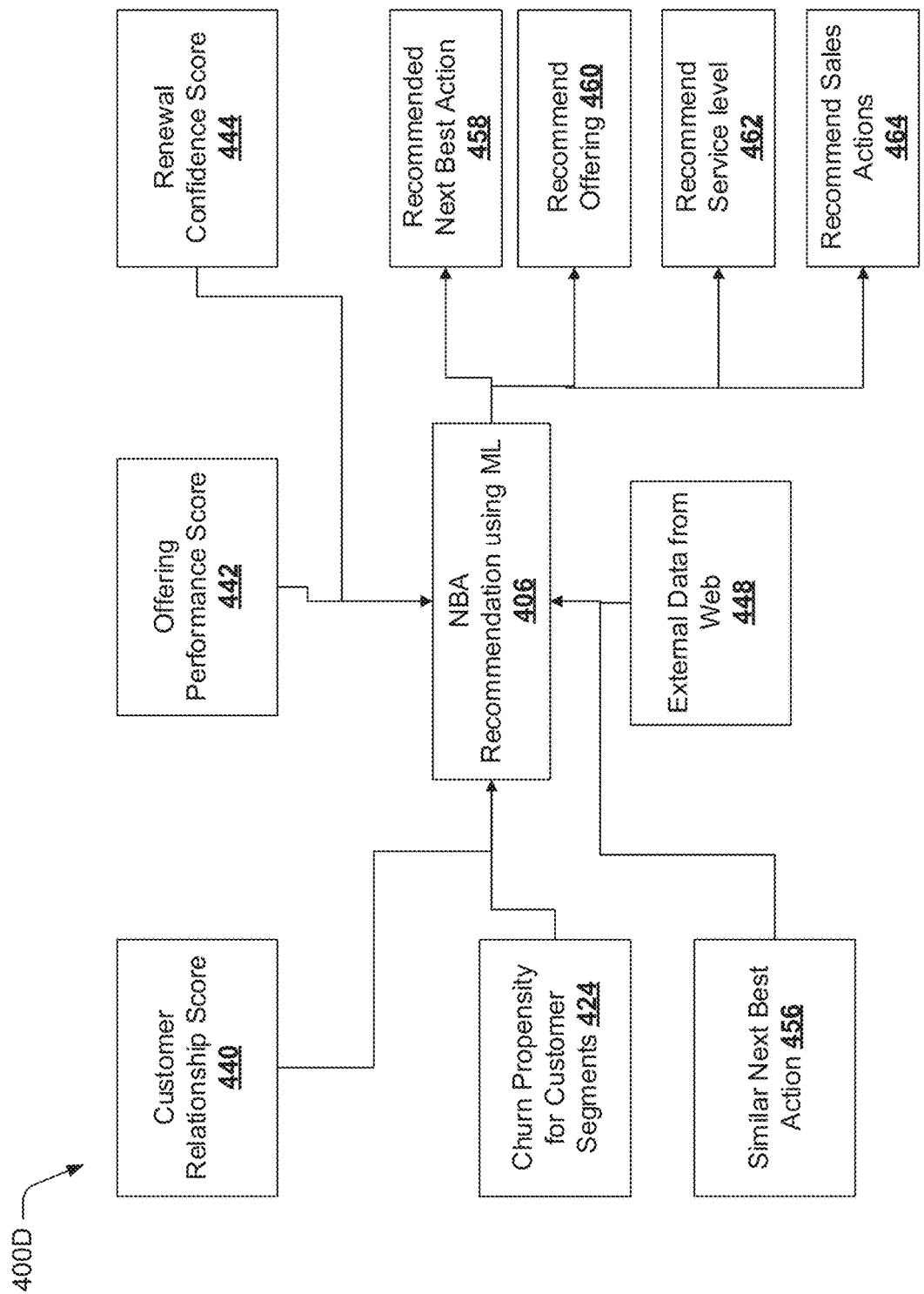
FIG. 4D illustrates a flow diagram for prospect recommendation using a prospect assessment system, according to an example embodiment of the present disclosure.

FIG. 4D illustrates a flow diagram 400D for prospect recommendation 406 using the prospect assessment system 110, according to an example embodiment of the present disclosure. For the sake of brevity, construction and operational features of the system 110 which are explained in detail above are not explained in detail herein. As mentioned above, the prospect recommendation 406 may include the recommendation process 432. The recommendation process 432 may include implementation of at least one of the first artificial intelligence component 208, the second artificial intelligence component 216, and the third artificial intelligence component 230. The recommendation process 432 may include obtaining input from an external data component 448. The external data component 448 may be a part of the plurality of data sources as mentioned above. The prospect segmentation process 412 may include determination of a prospect relationship score 440, an offering performance score 442, a renewal confidence score 444, a similar next best action data 456, and the churn propensity value 424.

In an example, the plurality of attributes 210 analyzed for determination of the prospect relationship score 440 may include monthly recurring revenue change, number of days since last payment, customer satisfaction score, offering value, service level agreement breaches, net promoter score, customer acquisition cost, customer effort score, customer loyalty index, number of customer referrals, sales team response time, average resolution time, customer lifetime value, number of customer testimonials, and the like. In an example, the plurality of attributes 210 analyzed for determination of the offering performance score 442 may include request outside entitlement, monthly entitlement utilization, number of upgrades, offering age, offering relevance, offering up time, upselling ratio, number of opportunities won, number of opportunities lost, dollar value of past purchases, average deal size, and the like. In an example, the plurality of attributes 210 analyzed for determination of the renewal confidence score 444 may include number of renewals done, number of days for renewal, days sales outstanding, remaining value of terminated contract, missed milestones, days of contract lifecycle, days in delay of approvals, close rate, number of customer testimonials, client contribution, and the like.

The churn propensity calculation process 422 may identify a threshold value for the churn propensity value 424. The recommendation process 432 may consider the prospect segment 414 that may have the churn propensity value 424 above the identified threshold for generating the recommended action 438. In an example, the external data component 448 may include mining of factors such as industry outlook, industry & segment growth potential, market growth potential (geography), revenue across segments and geographies, competitors' products, organization model, product differentiation/substitutes, and the like. In an example, the similar next best action data 456 may include mining of factors such as monthly entitlement utilization percentage (target vs actual), request outside entitlement percentage, a customer satisfaction score, contract relevance, service-level agreement breaches, service level, and the like. The recommendation process 432 may process information from the churn propensity value 424, the external data component 448, the similar next best action data 456, the prospect relationship score 440, the offering performance score 442, and the renewal confidence score 444 to generate a recommended best action 458, a recommended offering 460, a recommended service level 462, and a recommended sales action 464. The recommended best action 458, the recommended offering 460, the recommended service level 462, and the recommended sales action 464 may be a part of the prospect profile 228 and the prospect assessment result 236. In an example, the recommendation process 432 may implement techniques such as random forest, and XGBoost™ on the churn propensity value 424, the external data component 448, the similar next best action data 456, the prospect relationship score 440, the offering performance score 442, and the renewal confidence score 444 to generate the recommended best action 458, the recommended offering 460, the recommended service level 462, and the recommended sales action 464. In an example, the recommended best action 458 may include action notes such as "no action", "upsell or cross-sell", "improve customer engagement", and the like. The recommended offering 460 may include "keeping a present offering to a prospect same" or "increasing a present offering to a prospect". The recommended service level 462 may include "keeping a present service level to a prospect same" or "increasing a present service level to a prospect". The recommended sales action 464 may include notes such as for example, "sales rep should engage with the customer within 1 week and try to maintain customer satisfaction" In accordance with various embodiments of the present disclosure, the recommended best action 458, the recommended offering 460, the recommended service level 462, and the recommended sales action 464 may facilitate prospect retention.

Figure 5:
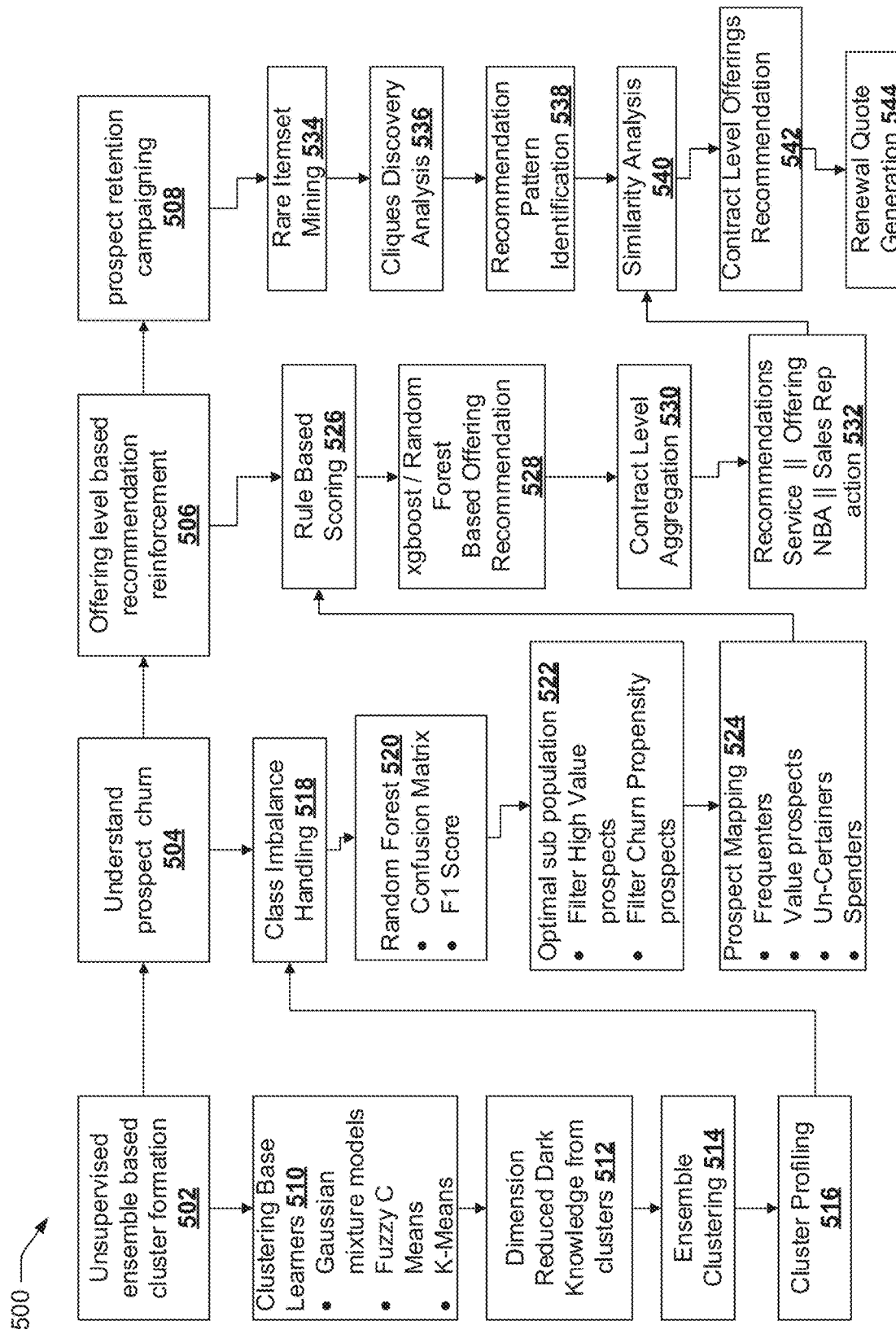
FIG. 5 illustrates a flow diagram for various stages of prospect assessment as deployed by a prospect assessment system, according to an example embodiment of the present disclosure.

FIG. 5 illustrates a flow diagram 500 for various stages of prospect assessment as deployed by the prospect assessment system 110, according to an example embodiment of the present disclosure. For the sake of brevity, construction and operational features of the system 110 which are explained in detail above are not explained in detail herein. The prospect assessment process using the system 110 may include a cluster formation stage 502, an understanding churn stage 504, an offering level recommendation stage 506, and a prospect retention campaigning stage 508. The cluster formation stage 502, the understanding churn stage 504, the offering level recommendation stage 506, and the prospect retention campaigning stage 508 may include implementation of any of the first artificial intelligence component 208, the second artificial intelligence component 216, and the third artificial intelligence component 230. The cluster formation stage 502 may include the implementation of a set of base learner algorithms 510 for unsupervised ensemble-based cluster formation. The set of base learner algorithms 510 may include algorithms such as such as Gaussian Mixture Models (explained by way of subsequent Figs.), Fuzzy C-Means models (explained by way of subsequent Figs.), and K-means clustering models (explained by way of subsequent Figs.) for creation of the plurality of prospect clusters 212 or the prospect segments 414. The cluster formation stage 502 may further include a cluster reduction 512. The cluster reduction 512 (explained by way of subsequent Figs.), may include the implementation of reduced clustering algorithms for processing dark knowledge generated by the implementation of the set of base learner algorithms 510. The cluster formation stage 502 may further include an ensemble clustering 514. The ensemble clustering 514 (explained by way of subsequent Figs.), may combine multiple clustering models to produce a better result than that of the individual clustering algorithms in terms of consistency and quality. As mentioned above, the data analyzer 130 may create multiple sets of the plurality of prospect clusters 212. The data analyzer 130 may create the multiple sets of the plurality of prospect clusters 212 using the set of base learner algorithms 510. The cluster reduction 512 and the ensemble clustering 514 may identify a set of the plurality of prospect clusters 212 from among the multiple sets of the plurality of prospect clusters 212 based on evaluation of each of the multiple sets of the plurality of prospect clusters 212. The cluster formation stage 502 may further include a cluster profiling 516. The cluster profiling 516 may include determination of the cluster significance value 214 (explained by way of subsequent Figs.).

The cluster formation stage 502 may be followed by the understanding churn stage 504. The understanding churn stage 504 may include a class imbalance handling 518 (described above). The class imbalance handling 518 may be implemented on the output generated by the cluster profiling 516. The class imbalance handling 518 may be followed by the implementation of a random forest technique 520 and the optimal sub-population techniques 522. The random forest techniques 520 and the optimal sub-population techniques 522 may be used to create the prospect pattern matrix 224 and identify the plurality of patterns 226. The random forest techniques 520 may include the implementation of techniques such as confusion matrix, and F1 score. The confusion matrix may be a table that may be used to describe the performance of a classification model (or a "classifier") on a set of test data for which the true values are known. The confusion matrix may allow the visualization of the performance of an algorithm. The F1 score may be a harmonic mean of the precision and recall, where an F1 score may reach its best value at 1 (perfect precision and recall) and worst at 0, wherein precision (also called positive predictive value) may be a fraction of relevant instances among the retrieved instances, while recall (also known as sensitivity) may be a fraction of the total amount of relevant instances that may be actually retrieved. The optimal sub-population techniques 522 may include filtering "high-value customers", and filtering "high churn propensity customers" from the prospect segments 414. The optimal sub-population techniques 522 may classify the prospect segments 414 having the cluster significance value 214 above the threshold cluster significance value 214 as "high-value customers". The optimal sub-population techniques 522 may classify the prospect segments 414 having the prospect churn value 218 above the threshold prospect churn value 218 as "high churn propensity customers". As mentioned above, the propensity predictor 140 may determine a set of significant prospect clusters 222 from among the plurality of prospect clusters 212, a significant prospect cluster being a prospect cluster having the cluster significance value 214 above a threshold cluster significance value 214 and having the prospect churn value 218 above a threshold prospect churn value 218.

The understanding churn stage 504 may further include a prospect mapping 524. The prospect mapping 524 may include classifying the "high-value customers", and filtering "high churn propensity customers" into the plurality of patterns 226. In accordance with various embodiments of the present disclosure, the plurality of patterns 226 may include a spender pattern, a frequenter pattern, an uncertainer pattern, and a value customer pattern based on a product procurement volume and product procurement frequency of associated prospects from the prospect segments 414 (explained further by FIGS. 9A-9B). As mentioned above, the propensity predictor 140 may determine a prospect pattern matrix 224 based on mapping each of the prospect clusters from the set of significant prospect clusters 222 with the associated product, the prospect pattern matrix 224 comprising a plurality of patterns 226 indicative of a significance level for each of the significant prospect clusters 222.

The understanding churn stage 504 may be followed by the offering level recommendation stage 506. The offering level recommendation stage 506 may include a rule-based scoring 526. The rule-based scoring 526 may be implemented on the result from the prospect mapping 524. The rule-based scoring 526 may include analysis of the churn propensity value 424, the external data component 448, the similar next best action data 456, the prospect relationship score 440, the offering performance score 442, and the renewal confidence score 444. The offering level recommendation stage 506 may further include generating a recommendation 528. The recommendation 528 may be a product or service offering based recommendation for a prospect based on the plurality of patterns 226 and the correlated products identified by the rule-based scoring 526. The recommendation 528 may be followed by a contract aggregation 530 wherein the system 110 may collate the offerings as suggested by the recommendation 528 with the prospect data 204 to generate a contract for a prospect. The contract aggregation 530 may be followed by a service level recommendation 532 (all described above by way of FIG. 4D).

The offering level recommendation stage 506 may be followed by the prospect retention campaigning stage 508. The prospect retention campaigning stage 508 may include a rare itemset mining 534 (described above) The rare itemset mining 534 may be implemented to identify the set of products correlated to the product associated with each of the plurality of patterns 226. The rare itemset mining 534 may be followed by a clique's discovery analysis 536 (described above). The clique's discovery analysis 536 may be followed by a recommended pattern identification 538 (explained further by way of FIG. 9A-9B). The prospect retention campaigning stage 508 may further include a similarity analysis 540 (described above). The similarity analysis 540 may lead to the generation of the contract level offering recommendation 542. The contract level offering recommendation 542 may include the recommended best action 458, the recommended offering 460, the recommended service level 462, and the recommended sales action 464. The contract level offering recommendation 542 may lead to the generation of a renewal quote 544 for a prospect.

Figure 6A:
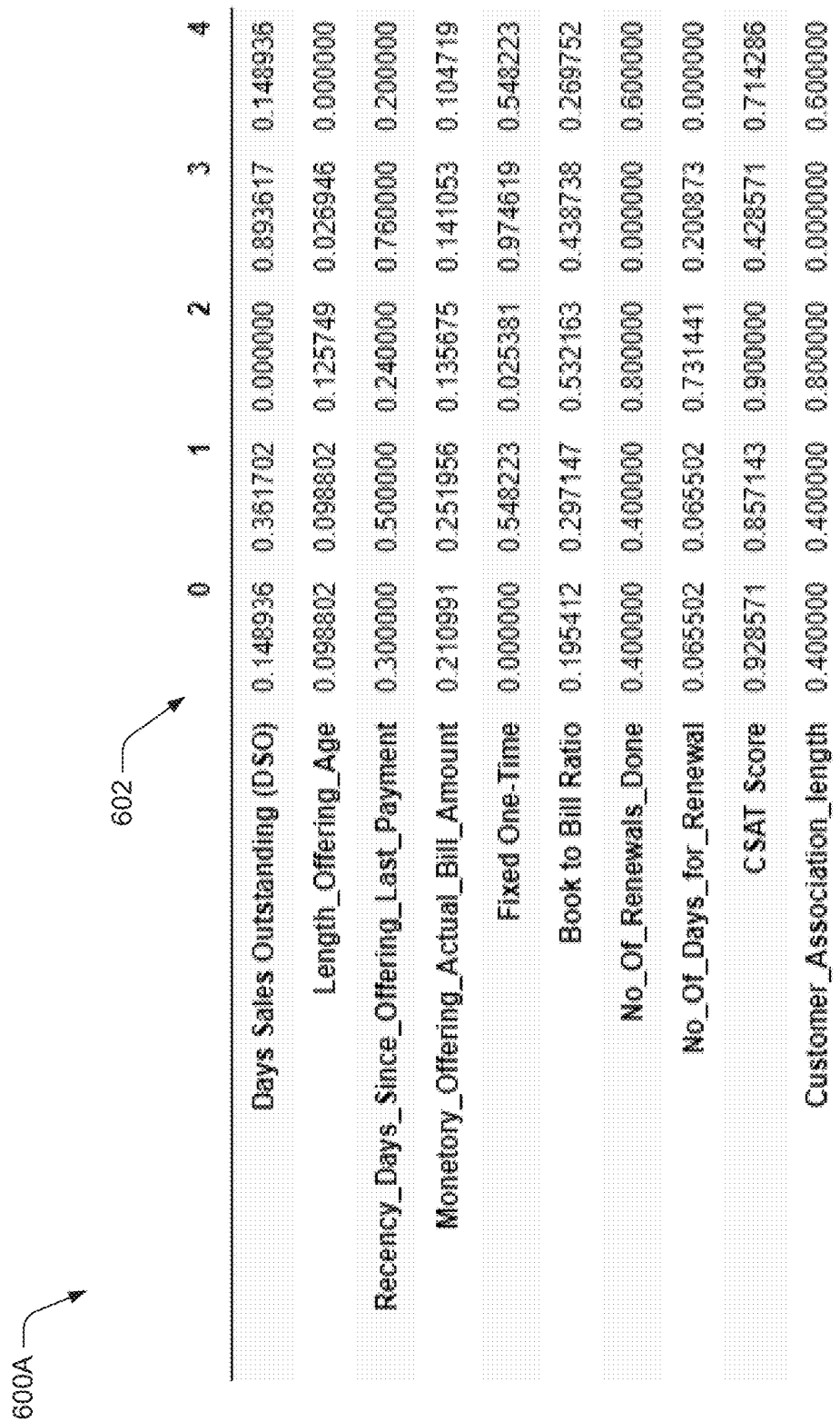
FIG. 6A illustrates a pictorial representation of prospect segmentation and clustering for prospect assessment as deployed by a prospect assessment system, according to an example embodiment of the present disclosure.

FIGS. 6A-6G illustrate exemplary data and implementation of the set of base learning algorithms 510. FIG. 6A illustrates a pictorial representation 600A of prospect segmentation and clustering for prospect assessment as deployed by the prospect assessment system 110, according to an example embodiment of the present disclosure. For the sake of brevity, construction and operational features of the system 110 which are explained in detail above are not explained in detail herein. The pictorial representation 600A illustrates exemplary data 602 on which the set of base learner algorithms 510 may be implemented to generate the prospect segments 414. The exemplary data 602 may include various attributes from the plurality of attributes 210 as mentioned by way of FIG. 4B.

Figure 6B:
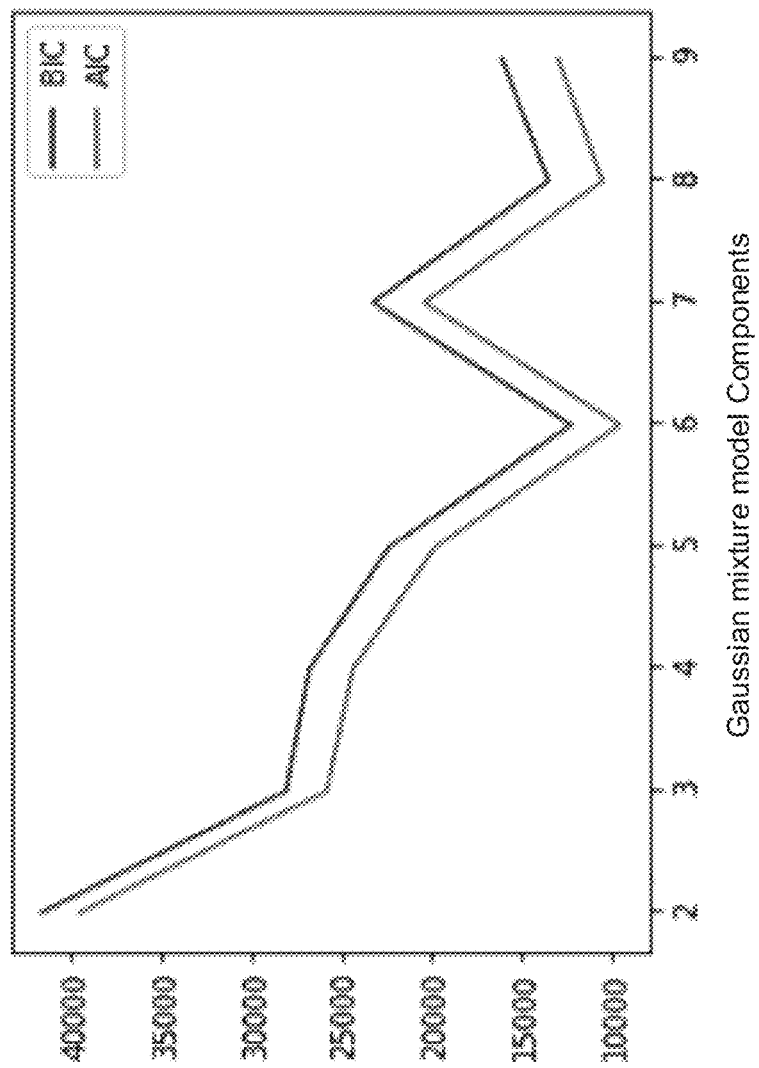
FIG. 6B illustrates a pictorial representation of prospect segmentation and clustering for prospect assessment as deployed by a prospect assessment system, according to an example embodiment of the present disclosure.

FIG. 6B illustrates a pictorial representation 600B of prospect segmentation and clustering for prospect assessment as deployed by the prospect assessment system 110, according to an example embodiment of the present disclosure. For the sake of brevity, construction and operational features of the system 110 which are explained in detail above are not explained in detail herein. The pictorial representation 600B may illustrate the implementation of the Gaussian Mixture Models on the exemplary data 602. The Gaussian Mixture Models may be probabilistic models for representing normally distributed subpopulations within an overall population.

Figure 6C:
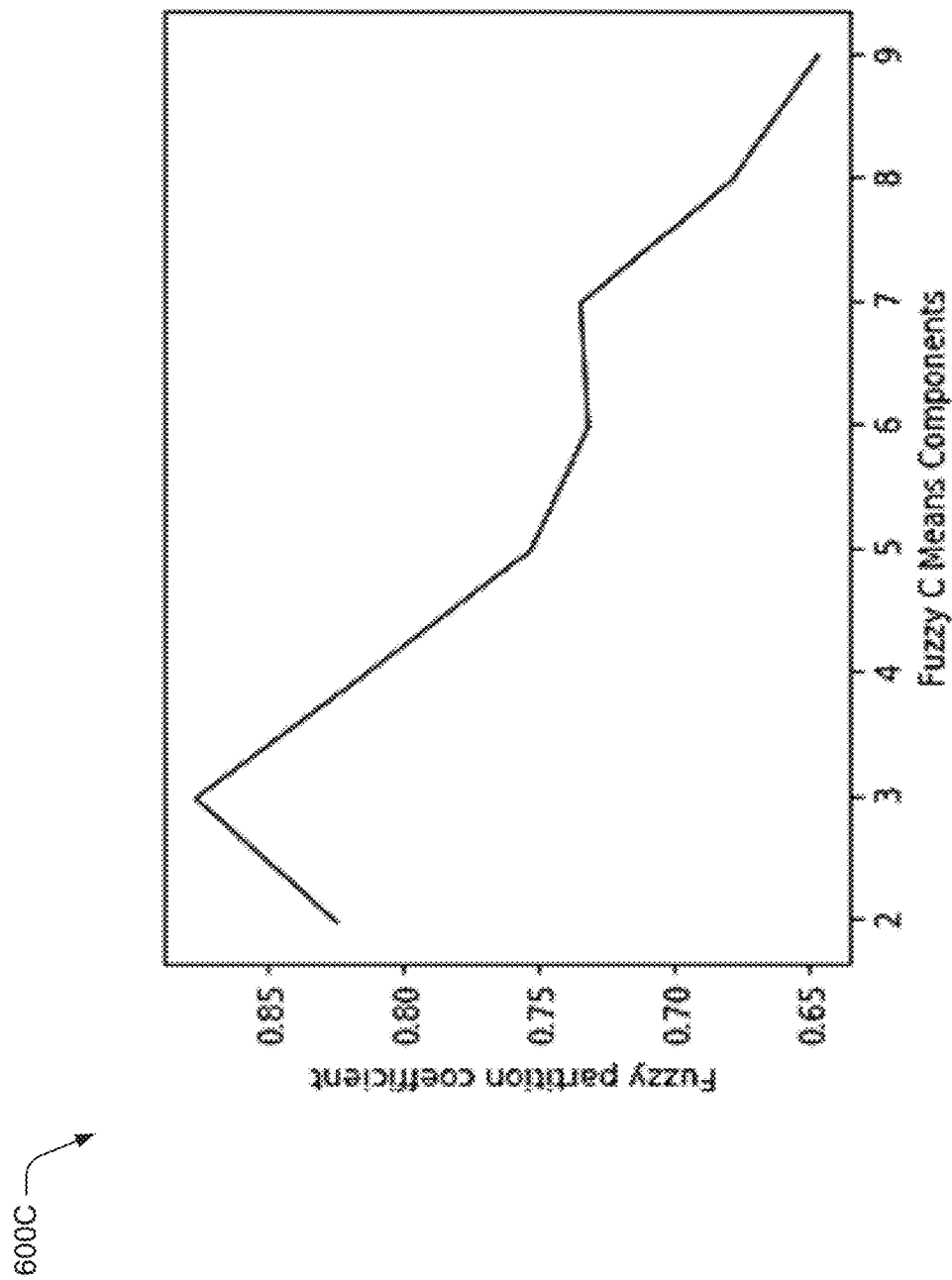
FIG. 6C illustrates a pictorial representation of prospect segmentation and clustering for prospect assessment as deployed by a prospect assessment system, according to an example embodiment of the present disclosure.

FIG. 6C illustrates a pictorial representation 600C of prospect segmentation and clustering for prospect assessment as deployed by the prospect assessment system 110, according to an example embodiment of the present disclosure. For the sake of brevity, construction and operational features of the system 110 which are explained in detail above are not explained in detail herein. The pictorial representation 600C may illustrate the implementation of the Fuzzy C-Means models on the exemplary data 602. The Fuzzy clustering may be a form of clustering in which each data point may belong to more than one cluster. The clustering or cluster analysis may involve assigning data points to all clusters such that items in the same cluster may be as similar as possible, while items belonging to different clusters may be as dissimilar as possible. The Fuzzy C-Means models may include mapping of a fuzzy partition coefficient with a set of fuzzy C means components. The fuzzy partition coefficient may be defined on the range from 0 to 1, with 1 being best. The fuzzy partition coefficient may be a metric that may indicate how cleanly a dataset may be described by a certain model.

Figure 6D:
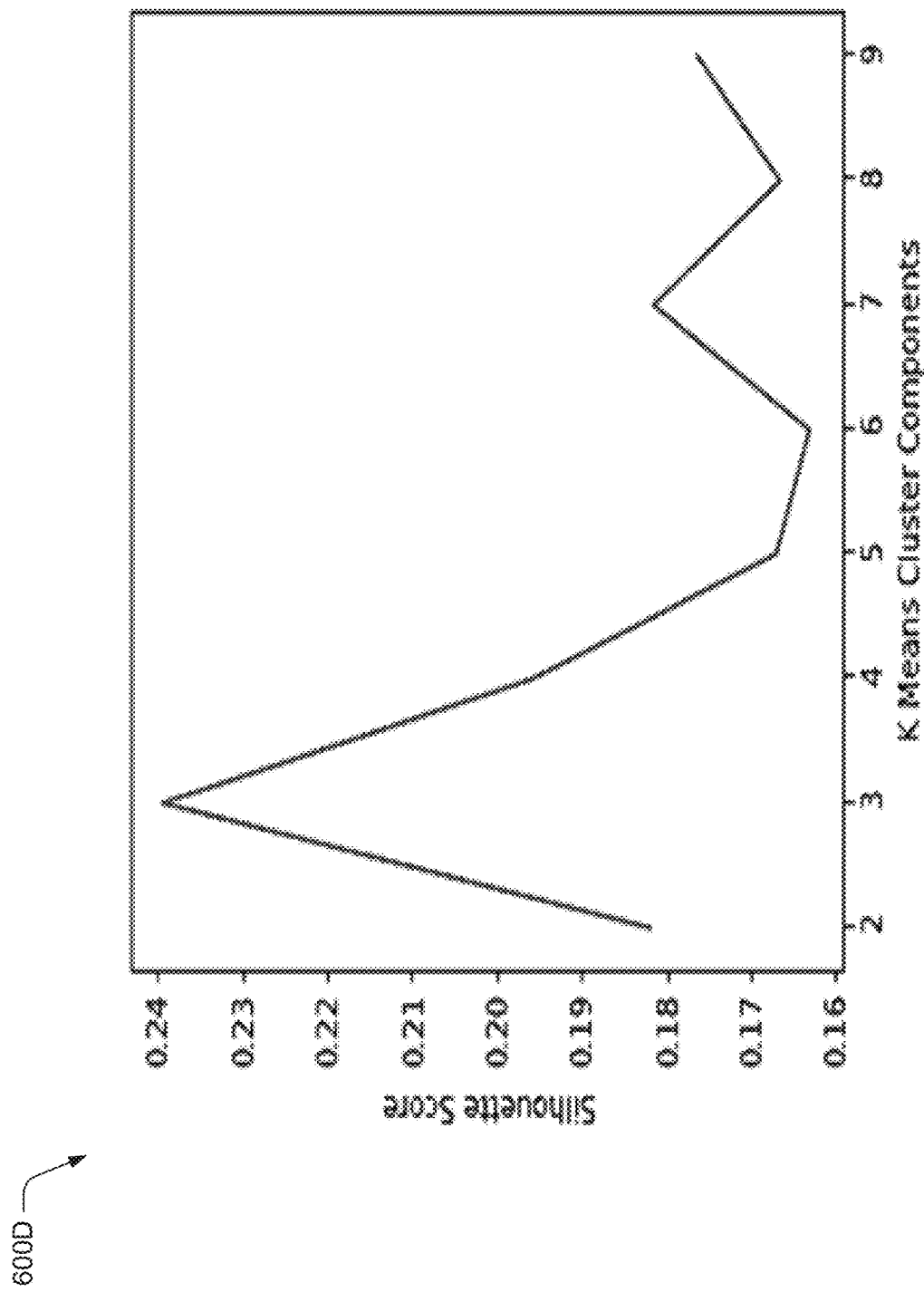
FIG. 6D illustrates a pictorial representation of prospect segmentation and clustering for prospect assessment as deployed by a prospect assessment system, according to an example embodiment of the present disclosure.

FIG. 6D illustrates a pictorial representation 600D of prospect segmentation and clustering for prospect assessment as deployed by the prospect assessment system 110, according to an example embodiment of the present disclosure. For the sake of brevity, construction and operational features of the system 110 which are explained in detail above are not explained in detail herein. The pictorial representation 600D may illustrate the implementation of the K-means clustering models on the exemplary data 602. The K-means clustering models may be a method of vector quantization that may aim to partition "n" number of observations into the "k" number of clusters in which each observation may belong to the cluster with the nearest mean, serving as a prototype of the cluster. The K-means clustering models may include mapping a silhouette coefficient with various K-means clustering components. The silhouette coefficient may be determined by the following equation:

$$s(o) = \frac{b(o) - a(o)}{\max\{a(o), b(o)\}}$$

-continued $$\text{Where, } (o) = \frac{\sum_{o' \in C_i, o \neq o'} dist(o, o')}{|C_i| - 1}$$

$$\text{And } b(o) = \min_{C_j: 1 \leq j \leq k, j \neq i} \left\{ \frac{\sum_{o' \in C_j} dist(o, o')}{C_j} \right\}$$

Where a (o)—compactness of the cluster to object 'o' belongs b(o)—the degree to which object 'o' is separated from other clusters.

Figure 6E:
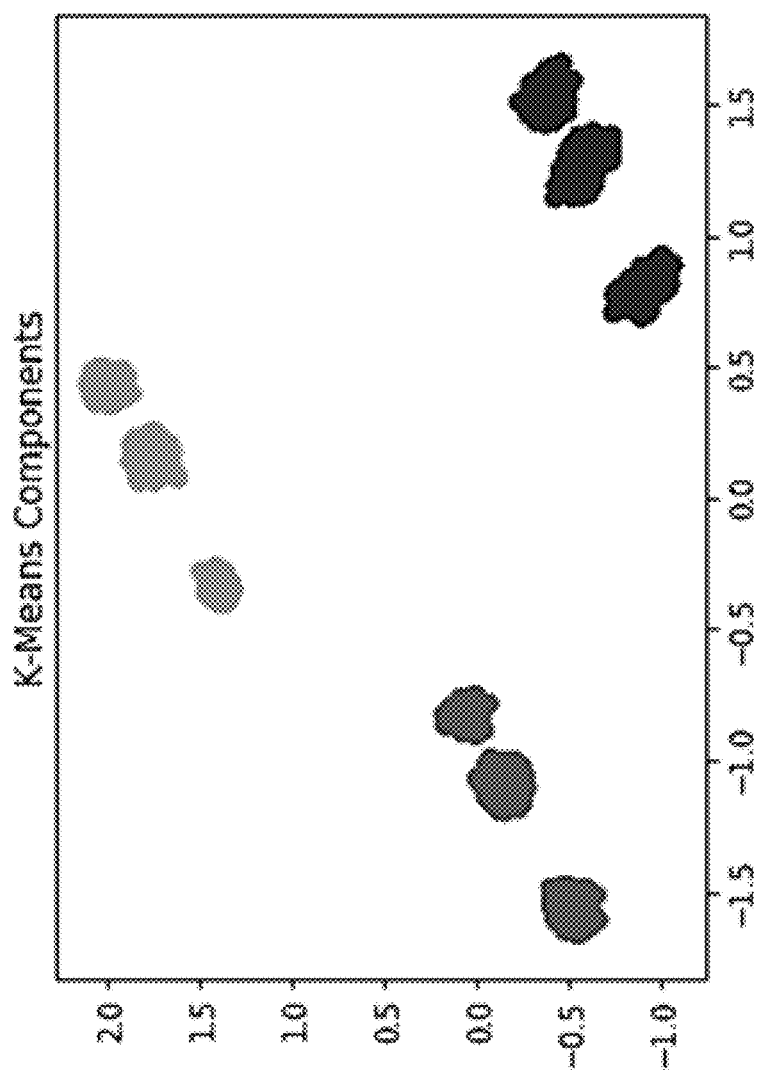
FIG. 6E illustrates a pictorial representation of prospect segmentation and clustering for prospect assessment as deployed by a prospect assessment system, according to an example embodiment of the present disclosure.

FIG. 6E illustrates a pictorial representation of 600E prospect segmentation and clustering for prospect assessment as deployed by the prospect assessment system 110, according to an example embodiment of the present disclosure. For the sake of brevity, construction and operational features of the system 110 which are explained in detail above are not explained in detail herein. The pictorial representation of 600E may illustrate the plurality of prospect clusters 212 or the prospect segments 414 generated using the K-means clustering models.

Figure 6F:
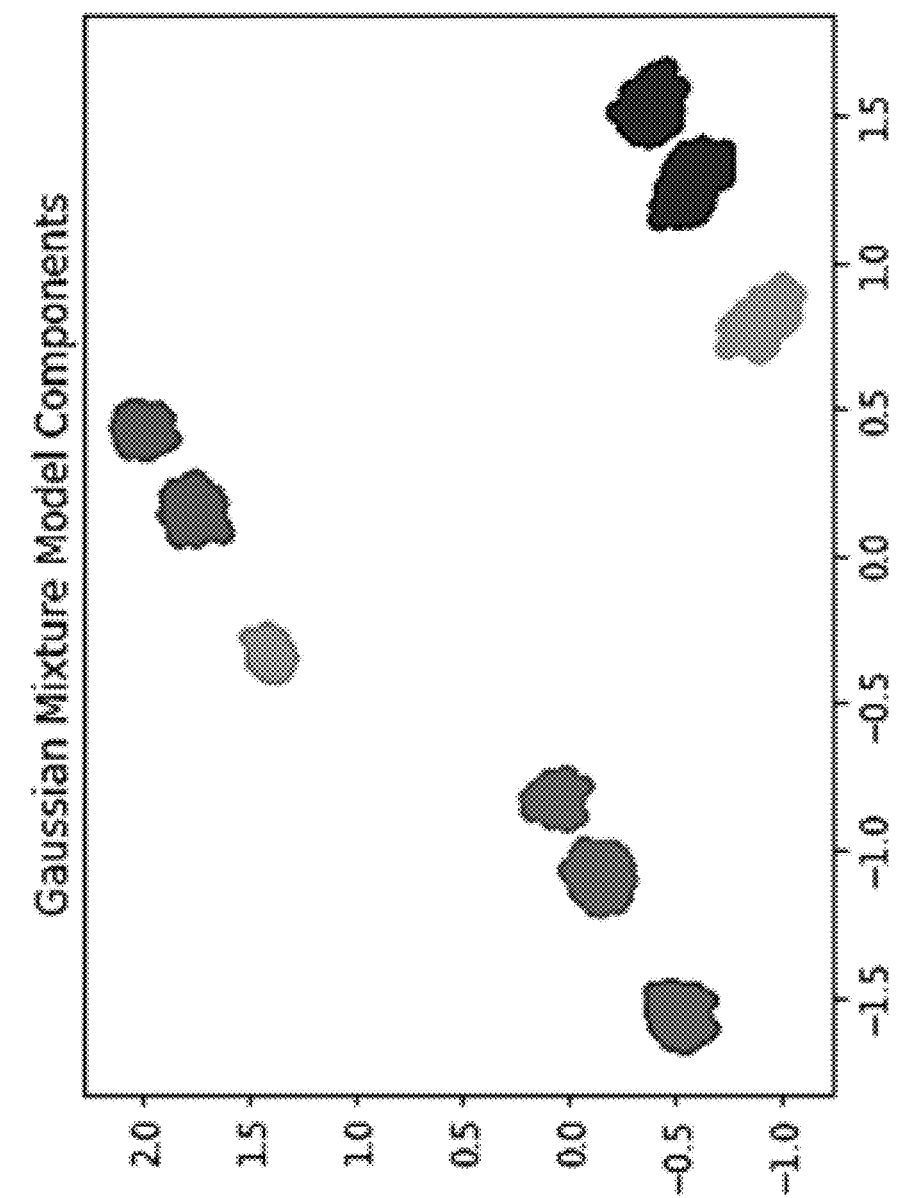
FIG. 6F illustrates a pictorial representation of prospect segmentation and clustering for prospect assessment as deployed by a prospect assessment system, according to an example embodiment of the present disclosure.

FIG. 6F illustrates a pictorial representation 600F of prospect segmentation and clustering for prospect assessment as deployed by the prospect assessment system 110, according to an example embodiment of the present disclosure. For the sake of brevity, construction and operational features of the system 110 which are explained in detail above are not explained in detail herein. The pictorial representation of 600F may illustrate the plurality of prospect clusters 212 or the prospect segments 414 generated using the Gaussian Mixture Model components.

Figure 6G:
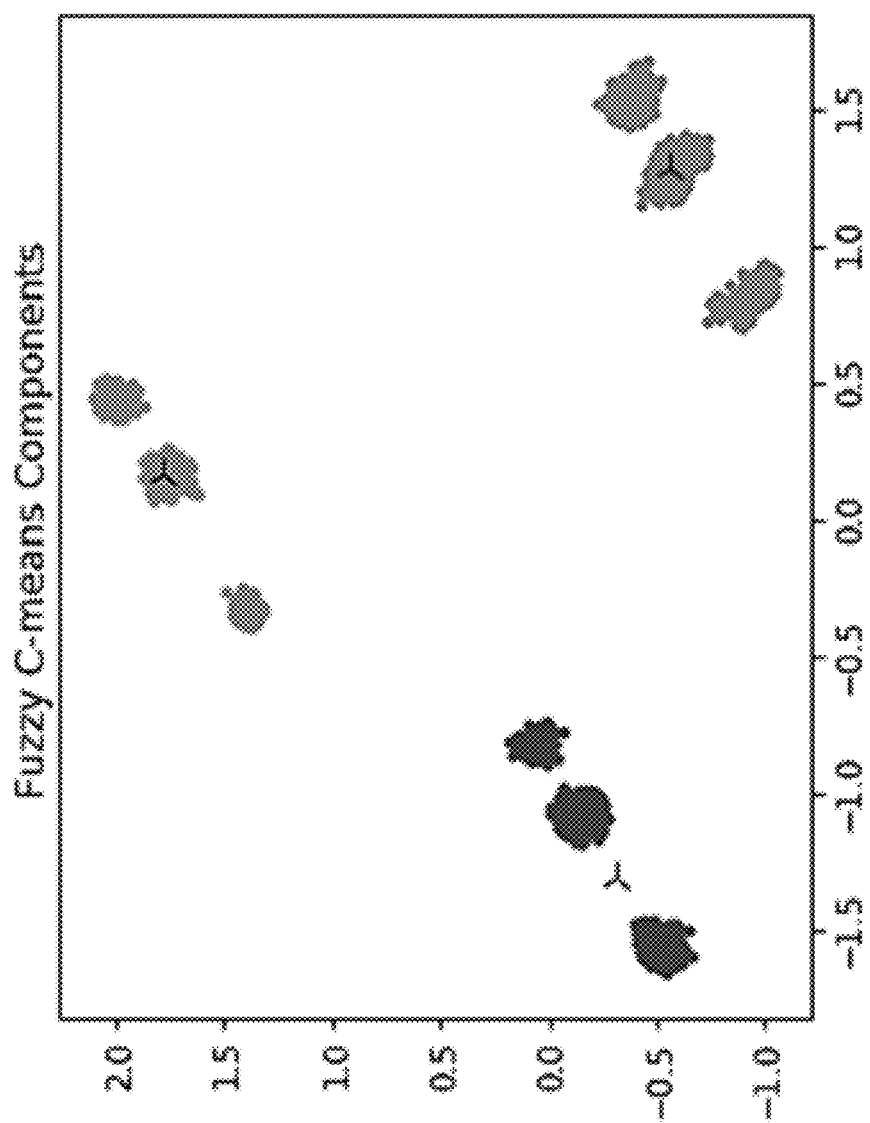
FIG. 6G illustrates a pictorial representation of prospect segmentation and clustering for prospect assessment as deployed by a prospect assessment system, according to an example embodiment of the present disclosure.

FIG. 6G illustrates a pictorial representation 600G of prospect segmentation and clustering for prospect assessment as deployed by the prospect assessment system 110, according to an example embodiment of the present disclosure. For the sake of brevity, construction and operational features of the system 110 which are explained in detail above are not explained in detail herein. The pictorial representation of 600G may illustrate the plurality of prospect clusters 212 or the prospect segments 414 generated using the Fuzzy C-Means model components.

FIGS. 7A- and 7B illustrate the cluster reduction 512 and the ensemble clustering 514. As mentioned above, the cluster reduction 512 and the ensemble clustering 514 may identify a set of the plurality of prospect clusters 212 from among the multiple sets of the plurality of prospect clusters 212 that may be generated by the set of base learner algorithms 510 (as illustrated by FIGS. 6A-6G)

FIG. 7A illustrates a pictorial representation 700A for the creation of a plurality of prospect clusters 212 for prospect assessment as deployed by the prospect assessment system 110, according to an example embodiment of the present disclosure. For the sake of brevity, construction and operational features of the system 110 which are explained in detail above are not explained in detail herein. The pictorial representation 700A may illustrate an exemplary data 702. The exemplary data 702 may include the prospect segments 414 generated by the implementation of the set of base learner algorithms 510 such as the Fuzzy C-Means models, the K-means clustering models, and the Gaussian Mixture Models.

Figure 7B:
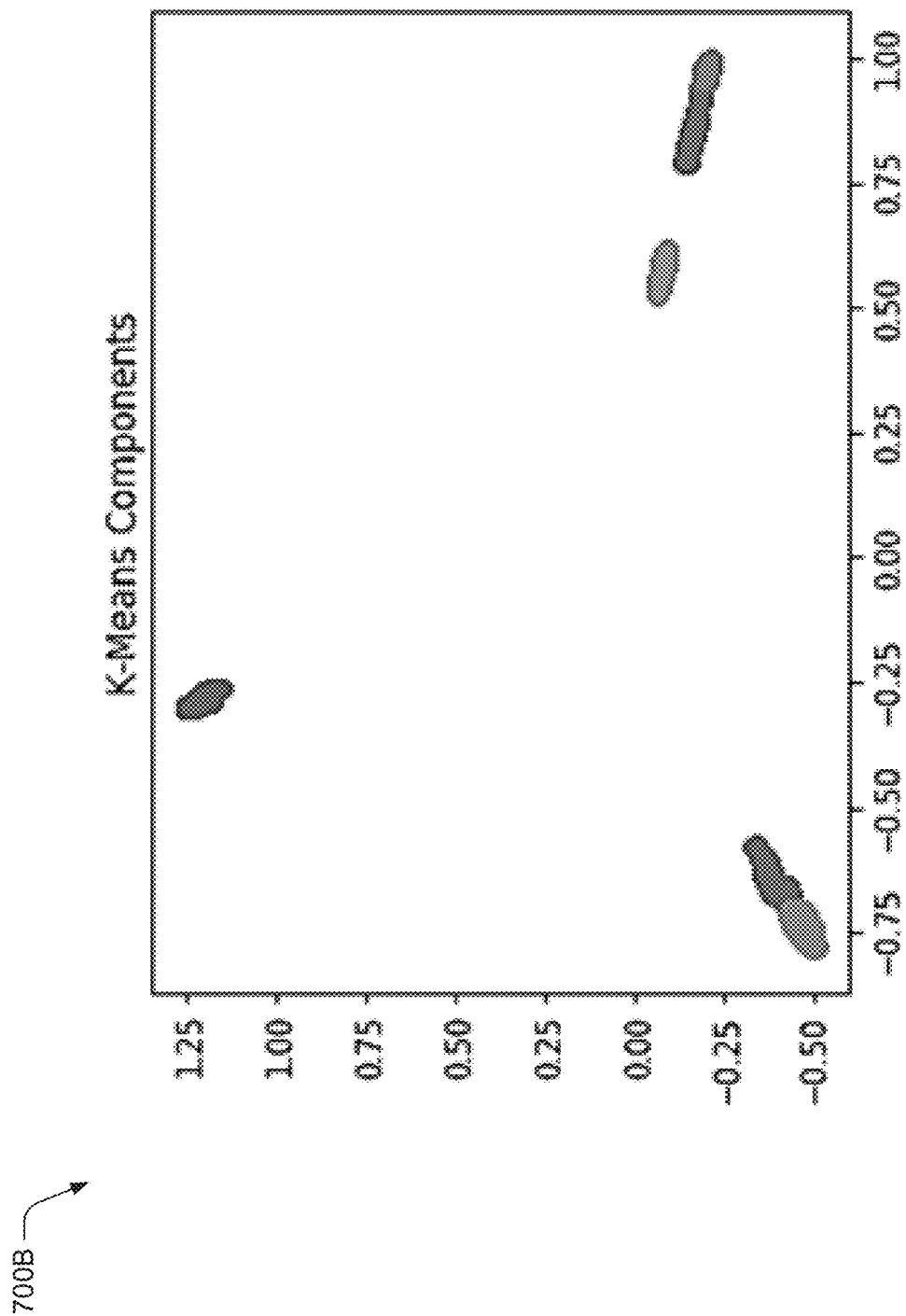
FIG. 7B illustrates a pictorial representation for the creation of a plurality of prospect clusters for prospect assessment as deployed by a prospect assessment system, according to an example embodiment of the present disclosure.

FIG. 7B illustrates a pictorial representation 700B for the creation of a plurality of prospect clusters 212 for prospect assessment as deployed by the prospect assessment system 110, according to an example embodiment of the present disclosure. For the sake of brevity, construction and operational features of the system 110 which are explained in detail above are not explained in detail herein. The pictorial representation 700B illustrates results from the cluster reduction 512 and the ensemble clustering 514. In an example, the cluster reduction 512 and the ensemble clustering 514 may be implemented using a data centroid based search. The data centroid based search may provide evenly spaced prospect segments 414, randomly generated prospect segments 414, and randomly selected prospect segments 414.

Figure 8A:
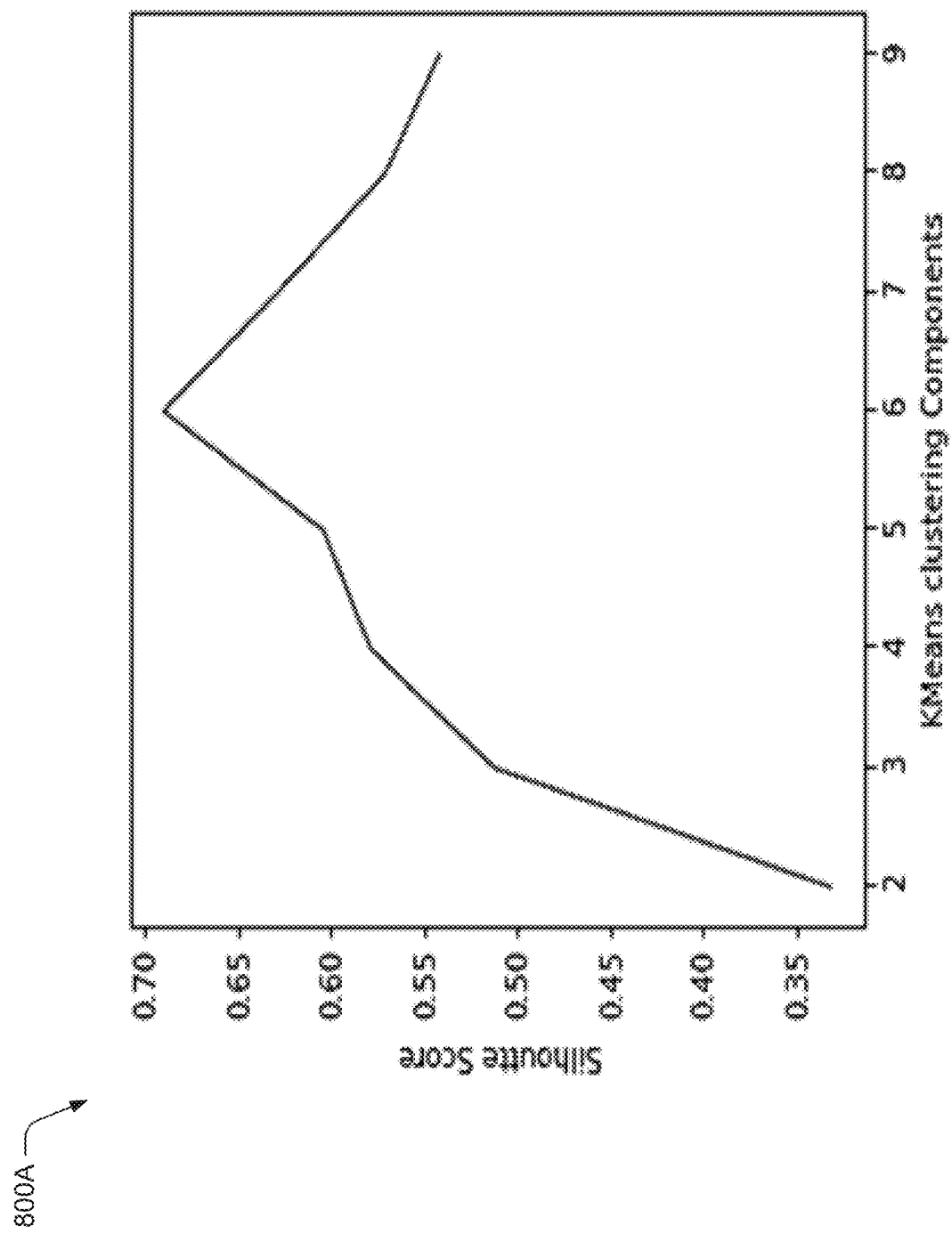
FIG. 8A illustrates a pictorial representation for cluster significance value calculation as deployed by a prospect assessment system, according to an example embodiment of the present disclosure.

FIG. 8A illustrates a pictorial representation 800A for cluster significance value 214 calculation as deployed by the prospect assessment system 110, according to an example embodiment of the present disclosure. For the sake of brevity, construction and operational features of the system 110 which are explained in detail above are not explained in detail herein. The pictorial representation 800A may illustrate the cluster profiling 516. The cluster profiling 516 may include determination of the cluster significance value 214. The pictorial representation 800A may illustrate the prospect segment 414 that may be identified for further processing after implementation of the cluster reduction 512 and the ensemble clustering 514.

Figure 8B:
FIG. 8B illustrates a pictorial representation for cluster significance value calculation as deployed by a prospect assessment system, according to an example embodiment of the present disclosure.

FIG. 8B illustrates a pictorial representation 800B for cluster significance value 214 calculation as deployed by the prospect assessment system 110, according to an example embodiment of the present disclosure. For the sake of brevity, construction and operational features of the system 110 which are explained in detail above are not explained in detail herein. The pictorial representation 800B may illustrate an exemplary data 802. The exemplary data 802 may include a "cluster name", a frequency of procurement by prospects in a prospect segment 414, a monetary value generated by the prospects in a prospect segment 414, number of prospects in a prospect segment 414, and recency of data related to the prospects in a prospect segment 414. The exemplary data 802 may be created by the system 110 by retrieving relevant prospect data 204. The Cluster Significance Value (CLV) may be determined following the equation:

$$CLV = 0.637*Frequency + 0.258*Monetary + 0.105*Recency$$

Figure 8C:
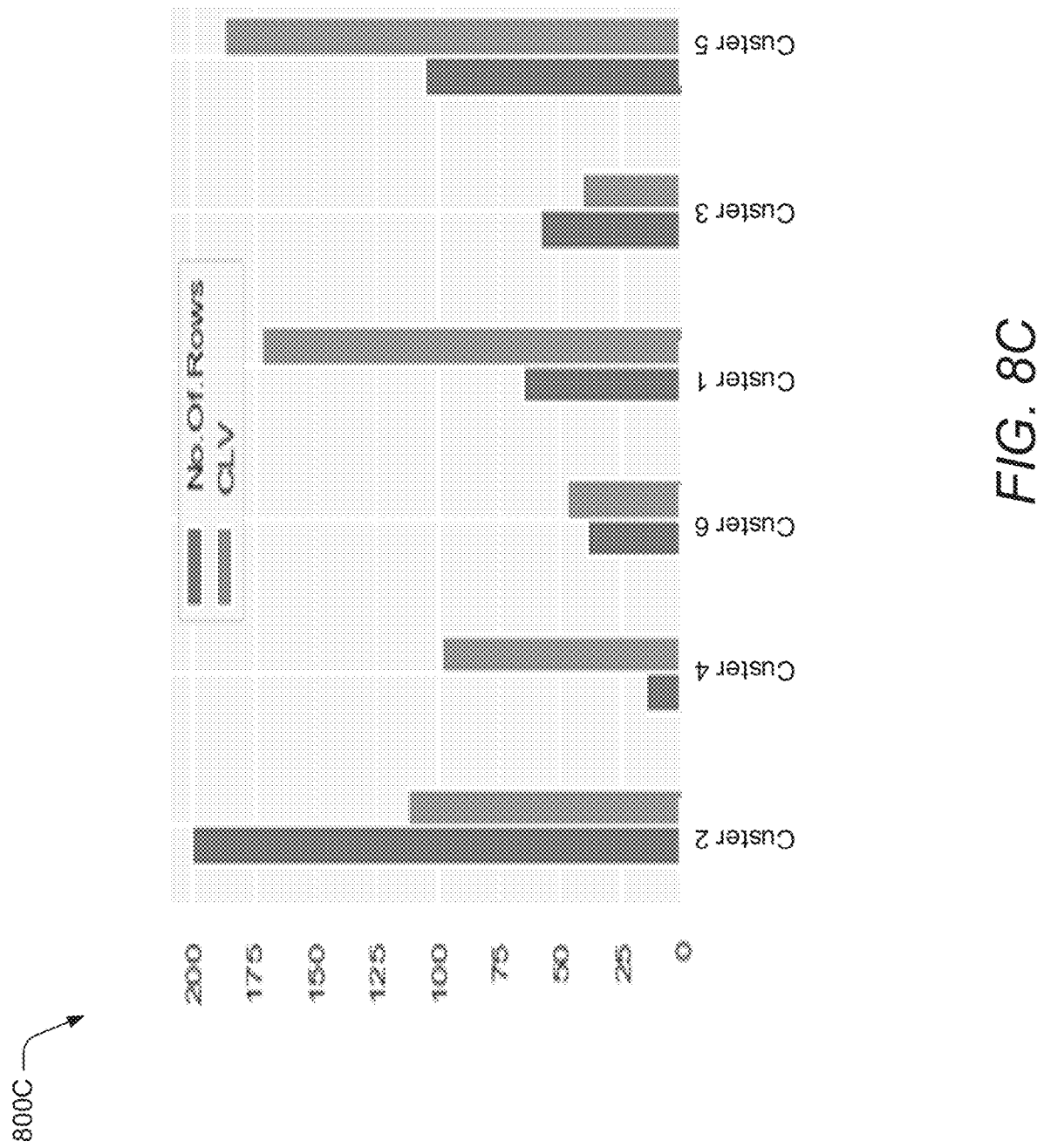
FIG. 8C illustrates a pictorial representation for cluster significance value calculation as deployed by a prospect assessment system, according to an example embodiment of the present disclosure.

FIG. 8C illustrates a pictorial representation 800C for cluster significance value 214 calculation as deployed by the prospect assessment system 110, according to an example embodiment of the present disclosure. For the sake of brevity, construction and operational features of the system 110 which are explained in detail above are not explained in detail herein. The pictorial representation 800C illustrates a bar graph mapping the CLV with a number of prospects in a prospect segment. The system 110 may identify the threshold CLV and only consider the prospect segments 414 that may have the CLV above the threshold CLV.

FIG. 9A illustrates a pictorial representation 900A for the creation of a prospect pattern matrix 224 for prospect assessment as deployed by the prospect assessment system 110, according to an example embodiment of the present disclosure. For the sake of brevity, construction and operational features of the system 110 which are explained in detail above are not explained in detail herein. The pictorial representation 900A may illustrate a table 902 comprising results from the implementation of the class imbalance handling 518 techniques for churn propensity determination. The pictorial representation 900A may illustrate a table 904 wherein, the system 110 may have classified the "high-value customers", and the "high churn propensity customers" into the plurality of patterns 226. The plurality of patterns 226 such as an uncertainer, a frequenter, a value customer, and a spender. In an example, the system 110 may classify the top 80% of the "high-value customers", and the "high churn propensity customers" into the plurality of patterns 226. The pictorial representation 900A may illustrate a bar graph 906 representing number prospect segments 414 that may fall into each of the plurality of patterns 226.

FIG. 9B illustrates a pictorial representation 900B for the creation of a prospect pattern matrix 224 for prospect assessment as deployed by the prospect assessment system 110, according to an example embodiment of the present disclosure. For the sake of brevity, construction and operational features of the system 110 which are explained in detail above are not explained in detail herein. The pictorial representation 900B may illustrate the plurality of patterns 226. The plurality of patterns 226 may include a spender pattern 902, a value customer pattern 904, an uncertainer pattern 906, and a frequenter pattern 908. The system 110 may classify the significant prospect clusters 222 into each of the plurality of patterns 226 based on, for example, a monetary amount for purchases 912 made by the prospects in that particular prospect segment 414, and a volume of purchases 910 made by the prospects in that particular prospect segment 414. The system 110 may determine an average monetary amount 916 for purchases and an average volume for purchases 914. The system 110 may identify the prospect segments 414 with the volume of purchases 910 below the average volume for purchases 914 and the monetary amount for purchases 912 above the average monetary amount 916 as belonging to the spender pattern 902. The system 110 may generate recommendations that may be focused on cross-selling to build purchase frequency for a prospect from the spender pattern 902. The system 110 may focus on increasing the average volume for purchases 914 for the prospects belonging to the spender pattern 902.

The system 110 may identify the prospect segments 414 with the volume of purchases 910 above the average volume for purchases 914 and the monetary amount for purchases 912 above the average monetary amount 916 as belonging to the value customer pattern 904. The system 110 may generate recommendations that may be focused on providing various rewards such as preferential discounts, frequent communications about new offerings and the like for a prospect from the value customer pattern 904. The system 110 may focus on retaining the prospects belonging to the value customer pattern 904. The system 110 may focus on maintaining the average monetary amount 916, and the average volume for purchases 914 for the prospects from the value customer pattern 904.

The system 110 may identify the prospect segments 414 with the volume of purchases 910 below the average volume for purchases 914 and the monetary amount for purchases 912 below the average monetary amount 916 as belonging to the uncertainer pattern 906. The system 110 may generate recommendations that may be focused on providing sub-segments, related products, new products, and the like for a prospect from the uncertainer pattern 906. The system 110 may focus on increasing the average volume for purchases 914, and the average monetary amount 916 for the prospects from the uncertainer pattern 906.

The system 110 may identify the prospect segments 414 with the volume of purchases 910 above the average volume for purchases 914 and the monetary amount for purchases 912 below the average monetary amount 916 as belonging to the frequenter pattern 908. The system 110 may generate recommendations that may be focused on providing and the like for a prospect from the frequenter pattern 908. The system 110 may generate recommendations that may be focused on providing recommendations that may be focused on upselling to increase the average monetary amount 916 for the prospects from the frequenter pattern 908.

FIG. 10 illustrates a pictorial representation 1000 for an exemplary prospect profile 228 for a pattern from the prospect pattern matrix 224 (mentioned by way of FIGS. 9A and 9B) as created by the prospect assessment system 110, according to an example embodiment of the present disclosure. For the sake of brevity, construction and operational features of the system 110 which are explained in detail above are not explained in detail herein. As mentioned above, the prospect pattern matrix 224 may include the plurality of patterns 226. In accordance with various embodiments of the present disclosure, the plurality of patterns 226 may include the spender pattern 902, the value customer 904, the uncertainer pattern 906, and the frequenter pattern 908. The prospect recommender 150 may determine a prospect profile 228 for the spender pattern 902 based on correlating the first product with the prospect data 204 associated with the plurality of prospects 206 associated with the spender pattern 902. The prospect profile 228 may include the first product relevant for a prospect from the plurality of prospects 206 classified into the spender pattern 902. The product correlation has been explained in detail by way of FIGS. 1-9. The pictorial representation 1000 may illustrate a spender recommendation 1002. The spender recommendation 1002 may be the prospect profile 228 for the spender pattern 902. The spender recommendation 1002 may include various offerings such as various products, and services that may be relevant to the plurality of prospects 206 classified into the spender pattern 902 pattern.

FIG. 11 illustrates a pictorial representation 1100 for an exemplary prospect profile 228 for a pattern from the prospect pattern matrix 224 (mentioned by way of FIGS. 9A and 9B) as created by the prospect assessment system 110, according to an example embodiment of the present disclosure. For the sake of brevity, construction and operational features of the system 110 which are explained in detail above are not explained in detail herein. In accordance with various embodiments of the present disclosure, the plurality of patterns 226 may include the value of customer pattern 904. The prospect recommender 150 may determine the prospect profile 228 for the value customer pattern 904 based on correlating the first product with the prospect data 204 associated with the plurality of prospects 206 associated with the value customer pattern 904. The prospect profile 228 may include the first product relevant for a prospect from the plurality of prospects 206 that may be classified in the value customer pattern 904. The pictorial representation 1100 may illustrate a value prospect recommendation 1102. The value prospect recommendation 1102 may be the prospect profile 228 for the value customer pattern 904. The value prospect recommendation 1102 may include various offerings such as various products, and services that may be relevant to the plurality of prospects 206 classified into the value customer pattern 904 pattern.

FIG. 12 illustrates a pictorial representation 1200 for an exemplary prospect profile 228 for a pattern from the prospect pattern matrix 224 (mentioned by way of FIGS. 9A and 9B) as created by the prospect assessment system 110, according to an example embodiment of the present disclosure. For the sake of brevity, construction and operational features of the system 110 which are explained in detail above are not explained in detail herein. In accordance with various embodiments of the present disclosure, the plurality of patterns 226 may include the uncertainer pattern 906. The prospect recommender 150 may determine the prospect profile 228 for the uncertainer pattern 906 based on correlating the first product with the prospect data 204 associated with the plurality of prospects 206 associated with the uncertainer pattern 906. The prospect profile 228 may include the first product relevant for a prospect from the plurality of prospects 206 that may be classified in the uncertainer pattern 906. The pictorial representation 1200 may illustrate a uncertainer recommendation 1202. The uncertainer recommendation 1202 may be the prospect profile 228 for the uncertainer pattern 906. The uncertainer recommendation 1202 may include various offerings such as various products, and services that may be relevant to the plurality of prospects 206 classified into the uncertainer pattern 906 pattern.

FIG. 13 illustrates a pictorial representation 1300 for an exemplary prospect profile 228 for a pattern from the prospect pattern matrix 224 (mentioned by way of FIGS. 9A and 9B) as created by the prospect assessment system 110, according to an example embodiment of the present disclosure. For the sake of brevity, construction and operational features of the system 110 which are explained in detail above are not explained in detail herein. In accordance with various embodiments of the present disclosure, the plurality of patterns 226 may include the frequenter pattern 908. The prospect recommender 150 may determine the prospect profile 228 for the frequenter pattern 908 based on correlating the first product with the prospect data 204 associated with the plurality of prospects 206 associated with the frequenter pattern 908. The prospect profile 228 may include the first product relevant for a prospect from the plurality of prospects 206 that may be classified in the frequenter pattern 908. The pictorial representation 1300 may illustrate a frequenter recommendation 1302. The frequenter recommendation 1302 may be the prospect profile 228 for the frequenter pattern 908. The frequenter recommendation 1302 may include various offerings such as various products, and services that may be relevant to the plurality of prospects 206 classified into the frequenter pattern 908 pattern.

FIG. 14 illustrates a pictorial representation 1400 for an exemplary prospect profile 228 being assigned a confidence score 232 by the prospect assessment system 110, according to an example embodiment of the present disclosure. For the sake of brevity, construction and operational features of the system 110 which are explained in detail above are not explained in detail herein. As mentioned above, the system 110 may correlate the first product amongst each other and identify the products therein that may be similar to each other. In an example, the system 110 may identify products that may complement a particular product. In an example, the system 110 may identify products that may supplement a particular product. In an example, the system 110 may identify products that may have been subscribed by a prospect in combination with each other. In an example, the system 110 may identify products that may have a negative impact on each other and would result in wastage of resources of subscribed together. The prospect recommender 150 may determine the plurality of rules 234 for the identification of various correlations between various products. The prospect recommender 150 may assign a confidence score 232 to each of the first products that have been identified to be related to a particular product. The confidence score 232 may indicate a degree of similarity between various products. The pictorial representation 1400 may illustrate a prospect information 1402, a rule set 1404, and a similarity score 1406. In the illustrated example, the prospect recommender 150 may identify an "offering 4" to be similar to an "offering 7" and assign the similarity score 1406 to the identification. The "offering 7" may be a product or a service that may be presently subscribed by a prospect. The "offering 4" may be a product or a service that may be relevant by a prospect considering the prospect choice of "offering 7". In the illustrated example, the "offering 7" and the "offering 4" may have a confidence score 232 of "0.68". This may be interpreted as "offering 7" to be 68% similar to the "offering 4".

Figure 15:
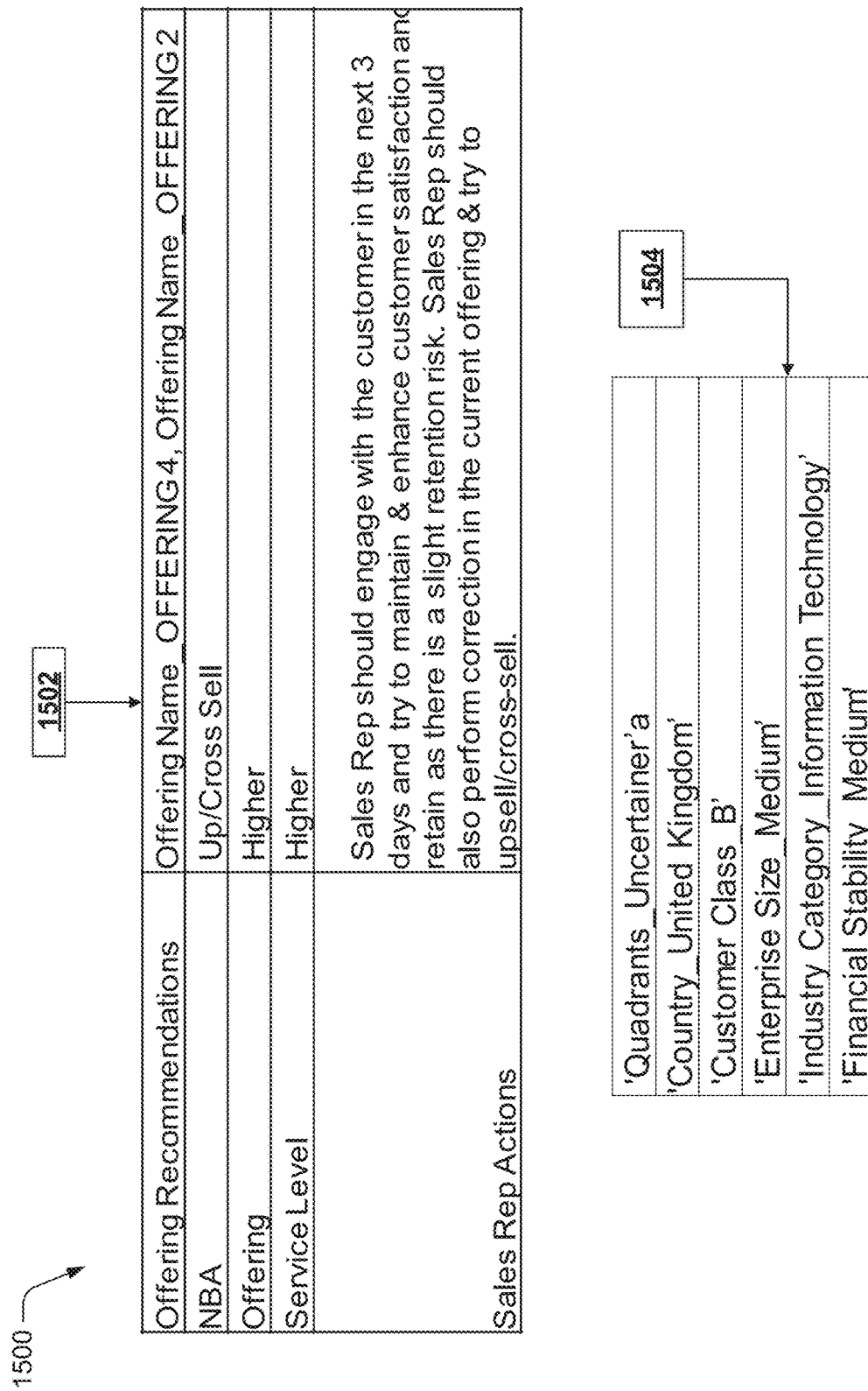
FIG. 15 illustrates a pictorial representation for an exemplary prospect assessment result as created by a prospect assessment system, according to an example embodiment of the present disclosure.

FIG. 15 illustrates a pictorial representation 1500 for an exemplary prospect assessment result 236 1502 as created by the prospect assessment system 110, according to an example embodiment of the present disclosure. For the sake of brevity, construction and operational features of the system 110 which are explained in detail above are not explained in detail herein. In accordance with various embodiments of the present disclosure, the prospect assessment result 236 1502 may further include a table 1504, wherein the prospect recommender 150 may include various details associated with the prospect included in the prospect assessment result 236 1502. The details may include information about the associated plurality of prospect clusters 212, and information about the associated prospect pattern matrix 224. The table 1504 may assist in the identification of prospect similar to the prospect included in the prospect assessment result 236 1502. The prospect assessment result 236 1502 may include various actions, recommendations, offering, and service levels (explained in detail by way of FIGS. 1-9) that may be relevant for prospect retention for a particular prospect.

FIG. 16 illustrates a pictorial representation 1600 of a prospect assessment stage 1602 as deployed by the prospect assessment system 110, according to an example embodiment of the present disclosure. For the sake of brevity, construction and operational features of the system 110 which are explained in detail above are not explained in detail herein. The prospect assessment stage 1602 may illustrate an exemplary dashboard of the system 110 illustrating information about a prospect from the plurality of prospects 206.

FIG. 17 illustrates a pictorial representation 1700 of a prospect assessment stage 1702 as deployed by the prospect assessment system 110, according to an example embodiment of the present disclosure. For the sake of brevity, construction and operational features of the system 110 which are explained in detail above are not explained in detail herein. The prospect assessment stage 1702 may illustrate an exemplary dashboard of the system 110 illustrating a present engagement of a user with the prospect from FIG. 16.

Figure 18:
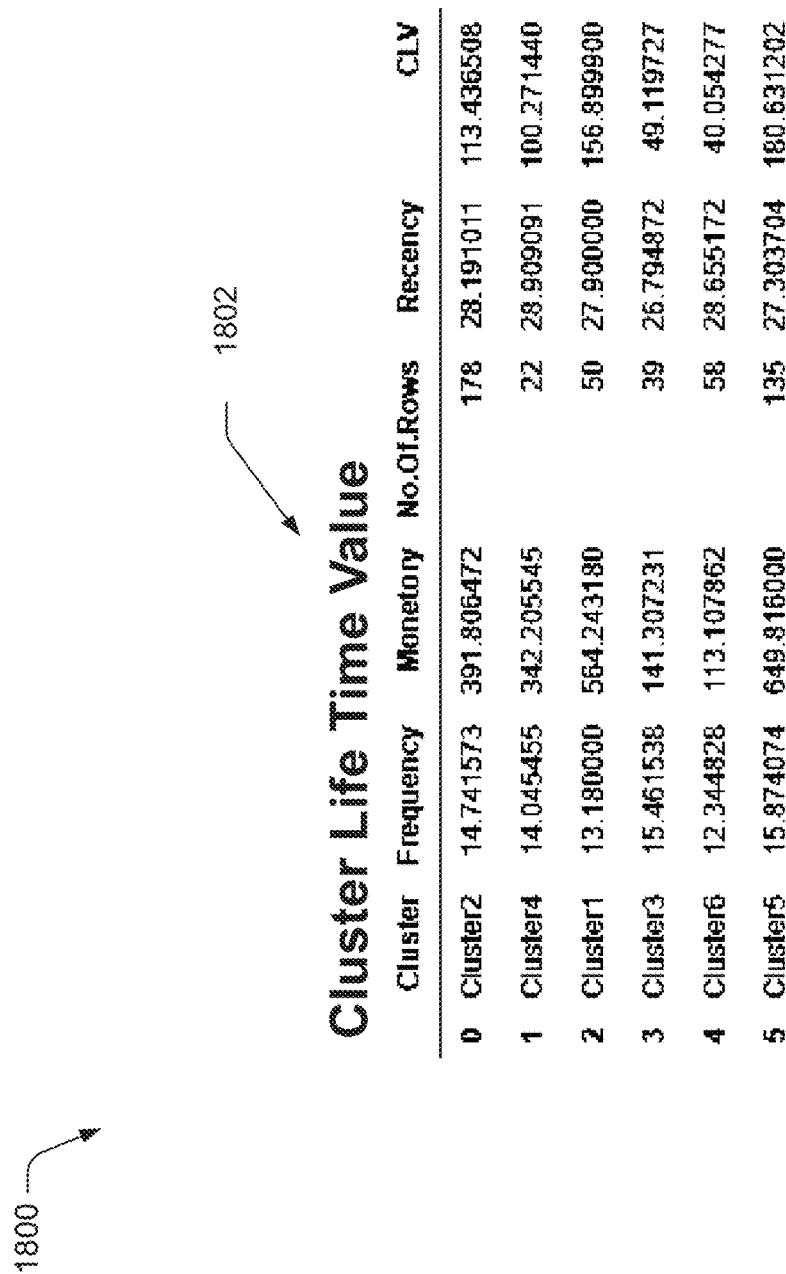
FIG. 18 illustrates a pictorial representation of a prospect assessment stage as deployed by a prospect assessment system, according to an example embodiment of the present disclosure.

FIG. 18 illustrates a pictorial representation 1800 of a prospect assessment stage 1802 as deployed by the prospect assessment system 110, according to an example embodiment of the present disclosure. For the sake of brevity, construction and operational features of the system 110 which are explained in detail above are not explained in detail herein. The prospect assessment stage 1802 may illustrate an exemplary dashboard of the system 110 illustrating the cluster significance value 214 for each of the plurality of prospect clusters 212 associated with the prospect from FIG. 16.

FIG. 19 illustrates a pictorial representation 1900 of a prospect assessment stage 1902 as deployed by the prospect assessment system 110, according to an example embodiment of the present disclosure. For the sake of brevity, construction and operational features of the system 110 which are explained in detail above are not explained in detail herein. The prospect assessment stage 1902 may illustrate an exemplary dashboard of the system 110 illustrating the retrieval of information about the prospect from FIG. 16 based on the plurality of prospect clusters 212.

FIG. 20 illustrates a pictorial representation 2000 of a prospect assessment stage 2002 as deployed by the prospect assessment system 110, according to an example embodiment of the present disclosure. For the sake of brevity, construction and operational features of the system 110 which are explained in detail above are not explained in detail herein. The prospect assessment stage 2002 may illustrate an exemplary dashboard of the system 110 illustrating the prospect churn value 218 for the prospect from FIG. 16.

FIG. 21 illustrates a pictorial representation 2100 of a prospect assessment stage 2102 as deployed by the prospect assessment system 110, according to an example embodiment of the present disclosure. For the sake of brevity, construction and operational features of the system 110 which are explained in detail above are not explained in detail herein. The prospect assessment stage 2102 may illustrate an exemplary dashboard of the system 110 illustrating the identification of the pattern from the plurality of patterns 226 associated with the prospect pattern matrix 224 for the prospect from FIG. 16. In the illustrated example, the prospect may belong to the uncertainer pattern 906.

Figure 22:
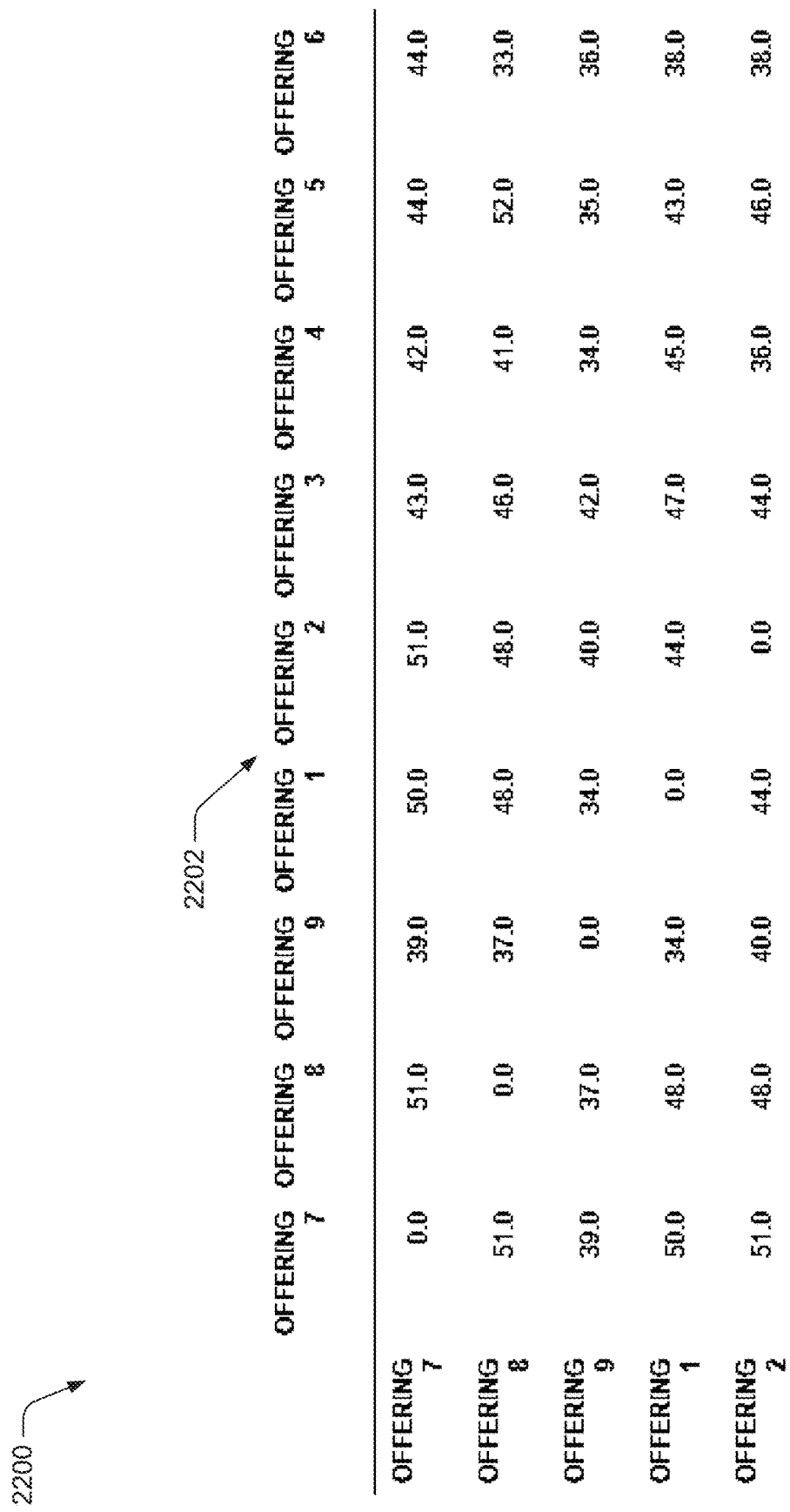
FIG. 22 illustrates a pictorial representation of a prospect assessment stage as deployed by a prospect assessment system, according to an example embodiment of the present disclosure.

FIG. 22 illustrates a pictorial representation 2200 of a prospect assessment stage 2202 as deployed by the prospect assessment system 110, according to an example embodiment of the present disclosure. For the sake of brevity, construction and operational features of the system 110 which are explained in detail above are not explained in detail herein. The prospect assessment stage 2202 may illustrate an exemplary dashboard of the system 110 illustrating a mapping of the plurality of attributes 210 associated with the prospect assessment requirement with various products associated with the prospect from FIG. 16 based on historical prospect data 204.

FIG. 23 illustrates a pictorial representation 2300 of a prospect assessment stage 2302 as deployed by the prospect assessment system 110, according to an example embodiment of the present disclosure. For the sake of brevity, construction and operational features of the system 110 which are explained in detail above are not explained in detail herein. The prospect assessment stage 2302 may illustrate an exemplary dashboard of the system 110 illustrating weightage based mapping of the plurality of attributes 210 associated with the prospect assessment requirement with the first product associated with the prospect from FIG. 16.

FIG. 24 illustrates a pictorial representation 2400 of a prospect assessment stage 2402 as deployed by the prospect assessment system 110, according to an example embodiment of the present disclosure. For the sake of brevity, construction and operational features of the system 110 which are explained in detail above are not explained in detail herein. The prospect assessment stage 2402 may illustrate an exemplary dashboard of the system 110 illustrating the prospect assessment result 236 2402 illustrating various actions, recommendations, offerings, and services associated with retention of the prospect from FIG. 16.

Figure 25:
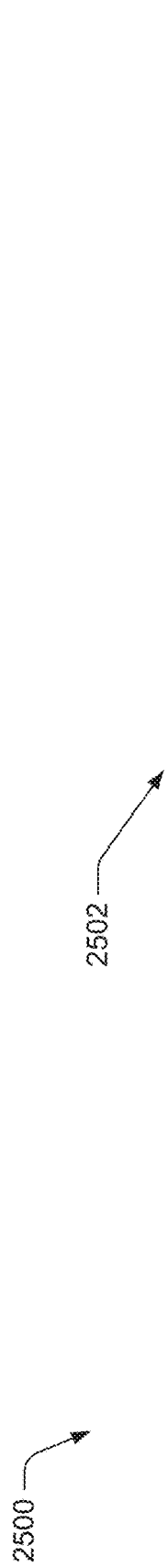
FIG. 25 illustrates a pictorial representation of a prospect assessment stage as deployed by a prospect assessment system, according to an example embodiment of the present disclosure.

FIG. 25 illustrates a pictorial representation 2500 of a prospect assessment stage 2502 as deployed by the prospect assessment system 110, according to an example embodiment of the present disclosure. For the sake of brevity, construction and operational features of the system 110 which are explained in detail above are not explained in detail herein. The prospect assessment stage 2502 may illustrate an exemplary dashboard of the system 110 illustrating the recommended products and confidence score 232 for the recommended products for the prospect from FIG. 16.

FIG. 26 illustrates a pictorial representation of 2600 a prospect assessment stage 2602 as deployed by the prospect assessment system 110, according to an example embodiment of the present disclosure. For the sake of brevity, construction and operational features of the system 110 which are explained in detail above are not explained in detail herein. The prospect assessment stage 2602 may illustrate an exemplary dashboard of the system 110 illustrating a result 2602 from the prospect assessment carried out by the system 110. The result 2602 may include generation of an automated proposal including various products, services, associated quantities and monetary considerations for a prospect keeping in view prospect retention.

Figure 27:
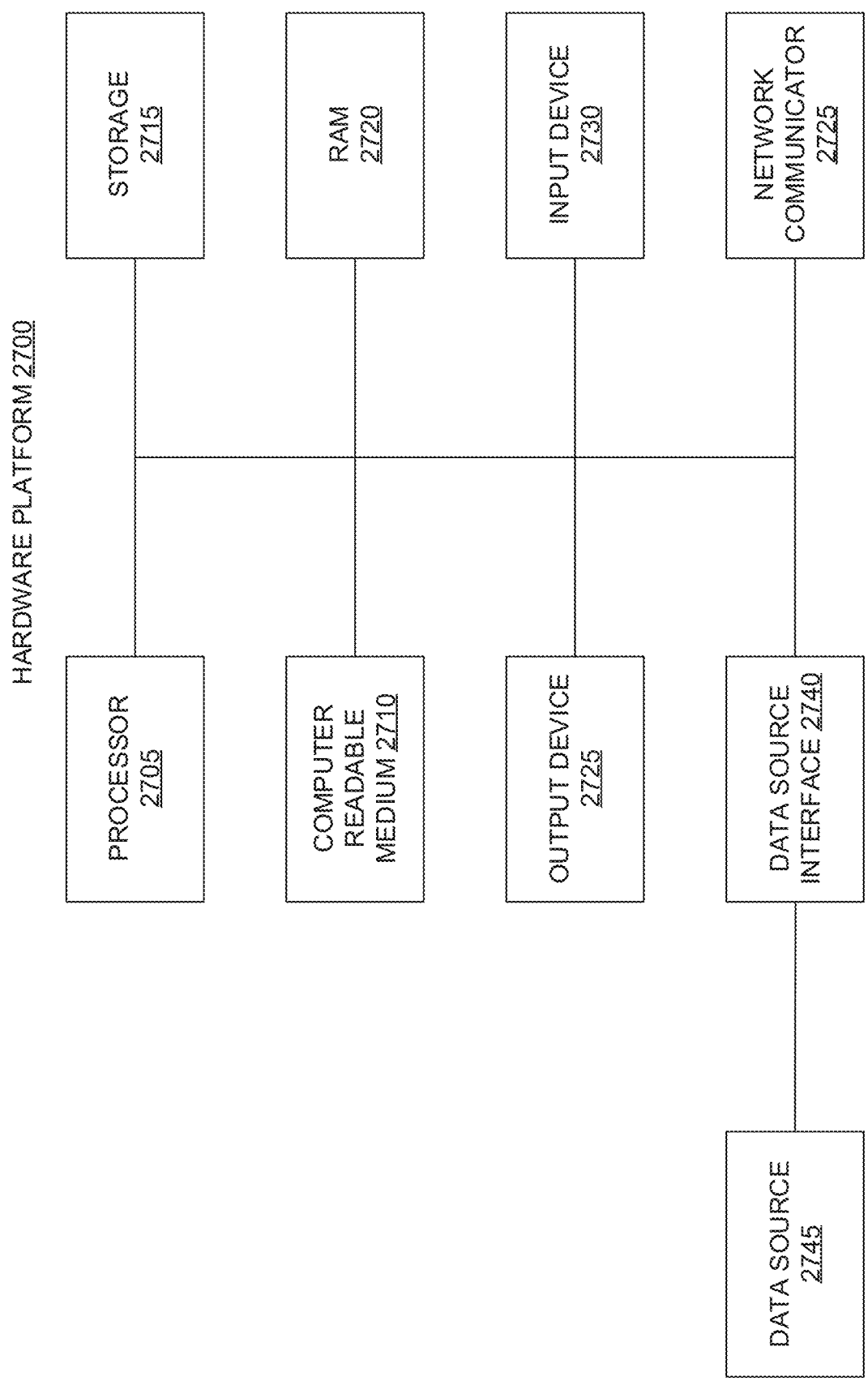
FIG. 27 illustrates a hardware platform for the implementation of a prospect assessment system, according to an example embodiment of the present disclosure.

FIG. 27 illustrates a hardware platform 2700 for implementation of the system 110, according to an example embodiment of the present disclosure. For the sake of brevity, construction and operational features of the system 110 which are explained in detail above are not explained in detail herein. Particularly, computing machines such as but not limited to internal/external server clusters, quantum computers, desktops, laptops, smartphones, tablets and wearables which may be used to execute the system 110 or may have the structure of the hardware platform 2700. The hardware platform 2700 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 27, the hardware platform 2700 may be a computer system 2700 that may be used with the examples described herein. The computer system 2700 may represent a computational platform that includes components that may be in a server or another computer system. The computer system 2700 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 2700 may include a processor 2705 that executes software instructions or code stored on a non-transitory computer-readable storage medium 2710 to perform methods of the present disclosure. The software code includes, for example, instructions to gather data and documents and analyze documents. In an example, the data analyzer 130, the propensity predictor 140, and the prospect recommender 150 may be software codes or components performing these steps.

The instructions on the computer-readable storage medium 2710 are read and stored the instructions in storage 2727 or in random access memory (RAM) 2720. The storage 2727 provides a large space for keeping static data where at least some instructions could be stored for later execution.

The stored instructions may be further compiled to generate other representations of the instructions and dynamically stored in the RAM 2720. The processor 2705 reads instructions from the RAM 2720 and performs actions as instructed.

The computer system 2700 further includes an output device 2725 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 2700 further includes input device 2730 to provide a user or another device with mechanisms for entering data and/or otherwise interact with the computer system 2700. The input device may include, for example, a keyboard, a keypad, a mouse, or a touchscreen. Each of these output devices 2725 and input devices 2730 could be joined by one or more additional peripherals. In an example, the output device 2725 may be used to display the results of the query 202.

A network communicator 2735 may be provided to connect the computer system 2700 to a network and in turn to other devices connected to the network including other clients, servers, data stores, and interfaces, for instance. A network communicator 2735 may include, for example, a network adapter such as a LAN adapter or a wireless adapter. The computer system 2700 includes a data source interface 2740 to access data source 2745. A data source is an information resource. As an example, a database of exceptions and rules may be a data source. Moreover, knowledge repositories and curated data may be other examples of data sources.

Figure 28A:
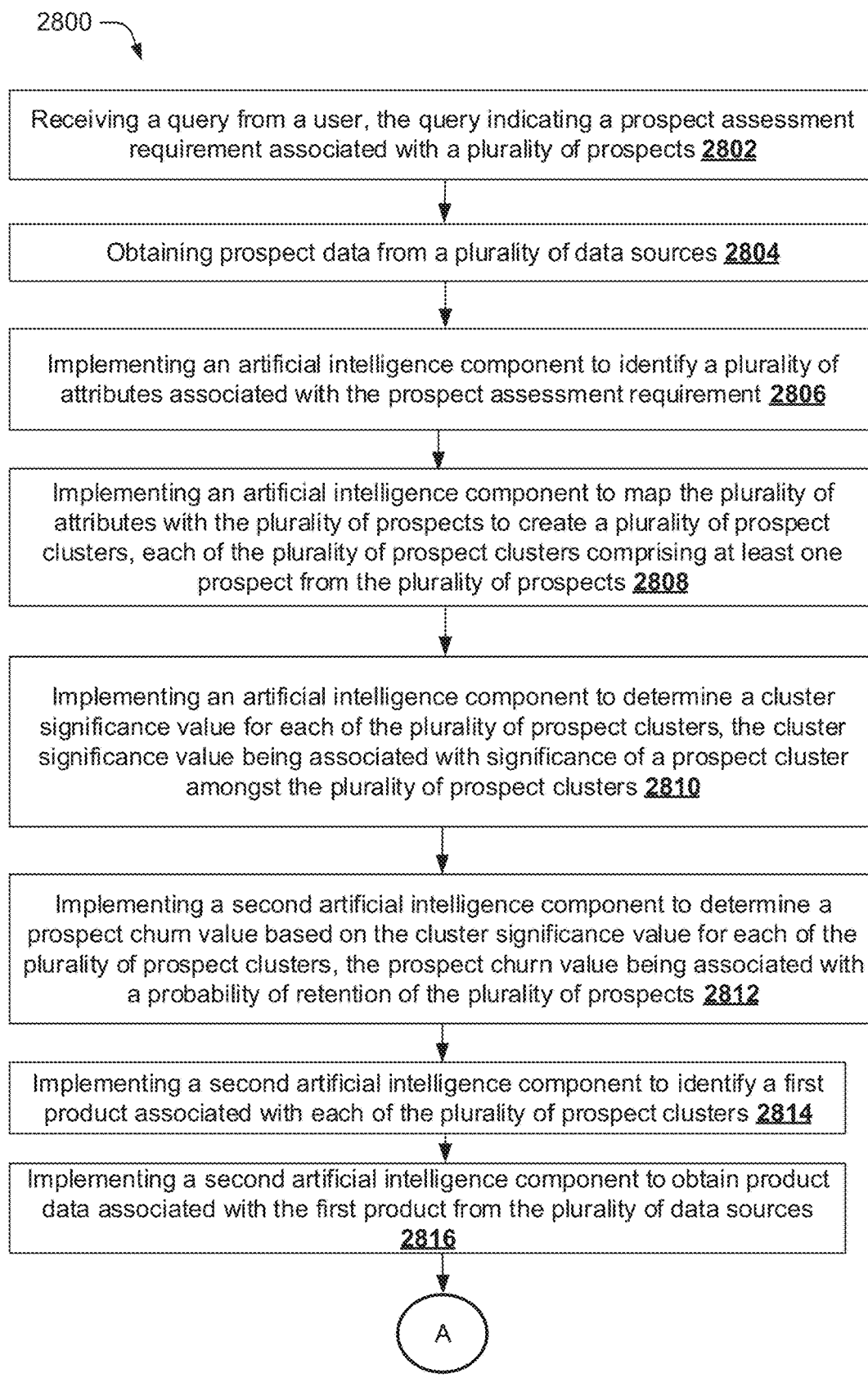
FIGS. 28A and 28B illustrate a process flowchart for prospect assessment using a prospect assessment system, according to an example embodiment of the present disclosure.
Figure 28B:
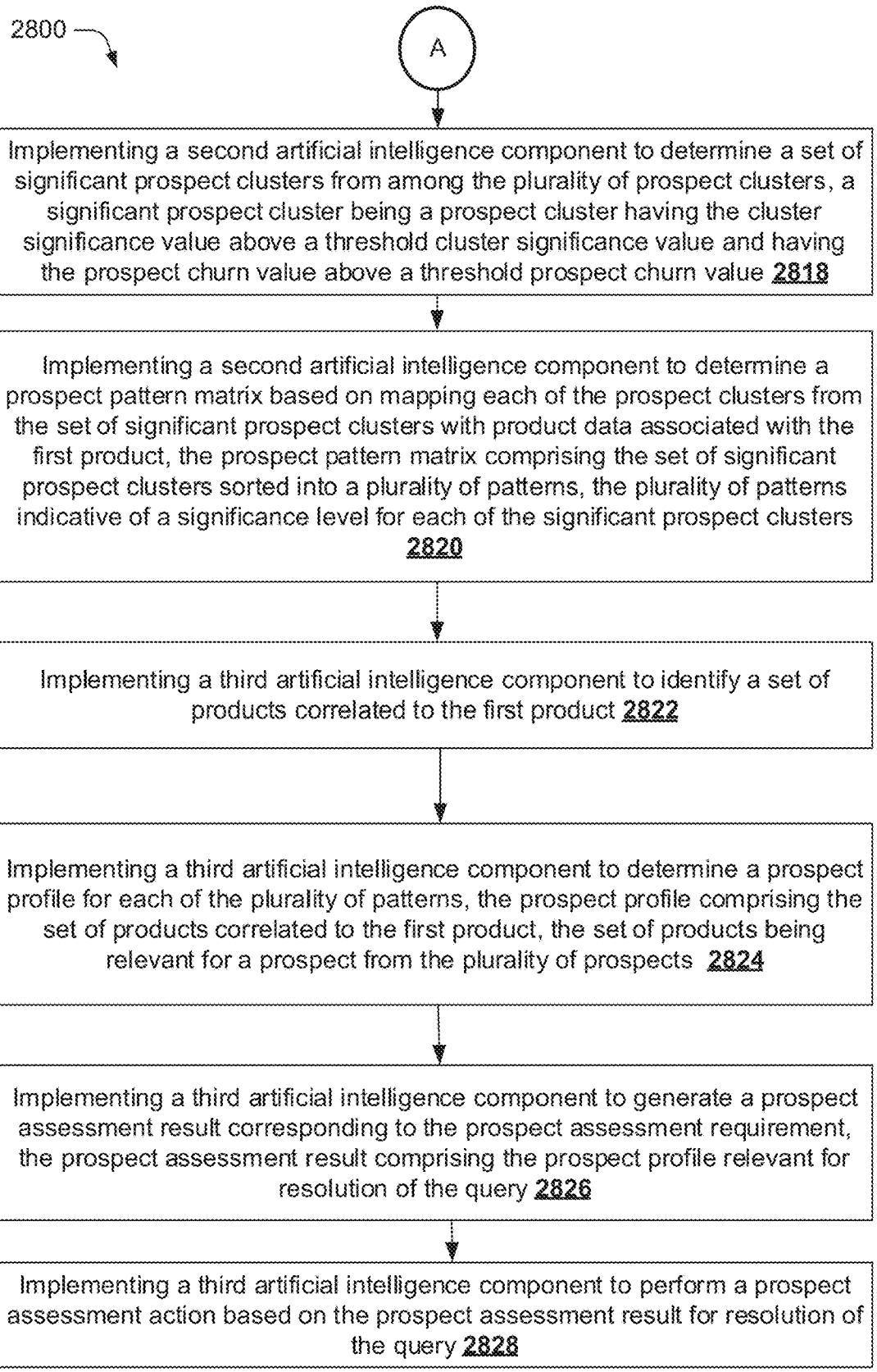

FIGS. 28A and 28B illustrate a process flowchart for prospect assessment using the prospect assessment system 110, according to an example embodiment of the present disclosure. It should be understood that method steps are shown here for reference only and other combinations of the steps may be possible. Further, the method 2800 may contain some steps in addition to the steps shown in FIG. 28. For the sake of brevity, construction and operational features of the system 110 which are explained in detail in the description of FIGS. 1-27 are not explained in detail in the description of FIG. 28. The method 2800 may be performed by a component of the system 110.

At block 2802, the query 202 may be received from a user. The query 202 may indicate the prospect assessment requirement associated with the plurality of prospects 206.

At block 2804, prospect data 204 may be obtained from the plurality of data sources.

At block 2806, the first artificial intelligence component 208 may be implemented to identify the plurality of attributes 210 associated with the prospect assessment requirement.

At block 2808, the first artificial intelligence component 208 may be implemented to map the plurality of attributes 210 with the plurality of prospects 206 to create a plurality of prospect clusters 212. Each of the plurality of prospect clusters 212 comprising at least one prospect from the plurality of prospects 206.

At block 2810, the first artificial intelligence component 208 may be implemented to determine a cluster significance value 214 for each of the plurality of prospect clusters 212. The cluster significance value 214 being associated with the significance of a prospect cluster amongst the plurality of prospect clusters 212.

At block 2812, the second artificial intelligence component 216 may be implemented to determine a prospect churn value 218 based on the cluster significance value 214 for each of the plurality of prospect clusters 212. The prospect churn value 218 may be associated with a probability of retention of the plurality of prospects 206.

At block 2814, the second artificial intelligence component 216 may be implemented to identify a product associated with each of the plurality of prospect clusters 212.

At block 2816, the second artificial intelligence component 216 may be implemented to obtain product data associated with the product from the plurality of data sources At block 2818, the second artificial intelligence component 216 may be implemented to determine a set of significant prospect clusters 222 from among the plurality of prospect clusters 212. A significant prospect cluster being a prospect cluster having the cluster significance value 214 above a threshold cluster significance value 214 and having the prospect churn value 218 above a threshold prospect churn value 218.

At block 2820, the second artificial intelligence component 216 may be implemented to determine a prospect pattern matrix 224 based on mapping each of the prospect clusters from the set of significant prospect clusters 222 with the associated product. The prospect pattern matrix 224 comprising a plurality of patterns 226 indicative of a significance level for each of the significant prospect clusters 222.

At block 2822, the third artificial intelligence component 230 may be implemented to identify a set of products correlated to the product associated with each of the plurality of patterns 226

At block 2824, the third artificial intelligence component 230 may be implemented to determine a prospect profile 228 for each of the plurality of patterns 226. The prospect profile 228 may comprise the set of products correlated to the product associated with each of the plurality of patterns 226. The set of products being relevant for a prospect from the plurality of prospects 206.

At block 2826, the third artificial intelligence component 230 may be implemented to generate a prospect assessment result 236 corresponding to the prospect assessment requirement. The prospect assessment result 236 may comprise the prospect profile 228 relevant for the resolution of the query 202.

At block 2828, the third artificial intelligence component 230 may be implemented to perform a prospect assessment action based on the prospect assessment result 236 for resolution of the query 202.

In an example, the method 2800 may further identify a plurality of rules 234 for determining the prospect profile 228, the plurality of rules 234 facilitating determining a correlation amongst the set of products and the product associated with each of the significant prospect clusters 222. The method 2800 may assign a confidence score 232 to each of the products correlated to the product associated with each of the plurality of patterns 226, the confidence score 232 indicative of relevance of a product for a prospect from the plurality of prospects 206. The method 2800 may assign the confidence score 232 based on mapping the prospect data 204 associated with the prospect profile 228 with the plurality of rules 234. The method 2800 may create multiple sets of the plurality of prospect clusters 212. The method 2800 may identify a set of the plurality of prospect clusters 212 from among the multiple sets of the plurality of prospect clusters 212 based on the evaluation of each of the multiple sets of the plurality of prospect clusters 212. The method

2800 may create a product recommendation library by associating the prospect profile 228 with the prospect assessment requirement and deploy the product recommendation library to validate the prospect profile 228 for the generation of the prospect assessment result 236.

In an example, the method 2800 may be practiced using a non-transitory computer-readable medium. In an example, the method 2800 may be computer-implemented.

The present disclosure provides for a prospect assessment system that may generate key insights related to prospect assessment with minimal human intervention. Furthermore, the present disclosure may categorically analyze various parameters that may have an impact on deciding appropriate products, services and retention action for a prospect.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor; and
a memory storing instructions, when executed by the processor, cause the system to:
  receive a query from a user, the query indicating a prospect assessment requirement associated with a plurality of prospects;
  obtain prospect data from a plurality of data sources;
  identify a plurality of attributes associated with the prospect assessment requirement from the prospect data using artificial intelligence techniques, wherein the plurality of attributes indicate measurable factors associated with the prospect assessment requirement;
  map the plurality of attributes with the plurality of prospects to identify a plurality of prospect clusters among multiple sets of plurality of prospect clusters by deploying a set of baseline clustering algorithms, wherein, through the set of baseline clustering algorithms, the prospect data obtained from plurality of data sourced are augmented and a similarity level for the plurality of prospects within each plurality of prospect clusters is mapped to identify the plurality of prospect clusters, each of the plurality of prospect clusters comprising at least one prospect from the plurality of prospects;
  reduce data dimensionality in the plurality of prospect clusters based on the deployment of the set of the baseline clustering algorithms;
  determine a cluster significance value for each of the plurality of prospect clusters, the cluster significance value indicative of a significance of a prospect cluster amongst the plurality of prospect clusters;
  determine a prospect churn value based on the cluster significance value for each of the plurality of prospect clusters, the prospect churn value being associated with a probability of retention of the plurality of prospects;
  identify a first product associated with each of the plurality of prospect clusters;
  obtain product data associated with the first product from the plurality of data sources;
  determine a set of significant prospect clusters from among the plurality of prospect clusters, a significant prospect cluster being a prospect cluster having the cluster significance value above a threshold cluster significance value and having the prospect churn value above a threshold prospect churn value;
  determine a prospect pattern matrix based on mapping each of the prospect clusters from the set of significant prospect clusters with product data associated with the first product, the prospect pattern matrix comprising the set of significant prospect clusters sorted into a plurality of patterns, the plurality of patterns indicative of a significance level for each of the significant prospect clusters;
  identify a set of products correlated to the first product;
  determine a prospect profile for each of the plurality of patterns, the prospect profile comprising the set of products correlated to the first product, the set of products being relevant for a prospect from the plurality of prospects;
  generate a prospect assessment result corresponding to the prospect assessment requirement, the prospect assessment result comprising the prospect profile relevant for resolution of the query; and
  perform a prospect assessment action based on the prospect assessment result for the resolution of the query, wherein the prospect assessment action facilitates upgrading existing products in a procurement portfolio based on the prospect profile.

2. The system as claimed in claim 1, wherein the processor is to identify a plurality of rules for determining the prospect profile, the plurality of rules facilitating determining a correlation amongst the set of products and the product associated with each significant prospect cluster.

3. The system as claimed in claim 2, wherein the processor is to assign a confidence score to each product from the set of products correlated to the first product, the confidence score indicative of relevance of the products correlated to the first product for a prospect from the plurality of prospects.

4. The system as claimed in claim 3, wherein the processor is to assign the confidence score based on mapping the prospect data associated with the prospect profile with the plurality of rules.

5. The system as claimed in claim 1, wherein the processor is to create multiple sets of the plurality of prospect clusters.

6. The system as claimed in claim 5, wherein the processor is to identify a set of the plurality of prospect clusters from among the multiple sets of the plurality of prospect clusters, based on an evaluation of each of the multiple sets of the plurality of prospect clusters, the evaluation to map a similarity level for the plurality of prospects within each plurality of prospect clusters and the evaluation to map a disparity level among each set of the plurality of prospect clusters.

7. The system as claimed in claim 1, wherein the processor is to:
  create a product recommendation library by associating the prospect profile with the prospect assessment requirement; and deploy the product recommendation library to validate the prospect profile for generation the prospect assessment result.

8. A method comprising:

receiving, by a processor, a query from a user, the query indicating a prospect assessment requirement associated with a plurality of prospects;

obtaining, by the processor, prospect data from a plurality of data sources;

identifying a plurality of attributes associated with the prospect assessment requirement from the prospect data using artificial intelligence techniques, wherein the plurality of attributes indicate measurable factors associated with the prospect assessment requirement;

mapping the plurality of attributes with the plurality of prospects to identify a plurality of prospect clusters among multiple sets of plurality of prospect clusters by deploying a set of baseline clustering algorithms, wherein, through the set of baseline clustering algorithms, the prospect data obtained from plurality of data sourced are augmented and a similarity level for the plurality of prospects within each plurality of prospect clusters is mapped to identify the plurality of prospect clusters, each of the plurality of prospect clusters comprising at least one prospect from the plurality of prospects;

reducing data dimensionality in the plurality of prospect clusters based on the deployment of the set of the baseline clustering algorithms;

determining a cluster significance value for each of the plurality of prospect clusters, the cluster significance value being associated with significance of a prospect cluster amongst the plurality of prospect clusters;

determining a prospect churn value based on the cluster significance value for each of the plurality of prospect clusters, the prospect churn value being associated with a probability of retention of the plurality of prospects;

identifying a first product associated with each of the plurality of prospect clusters;

obtaining product data associated with the first product from the plurality of data sources;

determining a set of significant prospect clusters from among the plurality of prospect clusters, a significant prospect cluster being a prospect cluster having the cluster significance value above a threshold cluster significance value and having the prospect churn value above a threshold prospect churn value;

determining a prospect pattern matrix based on mapping each of the prospect clusters from the set of significant prospect clusters with product data associated with the first product, the prospect pattern matrix comprising the set of significant prospect clusters sorted into a plurality of patterns, the plurality of patterns indicative of a significance level for each of the significant prospect clusters;

identifying a set of products correlated to the first product;

determining a prospect profile for each of the plurality of patterns, the prospect profile comprising the set of products correlated to the first product, the set of products being relevant for a prospect from the plurality of prospects;

generating a prospect assessment result corresponding to the prospect assessment requirement, the prospect assessment result comprising the prospect profile relevant for resolution of the query; and performing a prospect assessment action based on the prospect assessment result for the resolution of the query, wherein the prospect assessment action facilitates upgrading existing products in a procurement portfolio based on the prospect profile.

9. The method as claimed in claim 8, wherein the method further comprises identifying, by the processor, a plurality of rules for determining the prospect profile, the plurality of rules facilitating determining a correlation amongst the set of products and the product associated with each significant prospect cluster.

10. The method as claimed in claim 9, wherein the method further comprises assigning, by the processor, a confidence score to each product from the set of products correlated to the first product, the confidence score indicative of relevance of the products correlated to the first product for a prospect from the plurality of prospects.

11. The method as claimed in claim 10, wherein the method further comprises assigning, by the processor, the confidence score based on mapping the prospect data associated with the prospect profile with the plurality of rules.

12. The method as claimed in claim 8, wherein the method further comprises creating, by the processor, multiple sets of the plurality of prospect clusters.

13. The method as claimed in claim 12, wherein the method further comprises identifying, by the processor, a set of the plurality of prospect clusters from among the multiple sets of the plurality of prospect clusters, based on an evaluation of each of the multiple sets of the plurality of prospect clusters, the evaluation to map a similarity level for the plurality of prospects within each plurality of prospect clusters and the evaluation to map a disparity level among each set of the plurality of prospect clusters.

14. The method as claimed in claim 13, wherein the method further comprises:

creating, by the processor, a product recommendation library by associating the prospect profile with the prospect assessment requirement; and deploying the product recommendation library to validate the prospect profile for generation of the prospect assessment result.

15. A non-transitory computer readable medium including machine readable instructions executable by a processor to:

receive a query from a user, the query indicating a prospect assessment requirement associated with a plurality of prospects;

obtain prospect data from a plurality of data sources;

identify a plurality of attributes associated with the prospect assessment requirement from the prospect data using artificial intelligence techniques, wherein the plurality of attributes indicate measurable factors associated with the prospect assessment requirement;

map the plurality of attributes with the plurality of prospects to identify a plurality of prospect clusters among multiple sets of plurality of prospect clusters by deploying a set of baseline clustering algorithms, wherein, through the set of baseline clustering algorithms, the prospect data obtained from plurality of data sourced are augmented and a similarity level for the plurality of prospects within each plurality of prospect clusters is mapped to identify the plurality of prospect clusters, each of the plurality of prospect clusters comprising at least one prospect from the plurality of prospects;

reduce data dimensionality in the plurality of prospect clusters based on the deployment of the set of the baseline clustering algorithms;

determine a cluster significance value for each of the plurality of prospect clusters, the cluster significance value being associated with significance of a prospect cluster amongst the plurality of prospect clusters;

determine a prospect churn value based on the cluster significance value for each of the plurality of prospect clusters, the prospect churn value being associated with a probability of retention of the plurality of prospects;

identify a first product associated with each of the plurality of prospect clusters;

obtain product data associated with the first product from the plurality of data sources;

determine a set of significant prospect clusters from among the plurality of prospect clusters, a significant prospect cluster being a prospect cluster having the cluster significance value above a threshold cluster significance value and having the prospect churn value above a threshold prospect churn value;

determine a prospect pattern matrix based on mapping each of the prospect clusters from the set of significant prospect clusters with product data associated with the first product, the prospect pattern matrix comprising the set of significant prospect clusters sorted into a plurality of patterns, the plurality of patterns indicative of a significance level for each of the significant prospect clusters;

identify a set of products correlated to the first product;

determine a prospect profile for each of the plurality of patterns, the prospect profile comprising the set of products correlated to the first product, the set of products being relevant for a prospect from the plurality of prospects;

generate a prospect assessment result corresponding to the prospect assessment requirement, the prospect assessment result comprising the prospect profile relevant for resolution of the query; and perform a prospect assessment action based on the prospect assessment result for the resolution of the query, wherein the prospect assessment action facilitates upgrading existing products in a procurement portfolio based on the prospect profile.

16. The non-transitory computer-readable medium of claim 15, wherein the processor to identify a plurality of rules for determining the prospect profile, the plurality of rules facilitating determining a correlation amongst the set of products and the product associated with each significant prospect cluster.

17. The non-transitory computer-readable medium of claim 16, wherein the processor is to assign a confidence score to each product from the set of products correlated to the first product, the confidence score indicative of relevance of the products correlated to the first product for a prospect from the plurality of prospects.

18. The non-transitory computer-readable medium of claim 17, wherein the processor is to assign the confidence score based on mapping the prospect data associated with the prospect profile with the plurality of rules.

19. The non-transitory computer-readable medium of claim 15, wherein the processor create multiple sets of the plurality of prospect clusters and identify a set of the plurality of prospect clusters from among the multiple sets of the plurality of prospect clusters, based on an evaluation of each of the multiple sets of the plurality of prospect clusters, the evaluation to map a similarity level for the plurality of prospects within each plurality of prospect clusters and the evaluation to map a disparity level among each set of the plurality of prospect clusters.

20. The non-transitory computer-readable medium of claim 15, wherein the processor is to:
create a product recommendation library by associating the prospect profile with the prospect assessment requirement; and
deploy the product recommendation library to validate the prospect profile for generation of the prospect assessment result.

* * * * *

UNITED STATES PATENT AND TRADEMARK OFFICE
CERTIFICATE OF CORRECTION

PATENT NO. : 11,295,328 B2
APPLICATION NO. : 16/921673
DATED : April 5, 2022
INVENTOR(S) : Vinay Avinash Dorle et al.

It is certified that error appears in the above-identified patent and that said Letters Patent is hereby corrected as shown below:

On the Title Page

Item [30], Line 21 from the top, "May 1, 2020" should instead read "May 8, 2020"

In the Claims

Claim 1, Line 30 from the top, the phrase "instructions, when executed" should instead read "instructions, which when executed"

Claim 7, Line 2 from the top, the phrase "for generation the prospect" should instead read "for generation of the prospect"

Signed and Sealed this
Tenth Day of January, 2023

Katherine Kelly Vidal
*Director of the United States Patent and Trademark Office*